(12) United States Patent
Mallia et al.

(10) Patent No.: US 12,237,707 B2
(45) Date of Patent: *Feb. 25, 2025

(54) SYSTEMS FOR CONTROLLING POWER DISTRIBUTION TO VEHICLES

(71) Applicant: Geotab Inc., Oakville (CA)

(72) Inventors: Eric Christopher Mallia, Waterloo (CA); Christopher Joseph Mendes, Kitchener (CA); Matthew Stevens, Baden (CA); Young Seok Shin, Kitchener (CA); Michael Douglas McLean, Toronto (CA)

(73) Assignee: Geotab Inc., Oakviile (CA)

( * ) Notice: Subject to any disclaimer, the term of this patent is extended or adjusted under 35 U.S.C. 154(b) by 440 days.

This patent is subject to a terminal disclaimer.

(21) Appl. No.: 17/531,192

(22) Filed: Nov. 19, 2021

(65) Prior Publication Data
US 2023/0108438 A1  Apr. 6, 2023

Related U.S. Application Data

(60) Provisional application No. 63/252,736, filed on Oct. 6, 2021.

(51) Int. Cl.
*H02J 7/00* (2006.01)
*B60L 53/14* (2019.01)
(Continued)

(52) U.S. Cl.
CPC .......... *H02J 7/00712* (2020.01); *B60L 53/14* (2019.02); *B60L 53/16* (2019.02); *B60L 53/305* (2019.02); *B60L 53/62* (2019.02); *B60L 53/63* (2019.02); *B60L 53/64* (2019.02); *B60L 53/67* (2019.02); *B60L 58/12* (2019.02); *B60L 58/15* (2019.02); *G05B 15/02* (2013.01);
(Continued)

(58) Field of Classification Search
CPC ...... H02J 7/00712; H02J 7/00032; H02J 3/14; H02J 2310/64; B60L 53/305; B60L 53/62; B60L 53/665; G05B 15/02; G06Q 30/0234; Y02T 10/70; Y02T 10/7072; Y02T 90/12; Y02T 90/16; H01M 10/44; H01M 10/48
See application file for complete search history.

(56) References Cited

U.S. PATENT DOCUMENTS 5,589,757 A  12/1996  Klang
7,274,975 B2  9/2007  Miller
(Continued)

FOREIGN PATENT DOCUMENTS

KR  20180044700 A  *  5/2018

*Primary Examiner* — Mohammad Ali
*Assistant Examiner* — Dhruvkumar Patel
(74) *Attorney, Agent, or Firm* — Mark J. Pringle-Rigby

(57) ABSTRACT

The present disclosure relates to systems, methods, and devices for controlling charging of vehicles, to avoid charging during charge-adverse time periods or during charge restriction events. This can advantageously reduce cost to vehicles owners, and or provide access to reward incentives. Further, power distribution entities (utility providers) advantageously have increased control over power distribution to avoid over-burdening of power distribution infrastructure. Further, systems and methods for determining or inferring whether a vehicle is connected to a charge station are described, which can be used to inform automatic restriction of vehicle charging.

16 Claims, 14 Drawing Sheets

(51) Int. Cl.

| | | |
|---|---|---|
| *B60L 53/16* | (2019.01) | |
| *B60L 53/30* | (2019.01) | |
| *B60L 53/62* | (2019.01) | |
| *B60L 53/63* | (2019.01) | |
| *B60L 53/64* | (2019.01) | |
| *B60L 53/66* | (2019.01) | |
| *B60L 53/67* | (2019.01) | |
| *B60L 58/12* | (2019.01) | |
| *B60L 58/15* | (2019.01) | |
| *G05B 15/02* | (2006.01) | |
| *G06Q 30/0234* | (2023.01) | |
| *H01M 10/44* | (2006.01) | |
| *H02J 13/00* | (2006.01) | |

(52) U.S. Cl.
CPC ...... *G06Q 30/0234* (2013.01); *H01M 10/446* (2013.01); *H02J 7/00032* (2020.01); *H02J 7/00041* (2020.01); *H02J 7/0013* (2013.01); *H02J 7/00302* (2020.01); *H02J 7/0047* (2013.01); *H02J 7/0048* (2020.01); *H02J 7/0069* (2020.01); *H02J 7/0071* (2020.01); *H02J 13/00002* (2020.01); *B60L 53/665* (2019.02); *B60L 2240/80* (2013.01); *B60L 2250/14* (2013.01); *H01M 2220/20* (2013.01); *H02J 7/00304* (2020.01)

(56) References Cited

U.S. PATENT DOCUMENTS

| | | |
|---|---|---|
| 7,333,880 B2 | 2/2008 | Brewster et al. |
| 7,783,390 B2 | 8/2010 | Miller |
| 8,169,186 B1 | 5/2012 | Haddad |
| 8,294,420 B2 | 10/2012 | Kocher |
| 8,525,480 B2 | 9/2013 | Anderson |
| 8,594,859 B2 | 11/2013 | Contreras Delpiano |
| 8,725,306 B2 | 5/2014 | Ramezani |
| 8,766,594 B2 | 7/2014 | Götz |
| 8,872,379 B2 | 10/2014 | Ruiz |
| 8,880,233 B2 | 11/2014 | Kearns |
| 8,903,560 B2 | 12/2014 | Miller |
| 8,957,634 B2 | 2/2015 | Lo et al. |
| 8,975,866 B2 | 3/2015 | Mcgrath |
| 8,996,186 B2 | 3/2015 | Chen |
| 9,007,027 B2 | 4/2015 | Prosser |
| 9,026,347 B2 | 5/2015 | Gadh |
| 9,045,042 B2 | 6/2015 | Kusumi |
| 9,112,382 B2 | 8/2015 | Paul |
| 9,209,623 B1 | 12/2015 | Sortomme |
| 9,235,825 B2 | 1/2016 | Shao |
| 9,248,838 B2 | 2/2016 | Kusumi |
| 9,268,314 B2 | 2/2016 | Willig et al. |
| 9,283,863 B2 | 3/2016 | Eger et al. |
| 9,300,138 B2 | 3/2016 | Chen |
| 9,403,441 B2 | 8/2016 | Ashworth et al. |
| 9,406,094 B2 | 8/2016 | Kearns |
| 9,409,492 B2 | 8/2016 | Uyeki |
| 9,418,392 B2 | 8/2016 | Kearns |
| 9,457,680 B2 | 10/2016 | Shinzaki |
| 9,682,637 B2 | 6/2017 | Shimizu |
| 9,692,259 B2 | 6/2017 | Boss |
| 9,711,987 B2 | 7/2017 | Choi |
| 9,783,068 B2 | 10/2017 | Eger et al. |
| 9,840,156 B2 | 12/2017 | DeBoer, III |
| 9,843,222 B2 | 12/2017 | Yeon |
| 9,893,526 B2 | 2/2018 | Prosser et al. |
| 9,904,269 B2 | 2/2018 | Al-Mohssen et al. |
| 9,912,184 B2 | 3/2018 | Prosser |
| 9,977,448 B2 | 5/2018 | Willig et al. |
| 9,995,591 B2 | 6/2018 | Shimizu |
| 10,011,183 B2 | 7/2018 | Shimizu |
| 10,054,971 B2 | 8/2018 | Saito et al. |
| 10,150,380 B2 | 12/2018 | Vaughan et al. |
| 10,166,881 B2 | 1/2019 | Zhou |
| 10,218,201 B2 | 2/2019 | Wu |
| 10,284,003 B2 | 5/2019 | Losee |
| 10,289,190 B2 | 5/2019 | Boss |
| 10,377,260 B2 | 8/2019 | Donnelly |
| 10,377,265 B2 | 8/2019 | Wytock et al. |
| 10,431,997 B2 | 10/2019 | Miftakhov et al. |
| 10,432,017 B1 | 10/2019 | Morales |
| 10,545,194 B2 | 1/2020 | Eldridge et al. |
| 10,549,645 B2 | 2/2020 | Zhao |
| 10,552,923 B2 | 2/2020 | Cun |
| 10,571,947 B2 | 2/2020 | Burlinson |
| 10,589,632 B2 | 3/2020 | Wada |
| 10,630,076 B2 | 4/2020 | Wordsworth |
| 10,647,209 B2 | 5/2020 | Haas et al. |
| 10,693,294 B2 | 6/2020 | Kearns |
| 10,723,238 B2 | 7/2020 | Hortop |
| 10,747,252 B2 | 8/2020 | Kearns |
| 10,750,336 B2 | 8/2020 | Mendes |
| 10,752,123 B2 | 8/2020 | Patil et al. |
| 10,814,732 B2 | 10/2020 | Ellgas |
| 10,926,659 B2 | 2/2021 | Lee |
| 10,946,760 B2 | 3/2021 | Miftakhov |
| 11,051,143 B2 | 6/2021 | Mendes |
| 11,124,080 B2 | 9/2021 | Donnelly |
| 11,148,542 B2 | 10/2021 | Donnelly |
| 11,183,001 B2 | 11/2021 | Lowenthal et al. |
| 11,192,466 B2 | 12/2021 | Harty |
| 11,220,192 B1 | 1/2022 | Maeda |
| 11,267,356 B2 | 3/2022 | Bode et al. |
| 11,752,895 B1 | 9/2023 | Govan et al. |
| 2006/0276938 A1 | 12/2006 | Miller |
| 2007/0276547 A1 | 11/2007 | Miller |
| 2008/0007202 A1 | 1/2008 | Pryor |
| 2009/0177595 A1 | 7/2009 | Dunlap |
| 2010/0017045 A1 | 1/2010 | Nesler |
| 2010/0017249 A1 | 1/2010 | Fincham et al. |
| 2011/0074350 A1 | 3/2011 | Kocher |
| 2011/0078092 A1 | 3/2011 | Kim |
| 2011/0175569 A1 | 7/2011 | Austin |
| 2011/0204720 A1 | 8/2011 | Ruiz |
| 2011/0208365 A1 | 8/2011 | Miller |
| 2011/0320828 A1 | 12/2011 | Boss |
| 2012/0056583 A1 | 3/2012 | Götz |
| 2012/0095830 A1 | 4/2012 | Contreras Delpiano |
| 2012/0126748 A1 | 5/2012 | Haddad |
| 2012/0161698 A1 | 6/2012 | Anderson |
| 2012/0245750 A1 | 9/2012 | Paul |
| 2012/0262112 A1 | 10/2012 | Ross |
| 2012/0316687 A1 | 12/2012 | Chen |
| 2012/0316695 A1 | 12/2012 | Chen |
| 2013/0054045 A1 | 2/2013 | Ramezani |
| 2013/0093393 A1 | 4/2013 | Shimotani |
| 2013/0110299 A1 | 5/2013 | Meyerhofer et al. |
| 2013/0123996 A1 | 5/2013 | Matos |
| 2013/0162221 A1 | 6/2013 | Jefferies |
| 2013/0169220 A1 | 7/2013 | Karner |
| 2013/0179061 A1 | 7/2013 | Gadh |
| 2013/0254151 A1* | 9/2013 | Mohagheghi ........... H02J 3/003 706/46 |
| 2013/0274972 A1 | 10/2013 | Kusumi |
| 2013/0275368 A1 | 10/2013 | Camacho |
| 2014/0049109 A1 | 2/2014 | Kearns |
| 2014/0052305 A1 | 2/2014 | Kearns |
| 2014/0088781 A1 | 3/2014 | Kearns |
| 2014/0089064 A1 | 3/2014 | Hyde |
| 2014/0100671 A1 | 4/2014 | Losee |
| 2014/0200724 A1 | 7/2014 | Sortomme |
| 2014/0217976 A1 | 8/2014 | Mcgrath |
| 2014/0236369 A1 | 8/2014 | Kearns |
| 2014/0354227 A1 | 12/2014 | Tyagi et al. |
| 2015/0069970 A1 | 3/2015 | Sarkar |
| 2015/0137752 A1 | 5/2015 | Shinzaki |
| 2015/0137768 A1* | 5/2015 | Kishiyama ........... H02J 7/0013 320/137 |
| 2015/0207319 A1 | 7/2015 | Miller |
| 2015/0217650 A1 | 8/2015 | Ichikawa et al. |
| 2015/0258998 A1 | 9/2015 | Kusumi |
| 2015/0283912 A1 | 10/2015 | Shimizu |

(56) References Cited

U.S. PATENT DOCUMENTS

| | | | |
|---|---|---|---|
| 2015/0298567 A1* | 10/2015 | Uyeki | B60L 58/13 |
| | | | 320/155 |
| 2015/0321570 A1 | 11/2015 | Cun | |
| 2015/0352967 A1 | 12/2015 | Timpf, Jr. | |
| 2016/0009192 A1 | 1/2016 | Zhang | |
| 2016/0049790 A1 | 2/2016 | Wordsworth | |
| 2016/0159239 A1 | 6/2016 | Shi | |
| 2016/0172897 A1 | 6/2016 | Iisaka | |
| 2016/0185246 A1 | 6/2016 | Paul | |
| 2016/0190864 A1 | 6/2016 | Yeon | |
| 2016/0193932 A1 | 7/2016 | Vaghefinazari | |
| 2016/0342170 A1 | 11/2016 | Kearns | |
| 2016/0347195 A1 | 12/2016 | Bridges et al. | |
| 2016/0352125 A1 | 12/2016 | Choi | |
| 2017/0097622 A1* | 4/2017 | Ohama | H02J 3/14 |
| 2017/0192483 A1 | 7/2017 | Boss | |
| 2017/0259683 A1 | 9/2017 | Shimizu | |
| 2017/0261331 A1 | 9/2017 | Shimizu | |
| 2017/0313202 A1 | 11/2017 | Amari | |
| 2017/0355277 A1 | 12/2017 | Zhou | |
| 2018/0090943 A1 | 3/2018 | Wu | |
| 2018/0154792 A1 | 6/2018 | Wada | |
| 2018/0174249 A1 | 6/2018 | Okabe | |
| 2018/0201148 A1* | 7/2018 | Donnelly | G05D 1/0088 |
| 2018/0240141 A1* | 8/2018 | Uyeki | G06Q 30/0219 |
| 2018/0244162 A1 | 8/2018 | Marcial-Simon | |
| 2018/0358839 A1 | 12/2018 | Perez | |
| 2018/0361869 A1 | 12/2018 | Ellgas | |
| 2018/0361870 A1 | 12/2018 | Zhao | |
| 2018/0370379 A1* | 12/2018 | Chen | B60L 53/665 |
| 2019/0011926 A1 | 1/2019 | Konishi | |
| 2019/0039467 A1 | 2/2019 | Hortop | |
| 2019/0061547 A1 | 2/2019 | Vargas-Reighley et al. | |
| 2019/0089153 A1 | 3/2019 | Miller | |
| 2019/0217735 A1 | 7/2019 | Donnelly | |
| 2019/0217736 A1 | 7/2019 | Donnelly | |
| 2020/0006944 A1 | 1/2020 | Fife et al. | |
| 2020/0015048 A1 | 1/2020 | Mendes | |
| 2020/0101850 A1 | 4/2020 | Harty | |
| 2020/0156496 A1 | 5/2020 | Light-Holets | |
| 2020/0171970 A1 | 6/2020 | Lee | |
| 2020/0269717 A1 | 8/2020 | Gaertner | |
| 2020/0351629 A1 | 11/2020 | Mendes | |
| 2020/0371540 A1 | 11/2020 | Kearns | |
| 2021/0037358 A1 | 2/2021 | Mendes | |
| 2021/0049712 A1 | 2/2021 | Devaraj et al. | |
| 2021/0057909 A1 | 2/2021 | Miller | |
| 2021/0061121 A1 | 3/2021 | Light-Holets et al. | |
| 2021/0070182 A1 | 3/2021 | Billmaier | |
| 2021/0070186 A1 | 3/2021 | Miftakhov et al. | |
| 2021/0086647 A1 | 3/2021 | Kiessling | |
| 2021/0119482 A1 | 4/2021 | Lowenthal et al. | |
| 2021/0162881 A1 | 6/2021 | Baxter et al. | |
| 2021/0203177 A1 | 7/2021 | Peng | |
| 2021/0221247 A1 | 7/2021 | Daniel et al. | |
| 2021/0347269 A1 | 11/2021 | Kothavale et al. | |
| 2021/0362618 A1 | 11/2021 | Park | |
| 2021/0370790 A1 | 12/2021 | Feldman | |
| 2021/0394641 A1 | 12/2021 | Maeda | |
| 2021/0394642 A1 | 12/2021 | Maeda | |
| 2022/0024346 A1 | 1/2022 | Quattrini, Jr. et al. | |

\* cited by examiner

| Time Period | Day | Time | Adversity | Minimum Charge Threshold | |
|---|---|---|---|---|---|
| On-Peak | Weekdays | 11AM to 5PM | High | 25% | 1511 |
| Mid-Peak | Weekdays | 7AM to 11AM 5PM to 7PM | Medium | 40% | 1512 |
| Off-Peak | Weekdays | 7PM to 7AM | None | 100% | 1513 |
| Off-Peak | Weekend | All Day | None | 100% | 1514 |
| Add New | | | | | 1515 |

1501 1502 1503 1504 1505

SYSTEMS FOR CONTROLLING POWER DISTRIBUTION TO VEHICLES

PRIOR APPLICATION DATA

The present application claims priority to U.S. Provisional Patent Application No. 63/252,736, filed Oct. 6, 2021, titled "SYSTEMS, DEVICES, AND METHODS FOR VEHICLE BATTERY CHARGING", the entirety of which is incorporated herein by reference.

TECHNICAL FIELD

The present disclosure generally relates to systems, devices, and methods for charging vehicle batteries, and in particular relates to controlling or influencing charging patterns of vehicle batteries.

BACKGROUND

Battery-powered vehicles (e.g. Hybrid electric vehicles, all-electric vehicles, etc.) are a convenient and environmentally friendly means of transportation. A battery-powered vehicle includes at least one battery, which can be charged from an external power source. As adoption of battery-powered vehicles increases, increasing strain will be placed on electrical infrastructure to provide sufficient power to charge batteries for said vehicles. It is desirable to provide means for managing such strain. Additionally, it is desirable to provide means for managing charge patterns for vehicle batteries to reduce battery degradation.

SUMMARY

According to a broad aspect, the present disclosure describes a system for controlling charging of a battery of a vehicle by a power source external to the vehicle, the system comprising: a control unit operable to: receive an indication of a minimum charge threshold for the battery; receive an indication of a charge-adverse time period; determine whether a charge level of the battery is above the minimum charge threshold; if the charge level is below the minimum charge threshold, enable charging of the battery at a first charge rate during the charge-adverse time period; and if the charge level is above the minimum charge threshold, restrict charging of the battery to a second charge rate less than the first charge rate during the charge-adverse time period.

The control unit may be further operable to enable charging of the battery at the first charge rate outside of the charge-adverse time period, regardless of whether the charge level is above the minimum charge threshold.

The control unit may be further operable to: receive an override input from a user; and in response to the override input, enable charging of the battery during the charge-adverse time period even if the charge level is below the minimum charge threshold.

The system may further comprise the vehicle, the control unit may be a component of the vehicle; the control unit may be operable to control the vehicle to accept a first amount of power from the power source; and the control unit may be operable to control the vehicle to accept less power from the power source than the first amount of power. The control unit may be operable to restrict the vehicle to accept no power from the power source.

The system may further comprise the power source, the control unit may be a component of the power source; the control unit may be operable to control the power source to provide a first amount of power to the vehicle; and the control unit may be operable to control the power source to provide less power to the vehicle than the first amount of power. The control unit may be operable to control the power source to provide no power to the vehicle.

The system may further comprise an intermediate device operable to be coupled to the power source and the vehicle to control provision of power from the power source to the vehicle, the control unit may be a component of the intermediate device; the control unit may be operable to control flow of power from the power source to the vehicle to provide a first amount of power to the vehicle; and the control unit may be operable to control flow of power from the power source to the vehicle to provide less power to the vehicle than the first amount of power. The control unit may be operable to control flow of power from the power source to the vehicle to provide no power to the vehicle.

During the charge-adverse time period a monetary cost of power may be greater than a monetary cost of power outside of the charge-adverse time period. During the charge-adverse time period a demand for power may be greater than a demand for power outside of the charge-adverse time period.

The control unit may be operable to: monitor the charge level of the battery during charging of the battery; and restrict charging of the battery to the second charge rate if the charge level of the battery goes above the minimum charge threshold during the charge-adverse time period. The control unit may be operable to monitor the charge level continuously. The control unit may be operable to monitor the charge level periodically.

The minimum charge threshold may be received as input from a user. The minimum charge threshold may be received from a manufacturer of the vehicle or a manufacturer of the battery of the vehicle.

The system may further comprise a communication interface, and the indication of the charge-adverse time period may be received over the communication interface. The indication of the charge-adverse time period may be received as input from a user.

The control unit may be further operable to receive an indication of a maximum charge threshold, and to restrict charging the battery if the charge level is above the maximum charge threshold.

According to another broad aspect, the present disclosure describes a method for controlling charging of a battery of a vehicle by a power source external to the vehicle, the method comprising: receiving, by a control unit, an indication of a minimum charge threshold for the battery; receiving, by the control unit, an indication of a charge-adverse time period; determining, by the control unit, whether a charge level of the battery is above the minimum charge threshold during the charge-adverse time period; if the charge level is below the minimum charge threshold, enabling charging of the battery at a first charge rate during the charge-adverse time period; and if the charge level is above the minimum charge threshold, restricting charging of the battery to a second charge rate less than the first charge rate during the charge-adverse time period.

The method may further comprise: enabling charging of the battery at the first charge rate outside of the charge-adverse time period, regardless of whether the charge level is above the minimum charge threshold.

The method may further comprise: receiving an override input from a user; and in response to the override input, enabling charging of the battery at the first charge rate during the charge-adverse time period even if the charge level is below the minimum charge threshold.

The control unit may be a component of the vehicle; enabling charging of the battery at the first charge rate may comprise the control unit controlling the vehicle to accept a first amount of power from the power source; and restricting charging of the battery to the second charge rate may comprise the control unit controlling the vehicle to accept less power than the first amount of power from the power source. Controlling the vehicle to accept less power than the first amount of power may comprise the control unit controlling the vehicle to accept no power from the power source.

The control unit may be a component of the power source external to the vehicle; enabling charging of the battery at the first charge rate may comprise the control unit controlling the power source to provide a first amount of power to the vehicle; and restricting charging of the battery may comprise the control unit controlling the power source to provide less power to the vehicle than the first amount of power. Controlling the power source to provide less power to the vehicle than the first amount of power may comprise the control unit controlling the power source to provide no power to the vehicle.

The control unit may be a component of an intermediate device coupled to the power source and the vehicle to control provision of power from the power source to the vehicle; enabling charging of the battery at the first charge rate may comprise the control unit controlling flow of power from the power source to the vehicle to provide a first amount of power to the vehicle; and restricting charging of the battery may comprise the control unit controlling flow of power from the power source to the vehicle to provide less power to the vehicle than the first amount of power. The control unit controlling flow of power from the power source to the vehicle to provide less power to the vehicle than the first amount of power may comprise: the control unit controlling flow of power from the power source to the vehicle to provide no power to the vehicle.

The method may further comprise: monitoring, by the control unit, the charge level of the battery during charging of the battery; and restricting, by the control unit, charging of the battery to the second charge rate if the charge level of the battery goes above the minimum charge threshold during the charge-adverse time period. Monitoring the charge level of the battery during charging of the battery may comprise monitoring the charge level continuously during charging of the battery. Monitoring the charge level of the battery during charging of the battery may comprise monitoring the charge level periodically during charging of the battery.

Receiving the indication of the minimum charge threshold may comprise receiving an input from a user which is indicative of the minimum charge threshold.

Receiving the indication of the minimum charge threshold may comprise receiving an input from a manufacturer of the vehicle or a manufacturer of the battery of the vehicle which is indicative of the minimum charge threshold.

The indication of the charge-adverse time period may be received over a communication interface in communication with the control unit.

Receiving the indication of the charge-adverse time period may comprise receiving an input from a user which is indicative of the charge-adverse time period.

The method may further comprise: receiving, by the control unit, an indication of a maximum charge threshold; and restricting, by the control unit, charging of the battery if the charge level is above the maximum charge threshold.

According to another broad aspect, the present disclosure describes a method for controlling charging of a battery of a vehicle by a power source external to the vehicle, the method comprising: receiving, by a control unit, an indication of a minimum charge threshold for the battery; receiving, by the control unit, an indication of a charge-restriction event; determining, by the control unit, whether a charge level of the battery is above the minimum charge threshold before an end of the charge-restriction event; if the charge level is below the minimum charge threshold, enabling charging of the battery at a first charge rate during the charge-restriction event; and if the charge level is above the minimum charge threshold, restricting charging of the battery to a second charge rate less than the first charge rate during the charge-restriction event.

The method may further comprise: transmitting, by a communication interface, an indication of whether charging of the battery is enabled at the first charging rate or restricted to the second charge rate for the charge-restriction event. The indication of whether charging of the battery is enabled at the first charging rate or restricted to the second charge rate may be transmitted prior to a beginning of the charge-restriction event. The indication of whether charging of the battery is enabled at the first charging rate or restricted to the second charge rate may be transmitted during the charge-restriction event. The indication of whether charging of the battery is enabled at the first charging rate or restricted to the second charge rate may be transmitted after an end of the charge-restriction event. The method may further comprise receiving, by a device remote from the vehicle and the power source, an indication of whether charging of the battery is enabled at the first charging rate or restricted to the second charge rate.

The method may further comprise allocating a reward for a recipient associated with the vehicle if charging was restricted to the second charge rate during the charge-restriction event. Allocating the reward may comprise allocating a proportional reward for the recipient associated with the vehicle based on a quantity of energy which is saved during the charge-restriction event by restricting charging of the battery to the second charge rate instead of enabling charging of the battery at the first charge rate.

Receiving the indication of the charge-restriction event may comprise receiving, by the control unit via a communication interface, the indication of the charge-restriction event from a device remote from the vehicle and the power source.

The method may further comprise providing, by a device remote from the vehicle and the power source, the indication of the charge-restriction event.

The method may further comprise: monitoring, by the control unit, the charge level of the battery during charging of the battery; if the charge level of the battery goes from below the minimum charge threshold to above the minimum charge threshold during the charge-restriction event: restricting charging of the battery to a second charge rate less than the first charge rate until an end of the charge-restriction event; and transmitting, by a communication interface in communication with the control unit, an indication of when charging of the battery is restricted to the second charge rate.

The method may further comprise: enabling charging of the battery at the first charge rate outside of the charge-restriction event, regardless of whether the charge level is above the minimum charge threshold.

The method may further comprise: receiving an override input from a user; in response to the override input, enabling charging of the battery at the first charge rate during the charge-restriction event even if the charge level is below the minimum charge threshold; and transmitting, by a communication interface in communication with the control unit, an indication of when charging of the battery is enabled at the first charge rate.

The control unit may be a component of the vehicle; enabling charging of the battery at the first charge rate may comprise the control unit controlling the vehicle to accept a first amount of power from the power source; and restricting charging of the battery to the second charge rate may comprise the control unit controlling the vehicle to accept less power than the first amount of power from the power source. Controlling the vehicle to accept less power than the first amount of power may comprise the control unit controlling the vehicle to accept no power from the power source.

The control unit may be a component of the power source external to the vehicle; enabling charging of the battery at the first charge rate may comprise the control unit controlling the power source to provide a first amount of power to the vehicle; and restricting charging of the battery may comprise the control unit controlling the power source to provide less power to the vehicle than the first amount of power. Controlling the power source to provide less power to the vehicle than the first amount of power may comprise the control unit controlling the power source to provide no power to the vehicle.

The control unit may be a component of an intermediate device coupled to the power source and the vehicle to control provision of power from the power source to the vehicle; enabling charging of the battery at the first charge rate may comprise the control unit controlling flow of power from the power source to the vehicle to provide a first amount of power to the vehicle; and restricting charging of the battery may comprise the control unit controlling flow of power from the power source to the vehicle to provide less power to the vehicle than the first amount of power. The control unit controlling flow of power from the power source to the vehicle to provide less power to the vehicle than the first amount of power may comprise: the control unit controlling flow of power from the power source to the vehicle to provide no power to the vehicle.

According to another broad aspect, the present disclosure describes a system for controlling charging of a battery of a vehicle by a power source external to the vehicle, the system comprising: a control unit operable to: receive an indication of a minimum charge threshold for the battery; receive an indication of a charge-restriction event; determine whether a charge level of the battery is above the minimum charge threshold before an end of the charge-restriction event; if the charge level is below the minimum charge threshold, enable charging of the battery at a first charge rate during the charge-restriction event; and if the charge level is above the minimum charge threshold, restrict charging of the battery to a second charge rate less than the first charge rate during the charge-restriction event.

The system may further comprise a communication interface, and the control unit may be operable to transmit, via the communication interface, an indication of whether charging of the battery is enabled at the first charging rate or restricted to the second charge rate for the charge-restriction event. The control unit may be operable to transmit the indication of whether charging of the battery is enabled at the first charging rate or restricted to the second charge rate prior to a beginning of the charge-restriction event. The control unit may be operable to transmit the indication of whether charging of the battery is enabled at the first charging rate or restricted to the second charge rate during the charge-restriction event. The control unit may be operable to transmit the indication of whether charging of the battery is enabled at the first charging rate or restricted to the second charge rate after an end of the charge-restriction event. The system may further comprise a device remote from the vehicle and the power source, operable to receive the indication of whether charging of the battery is enabled at the first charging rate or restricted to the second charge rate.

The system may further comprise a device remote from the vehicle and the power source operable to allocate a reward for a recipient associated with the vehicle if charging was restricted to the second charge rate during the charge-restriction event. The device remote from the vehicle and the power source may be operable to allocate the reward for the recipient associated with the vehicle based on a quantity of energy which is saved during the charge-restriction event by restricting charging of the battery to the second charge rate instead of enabling charging of the battery at the first charge rate.

The control unit may be operable to receive, via a communication interface, the indication of the charge-restriction event from a device remote from the vehicle and the power source.

The system may further comprise a device remote from the vehicle and the power source operable to provide the indication of the charge-restriction event.

The control unit may be operable to monitor the charge level of the battery during charging of the battery; if the charge level of the battery goes from below the minimum charge threshold to above the minimum charge threshold during the charge-restriction event: the control unit may be operable to restrict charging of the battery to a second charge rate less than the first charge rate until an end of the charge-restriction event; and a communication interface in communication with the control unit may be operable to transmit an indication of when charging of the battery is restricted to the second charge rate.

The control unit may be further operable to enable charging of the battery at the first charge rate outside of the charge-restriction event, regardless of whether the charge level is above the minimum charge threshold.

The control unit may be operable to receive an override input from a user; the control unit may be operable to, in response to the override input, enable charging of the battery at the first charge rate during the charge-restriction event even if the charge level is below the minimum charge threshold; and a communication interface in communication with the control unit may be operable to transmit an indication of when charging of the battery is enabled at the first charge rate.

The control unit may be a component of the vehicle; the control unit may be operable to control the vehicle to accept a first amount of power from the power source; and the control unit may be operable to control the vehicle to accept less power from the power source than the first amount of power. The control unit may be operable to restrict the vehicle to accept no power from the power source.

The system may further comprise the power source; the control unit may be a component of the power source; the control unit may be operable to control the power source to provide a first amount of power to the vehicle; and the control unit may be operable to control the power source to provide less power to the vehicle than the first amount of power. The control unit may be operable to control the power source to provide no power to the vehicle.

The system may further comprise an intermediate device operable to be coupled to the power source and the vehicle to control provision of power from the power source to the vehicle; the control unit may be a component of the intermediate device; the control unit may be operable to control flow of power from the power source to the vehicle to provide a first amount of power to the vehicle; and the control unit may be operable to control flow of power from the power source to the vehicle to provide less power to the vehicle than the first amount of power. The control unit may be operable to control flow of power from the power source to the vehicle to provide no power to the vehicle.

According to another broad aspect, the present disclosure describes a method of controlling power distribution to a plurality of vehicles, the method comprising: transmitting, by a communication interface to a plurality of control units, an indication of a charge-restriction event, each control unit of the plurality of control units operable to control charging of a respective battery of a respective vehicle; receiving, by the communication interface from each control unit of a set of control units of the plurality of control units, a respective indication of participation in the charge-restriction event by a respective vehicle, where indication of participation in the charge-restriction event is indicative of a charge rate of a battery of the respective vehicle being restricted from a first charge rate outside of the charge-restriction event to a second charge rate less than the first charge rate during the charge-restriction event; and allocating, by at least one processor communicatively coupled to the communication interface, a respective reward for a respective recipient for each vehicle for which an indication of participation in the charge-restriction event was received, each reward based on a quantity of energy which is saved during the charge-restriction event by the respective vehicle restricting charge rate to the second charge rate instead of enabling charging of the battery at the first charge rate.

Allocating, by the at least one processor, the respective reward for the respective recipient for each vehicle for which an indication of participation in the charge-restriction event was received may comprise: allocating funds to be provided to respective recipients for each vehicle for which an indication of participation in the charge-restriction event was received.

Allocating, by the at least one processor, the respective reward for the respective recipient for each vehicle for which an indication of participation in the charge-restriction event was received may comprise: allocating credit to respective recipients for each vehicle for which an indication of participation in the charge-restriction event was received.

The method may further comprise transmitting, by the communication interface to the plurality of control units, a schedule of upcoming charge-restriction events.

The method may further comprise transmitting, by the communication interface to a control unit of the plurality of control units, an indication of participation in past charge events by a vehicle corresponding to the control unit.

The method may further comprising receiving by the communication interface, from a control unit of the plurality of control units, an indication of partial participation in the charge-restriction event by a respective vehicle. Indication of partial participation in the charge-restriction event may be indicative of a charge rate of a battery of the respective vehicle being restricted from the first charge rate to the second charge rate after a beginning of the charge-restriction event. Indication of partial participation in the charge-restriction event may be indicative of a charge rate of a battery of the respective vehicle being enabled at the first charge rate after a beginning of the charge-restriction event where the charge rate of the battery of the respective vehicle is restricted to second charge rate at the beginning of the charge-restriction event. The method may further comprise allocating, by the at least one processor, a partial reward for a recipient associated with the vehicle for which an indication of partial participation in the charge-restriction event was received. The partial reward may be based on a proportion of the charge-restriction event for which the charge rate of the vehicle was restricted to the second charge rate. The partial reward may be based on a quantity of energy which is saved during the charge-restriction event by the charge rate of the vehicle being restricted to the second charge rate instead of enabling charging of the battery at the first charge rate for an entire duration of the charge-restriction event.

According to another broad aspect, the present disclosure describes a system for controlling power distribution to a plurality of vehicles, the system comprising: at least one processor; at least one non-transitory processor-readable storage medium; a communication interface communicatively coupled to the at least one processor, wherein the at least one non-transitory processor-readable storage medium has instructions stored thereon, which when executed by the at least one processor, cause the system to: transmit, by the communication interface, an indication of a charge-restriction event to be received by a plurality of control units, each control unit of the plurality of control units operable to control charging of a respective battery of a respective vehicle; receive, by the communication interface from each control unit of a set of control units of the plurality of control units, at least one indication of participation in the charge-restriction event by a respective vehicle, where indication of participation in the charge-restriction event is indicative of a charge rate of a battery of the respective vehicle being restricted from a first charge rate outside of the charge-restriction event to a second charge rate less than the first charge rate during the charge-restriction event; and allocate, by the at least one processor, a respective reward for a respective recipient for each vehicle for which an indication of participation in the charge-restriction event was received, each reward based on a quantity of energy which is saved during the charge-restriction event by the respective vehicle restricting charge rate to the second charge rate instead of enabling charging of the battery at the first charge rate.

The instructions which cause the system to allocate, by the at least one processor, the respective reward for the respective recipient for each vehicle for which an indication of participation in the charge-restriction event was received may cause the at least one processor to: allocate funds to be provided to respective recipients for each vehicle for which an indication of participation in the charge-restriction event was received.

The instructions which cause the system to allocate, by the at least one processor, the respective reward for the respective recipient for each vehicle for which an indication of participation in the charge-restriction event was received may cause the at least one processor to: allocate credit to respective recipients for each vehicle for which an indication of participation in the charge-restriction event was received.

The instructions may further cause the communication interface to transmit, to the plurality of control units, a schedule of upcoming charge-restriction events.

The instructions may further cause the communication interface to transmit, to a control unit of the plurality of control units, an indication of participation in past charge events by a vehicle corresponding to the control unit.

The instructions may further cause the communication interface to receive, from a control unit of the plurality of control units, an indication of partial participation in the charge-restriction event by a respective vehicle. Indication of partial participation in the charge-restriction event may be indicative of a charge rate of a battery of the respective vehicle being restricted from the first charge rate to the second charge rate after a beginning of the charge-restriction event. Indication of partial participation in the charge-restriction event may be indicative of a charge rate of a battery of the respective vehicle being enabled at the first charge rate after a beginning of the charge-restriction event where the charge rate of the battery of the respective vehicle is restricted to second charge rate at the beginning of the charge-restriction event. The instructions may further cause the at least one processor to allocate a partial reward for a recipient for a vehicle for which an indication of partial participation in the charge-restriction event was received. The partial reward may be based on a proportion of the charge-restriction event for which the charge rate of the vehicle was restricted to the second charge rate. The partial reward may be based on a quantity of energy which is saved during the charge-restriction event by the charge rate of the vehicle being restricted to the second charge rate instead of charging of the battery being enabled at the first charge rate for an entire duration of the entire charge-restriction event.

According to another broad aspect, the present disclosure describes a method of controlling power distribution to a plurality of vehicles, the method comprising: determining a quantity of the plurality of vehicles expected to be connected to respective charge stations during a first time period; determining a quantity of preventable power usage by restricting charging of respective batteries of the quantity of the plurality of vehicles during the first time period, from a first charge rate outside of the first time period to a second charge rate less than the first charge rate during the first time period; and initiating a charge-restriction event during the first time period.

Determining a quantity of the plurality of vehicles expected to be connected to respective charge stations during a first time period may comprise: determining the quantity of the plurality of vehicles by determining a quantity of vehicles which are presently connected to respective charge stations based on connection data indicative of connection between each vehicle of the plurality of vehicles and a respective charge station.

Determining a quantity of the plurality of vehicles expected to be connected to respective charge stations during a first time period may comprise: estimating the quantity of the plurality of vehicles based on historical connection data indicative of connection between each vehicle of the plurality of vehicles and a respective charge station.

The method may further comprise, prior to initiating the charge-restriction event: presenting a user interface for initiation of the charge-restriction event; and receiving a user input to initiate the charge-restriction event for the plurality of vehicles.

Initiating the charge-restriction event may be performed automatically when power usage during the first time period is expected to exceed a power distribution threshold during the first time period.

The method may further comprise restricting charging for at least one vehicle of the plurality of vehicles from the first charge rate to the second charge rate during the charge-restriction event.

The method may further comprise communicating, to at least one vehicle of the plurality of vehicles, an option to restrict charging from the first charge rate to the second charge rate during the charge-restriction event. The method may further comprising determining an expected quantity of vehicles which will accept the option to restrict charging from the first charge rate to the second charge rate. Determining an expected quantity of vehicles which will accept the option to restrict charging may be based on historical acceptance data which is indicative of previous restricting of charging by vehicles of the plurality of vehicles.

Respective charge rate for a set of vehicles of the plurality of vehicles may be restricted to the second charge rate during the first time period, and the method may further comprise: allocating a respective reward for a respective recipient associated with each vehicle of the set of vehicles. Allocating a respective reward for a respective recipient associated with each vehicle of the set of vehicles may comprise: allocating each reward based on a quantity of energy which is saved during the charge-restriction event by the respective vehicle restricting charge rate to the second charge rate instead of enabling charging at the first charge rate.

The method may further comprise receiving a user input indicating the first time period.

The method may further comprise determining the first time period, by determining a peak time period where the quantity of the plurality of vehicles expected to be connected to respective charge stations includes more vehicles than other time periods.

Determining a quantity of the plurality of vehicles expected to be connected to respective charge stations may comprise determining, for each vehicle of the plurality of vehicles, that the vehicle is connected to a respective charge station when a charge port cover of the vehicle is open. The method may further comprise, for each vehicle in the plurality of vehicles: receiving respective charge data for the vehicle for a respective second time period in which the charge port cover of the vehicle has been open; inferring that the vehicle is coupled to a respective charge station if the charge port cover of the vehicle is open and if the respective charge data is indicative of charging of a battery of the vehicle in the respective second time period; and inferring that the vehicle is not coupled to the respective charge station if the charge port cover of the vehicle is not open or if the respective charge data is indicative of no charging of the battery of the vehicle in the respective second time period. The method may further comprise, for each vehicle in the plurality of vehicles: receiving respective movement data for the vehicle indicative of movement of the vehicle for a respective second time period in which the charge port cover of the vehicle has been open; inferring that the vehicle is coupled to a respective charge station if the charge port cover of the vehicle is open and if the respective movement data is indicative of the vehicle not having moved in the respective second time period; and inferring that the vehicle is not coupled to the respective charge station if the charge port cover of the vehicle is not open or if the respective movement data is indicative of the vehicle having moved in the respective second time period. The respective movement data may comprises data selected from a group consisting of: positional data indicating position of the vehicle over time; velocity data indicating movement speed of the vehicle; and inertial data indicating acceleration of the vehicle.

Determining a quantity of the plurality of vehicles expected to be connected to respective charge stations may comprise determining, for each vehicle of the plurality of vehicles, that the vehicle is connected to a respective charge station when the vehicle is proximate to a charge station. Determining, for each vehicle of the plurality of vehicles, that the vehicle is connected to a respective charge station when the vehicle is proximate to a charge station may comprise determining that the vehicle is proximate to a charge station when the vehicle is within a threshold distance of the charge station based on position data from a position sensor of the vehicle. Determining, for each vehicle of the plurality of vehicles, that the vehicle is proximate to a respective charge station may comprise: determining whether the vehicle is communicatively coupled to a wireless network associated with the charge station based on communication data received from a communication interface of the vehicle.

Determining a quantity of the plurality of vehicles expected to be connected to respective charge stations may comprise determining, for each vehicle of the plurality of vehicles, that the vehicle is connected to a respective charge station in response to an indication of the vehicle accepting a pulse of energy from the respective charge station.

According to another broad aspect, the present disclosure describes a system for controlling power distribution to a plurality of vehicles, the system comprising: at least one processor; at least one non-transitory processor-readable storage medium communicatively coupled to the at least one processor; and a communication interface communicatively coupled to the at least one processor, wherein the at least one non-transitory processor-readable storage medium has instructions stored thereon, which when executed by the at least one processor, cause the system to: determine a quantity of the plurality of vehicles expected to be connected to respective charge stations during a first time period; determine a quantity of preventable power usage by restricting charging of respective batteries of the quantity of the plurality of vehicles during the first time period, from a first charge rate outside of the first time period to a second charge rate less than the first charge rate during the first time period; and initiate a charge-restriction event during the first time period.

The instructions which cause the system to determine a quantity of the plurality of vehicles expected to be connected to respective charge stations during a first time period may cause the system to: determine, by the at least one processor, a quantity of vehicles which are presently connected to respective charge stations based on connection data indicative of connection between each vehicle of the plurality of vehicles and a respective charge station.

The instructions which cause the system to determine a quantity of the plurality of vehicles expected to be connected to respective charge stations during a first time period may cause the system to: estimate, by the at least one processor, the quantity of the plurality of vehicles based on historical connection data indicative of connection between each vehicle of the plurality of vehicles and a respective charge station.

The system may further comprise a user interface device, and the instructions may further cause the system to, prior to initiating the charge-restriction event: present, by the user interface device, a user interface for initiation of the charge-restriction event; and process, by the at least one processor, a user input received by the user interface device to initiate the charge-restriction event for the plurality of vehicles, and the instructions which cause the system to initiate the charge-restriction event may cause the system to initiate the charge-restriction event in response to the user input to initiate the charge-restriction event.

The instructions which cause the system to initiate the charge-restriction event may cause the system to initiate the charge-restriction event when: power usage during the first time period is expected to exceed a power distribution threshold during the first time period.

The instructions may further cause the system to restrict charging for at least one vehicle of the plurality of vehicles from the first charge rate to the second charge rate during the charge-restriction event.

The instructions may further cause the system to communicate, to at least one vehicle of the plurality of vehicles, an option to restrict charging from the first charge rate to the second charge rate during the charge-restriction event. The instructions may further cause the system to: determine, by the at least one processor, an expected quantity of vehicles which will accept the option to restrict charging from the first charge rate to the second charge rate. The instructions which cause the system to determine an expected quantity of vehicles which will accept the option to restrict charging may cause the at least one processor to: determine the expected quantity of vehicles which will accept the option to restrict charging based on historical acceptance data which is indicative of previous restricting of charging by vehicles of the plurality of vehicles.

Respective charge rate for a set of vehicles of the plurality of vehicles may be restricted to the second charge rate during the first time period; and the instructions may further cause the system to allocate a respective reward for a respective recipient associated with each vehicle in the set of vehicles. The instructions which cause the system to allocate a respective reward for a respective recipient associated with each vehicle of the set of vehicles may cause the system to: allocate each reward based on a quantity of energy which is saved during the charge-restriction event by the respective vehicle restricting charge rate to the second charge rate instead of enabling charging at the first charge rate.

The system may further comprise a user interface device, wherein an indication of the first time period is receivable via the user interface device.

The instructions may further cause the system to determine the first time period, by determining a peak time period where the quantity of the plurality of vehicles expected to be connected to respective charge stations includes more vehicles than other time periods.

The instructions which cause the system to determine a quantity of the plurality of vehicles expected to be connected to respective charge stations may cause the at least one processor to: for each vehicle of the plurality of vehicles, determine that the vehicle is connected to a respective charge station when a charge port cover of the vehicle is open. The instructions may further cause the system to, for each vehicle in the plurality of vehicles: receive respective charge data for the vehicle for a respective second time period in which the charge port of the vehicle has been open; infer, by the at least one processor, that the vehicle is coupled to a respective charge station if the charge port cover of the vehicle is open and if the respective charge data is indicative of charging of a battery of the vehicle in the respective second time period; and infer, by the at least one processor, that the vehicle is not coupled to the respective charge station if the charge port cover of the vehicle is not open or if the respective charge data is indicative of no charging of the battery of the vehicle in the respective second time period. The instructions may further cause the system to, for each vehicle in the plurality of vehicles: receive respective movement data for the vehicle indicative of movement of the vehicle for a respective second time period in which the charge port cover of the vehicle has been open; infer, by the at least one processor, that the vehicle is coupled to a respective charge station if the charge port cover of the vehicle is open and if the respective movement data is indicative of the vehicle not having moved in the respective second time period; and infer, by the at least one processor, that the vehicle is not coupled to the respective charge station if the charge port cover of the vehicle is not open or if the respective movement data is indicative of the vehicle having moved in the respective second time period. The respective movement data may comprise data selected from a group consisting of: positional data indicating position of the vehicle over time; velocity data indicating movement speed of the vehicle; and inertial data indicating acceleration of the vehicle.

The instructions which cause the system to determine a quantity of the plurality of vehicles expected to be connected to respective charge stations may cause the at least one processor to: for each vehicle of the plurality of vehicles, determine that the vehicle is connected to a respective charge station when the vehicle is proximate to a charge station. The instructions which cause the at least one processor to determine, for each vehicle of the plurality of vehicles, that the vehicle is connected to a respective charge station when the vehicle is proximate to a charge station may cause the at least one processor to: determine that the vehicle is proximate to a charge station when the vehicle is within a threshold distance of the charge station based on position data from a position sensor of the vehicle. The instructions which cause the at least one processor to determine, for each vehicle of the plurality of vehicles, that the vehicle is proximate to a respective charge station may cause the at least one processor to: determine whether the vehicle is communicatively coupled to a wireless network associated with the charge station based on communication data received from a communication interface of the vehicle.

The instructions which cause the system to determine a quantity of the plurality of vehicles expected to be connected to respective charge stations may cause the at least one processor to: determine, for each vehicle of the plurality of vehicles, that the vehicle is connected to a respective charge station in response to an indication of the vehicle accepting a pulse of energy from the respective charge station.

According to another broad aspect, the present disclosure describes a method of inferring whether a vehicle is coupled to a charge station, the method comprising: determining, by at least one processor, whether a charge port cover of the vehicle is open; determining, by the at least one processor, whether the vehicle is positioned proximate the charge station; inferring that the vehicle is coupled to the charge station if the charge port cover of the vehicle is open and if the vehicle is positioned proximate the charge station; and inferring that the vehicle is not coupled to the charge station if the charge port cover of the vehicle is not open or if the vehicle is not positioned proximate the charge station.

Determining whether the vehicle is positioned proximate the charge station may comprise: determining whether the vehicle is within a threshold distance of the charge station based on position data from a position sensor of the vehicle.

Determining whether the vehicle is positioned proximate the charge station may comprise: determining whether the vehicle is communicatively coupled to a wireless network associated with the charge station based on communication data received from a communication interface of the vehicle.

The method may further comprise determining whether a vehicle connection facet of the charge station is in a storage configuration; and inferring that the vehicle is coupled to the charge station may comprise: inferring that the vehicle is coupled to the charge station if the charge port cover of the vehicle is open, if the vehicle is positioned proximate the charge station, and if the vehicle connection facet is not in the storage configuration. Inferring that the vehicle is not coupled to the charge station may comprise: inferring that the vehicle is not coupled to the charge station if the charge port cover of the vehicle is not open or if the vehicle is not positioned proximate the charge station, and if the vehicle connection facet is in the storage configuration.

According to another broad aspect, the present disclosure describes a system for inferring whether a vehicle is coupled to a charge station, the system comprising: at least one processor; and at least one non-transitory processor-readable storage medium communicatively coupled to the at least one processor, wherein the at least one non-transitory processor-readable storage medium has instructions stored thereon, which when executed by the at least one processor, cause the system to: determine, by the at least one processor, whether a charge port cover of the vehicle is open; determine, by the at least one processor, whether the vehicle is positioned proximate the charge station; infer, by the at least one processor, that the vehicle is coupled to the charge station if the charge port cover of the vehicle is open and if the vehicle is positioned proximate the charge station; and infer, by the at least one processor, that the vehicle is not coupled to the charge station if the charge port cover of the vehicle is closed or if the vehicle is not positioned proximate the charge station.

The instructions which cause the at least one processor to determine whether the vehicle is positioned proximate the charge station may cause the at least one processor to: determine whether the vehicle is within a threshold distance of the charge station based on positional data from a position sensor of the vehicle.

The instructions which cause the at least one processor to determine whether the vehicle is positioned proximate the charge station may cause the at least one processor to: determine whether the vehicle is communicatively coupled to a wireless network associated with the charge station based on communication data from a communication interface of the vehicle.

The instructions may further cause the at least one processor to determine whether a vehicle connection facet of the charge station is in a storage configuration; and the instructions which cause the at least one processor to infer that the vehicle is coupled to the charge station may cause the at least one processor to: infer that the vehicle is coupled to the charge station if the charge port cover of the vehicle is open, if the vehicle is positioned proximate the charge station, and if the vehicle connection facet is not in the storage configuration. The instructions which cause the at least one processor to infer that the vehicle is not coupled to the charge station may cause the at least one processor to: infer that the vehicle is not coupled to the charge station if the charge port cover of the vehicle is not open or if the vehicle is not positioned proximate the charge station, and if the vehicle connection facet is in the storage configuration.

The at least one processor and the at least one non-transitory processor-readable storage medium may be carried by the vehicle. The at least one processor and the at least one non-transitory processor-readable storage medium may be remote from the vehicle.

According to another broad aspect, the present disclosure describes a method of inferring whether a vehicle is coupled to a charge station, the method comprising: determining, by at least one processor, whether a charge port cover of the vehicle is open and a time period since the charge port cover has changed between being closed and being open; determining, by the at least one processor, whether the vehicle has received power from the charge station during the time period; inferring that the vehicle is coupled to the charge station if the charge port cover of the vehicle is open and if the vehicle received power from the charge station during the time period; and inferring that the vehicle is not coupled to the charge station if the charge port cover of the vehicle is closed or if the vehicle has not received power from the charge station during the time period.

The method may further comprise determining whether a vehicle connection facet of the charge station is in a storage configuration; and inferring that the vehicle is coupled to the charge station may comprise: inferring that the vehicle is coupled to the charge station if the charge port cover of the vehicle is open, if the vehicle received power from the charge station during the time period, and if the vehicle connection facet is not in the storage configuration Inferring that the vehicle is not coupled to the charge station may comprise: inferring that the vehicle is not coupled to the charge station if the charge port cover of the vehicle is not open or if the vehicle has not received power from the charge station during the time period, and if the vehicle connection facet is in the storage configuration.

According to another broad aspect, the present disclosure describes a system for inferring whether a vehicle is coupled to a charge station, the system comprising: at least one processor; and at least one non-transitory processor-readable storage medium communicatively coupled to the at least one processor, wherein the at least one non-transitory processor-readable storage medium has instructions stored thereon, which when executed by the at least one processor, cause the system to: determine, by the at least one processor, whether a charge port cover of the vehicle is open and a time period since the charge port cover has changed between being closed and being open; determine, by the at least one processor, whether the vehicle has received power from the charge station during the time period; infer that the vehicle is coupled to the charge station if the charge port cover of the vehicle is open and if the vehicle received power from the charge station during the time period; and infer that the vehicle is not coupled to the charge station if the charge port cover of the vehicle is closed or if the vehicle has not received power from the charge station during the time period.

The instructions which cause the at least one processor to determine whether the vehicle has received power from the charge station during the time period may cause the at least one processor to: determine whether the vehicle has received power from the charge station during the time period based on charging data from a charge sensor of the vehicle.

The instructions which cause the at least one processor to determine whether the vehicle has received power from the charge station during the time period may cause the at least one processor to: determine whether the vehicle has received power from the charge station during the time period based on charging data from a power output sensor of the charge station.

The instructions may further cause the at least one processor to determine whether a vehicle connection facet of the charge station is in a storage configuration; and the instructions which cause the at least one processor to infer that the vehicle is coupled to the charge station may cause the at least one processor to: infer that the vehicle is coupled to the charge station if the charge port cover of the vehicle is open, if the vehicle received power from the charge station during the time period, and if the vehicle connection facet is not in the storage configuration. The instructions which cause the at least one processor to infer that the vehicle is not coupled to the charge station may cause the at least one processor to: infer that the vehicle is not coupled to the charge station if the charge port cover of the vehicle is not open or if the vehicle has not received power from the charge station during the time period, and if the vehicle connection facet is in the storage configuration.

According to another broad aspect, the present disclosure describes a method of inferring whether a vehicle is coupled to a charge station, the method comprising: determining, by at least one processor, whether a charge port cover of the vehicle is open and a time period since the charge port cover has changed between being closed and being open; determining, by the at least one processor, whether the vehicle has moved during the time period based on movement data from the vehicle; inferring, by the at least one processor, that the vehicle is coupled to the charge station if the charge port cover of the vehicle is open and if the vehicle has not moved during the time period; and inferring, by the at least one processor, that the vehicle is not coupled to the charge station if the charge port of the vehicle is closed or if the vehicle has moved during the time period.

The movement data may comprise data selected from a group consisting of: positional data indicating position of the vehicle over time; velocity data indicating movement speed of the vehicle; and inertial data indicating acceleration of the vehicle.

The method may further comprise determining whether a vehicle connection facet of the charge station is in a storage configuration; and inferring that the vehicle is coupled to the charge station may comprise: inferring that the vehicle is coupled to the charge station if the charge port cover of the vehicle is open, if the vehicle has not moved during the time period, and if the vehicle connection facet is not in the storage configuration. Inferring that the vehicle is not coupled to the charge station may comprise: inferring that the vehicle is not coupled to the charge station if the charge port cover of the vehicle is not open, if the vehicle has moved during the time period, and if the vehicle connection facet is in the storage configuration.

According to another broad aspect, the present disclosure describes a system for inferring whether a vehicle is coupled to a charge station, the system comprising: at least one processor; and at least one non-transitory processor-readable storage medium communicatively coupled to the at least one processor, wherein the at least one non-transitory processor-readable storage medium has instructions stored thereon, which when executed by the at least one processor, cause the system to: determine, by the at least one processor, whether a charge port cover of the vehicle is open and a time period since the charge port cover has changed between being closed and being open; determine, by the at least one processor, whether the vehicle has moved during the time period based on movement data from the vehicle; infer, by the at least one processor, that the vehicle is coupled to the charge station if the charge port cover of the vehicle is open and if the vehicle has not moved during the time period; and infer, by the at least one processor, that the vehicle is not coupled to the charge station if the charge port cover of the vehicle is closed or if the vehicle has moved during the time period.

The movement data may comprise data selected from a group consisting of: positional data indicating position of the vehicle over time; velocity data indicating movement speed of the vehicle; and inertial data indicating acceleration of the vehicle.

The instructions may further cause the at least one processor to determine whether a vehicle connection facet of the charge station is in a storage configuration; and the instructions which cause the at least one processor to infer that the vehicle is coupled to the charge station may cause the at least one processor to: infer that the vehicle is coupled to the charge station if the charge port cover of the vehicle is open, if the vehicle has not moved during the time period, and if the vehicle connection facet is not in the storage configuration. The instructions which cause the at least one processor to infer that the vehicle is not coupled to the charge station may cause the at least one processor to: infer that the vehicle is not coupled to the charge station if the charge port cover of the vehicle is not open or if the vehicle has moved during the time period, and if the vehicle connection facet is in the storage configuration.

According to another broad aspect, the present disclosure describes a method of determining whether a vehicle is coupled to a charge station, the method comprising: outputting, by the charge station, a pulse of power to be received by the vehicle; measuring energy expended by outputting the pulse of power; if the energy expended is over an energy threshold, determining that the vehicle is coupled to the charge station; and if the energy expended is not over the energy threshold, determining that the vehicle is not coupled to the charge station.

According to another broad aspect, the present disclosure describes a system for determining whether a vehicle is coupled to a charge station, the system comprising: at least one processor; and at least one non-transitory processor-readable storage medium communicatively coupled to the at least one processor, wherein the at least one non-transitory processor-readable storage medium has instructions stored thereon, which when executed by the at least one processor, cause the system to: measure energy expended by a pulse of power from the charge station to the vehicle; if the energy expended is over an energy threshold, determining that the vehicle is coupled to the charge station; and if the energy expended is not over the energy threshold, determining that the vehicle is not coupled to the charge station.

The at least one processor and the at least one non-transitory processor-readable storage medium may be carried by the charge station; and the instructions may further cause the charge station to output the pulse of power.

The at least one processor and the at least one non-transitory processor-readable storage medium may be carried by the vehicle.

The at least one processor and the at least one non-transitory processor-readable storage medium may be carried by an intermediate device operable to be coupled between the vehicle and the charge station, where power provided from the charge station to the vehicle is provided through the intermediate device.

According to another broad aspect, the present disclosure describes a method of inferring whether a charge station is coupled to a vehicle, the method comprising: determining, by at least one processor, whether a vehicle connection facet of the charge station is in a storage configuration; determining, by the at least one processor, whether the vehicle is positioned proximate the charge station; inferring that the charge station is coupled to the vehicle if the vehicle connection facet is not in the storage configuration and if the vehicle is positioned proximate the charge station; and inferring that the charge station is not coupled to the vehicle if the vehicle connection facet is in the storage configuration or if the vehicle is not positioned proximate the charge station.

Determining whether the vehicle is positioned proximate the charge station may comprise: determining whether the vehicle is within a threshold distance of the charge station based on position data from a position sensor of the vehicle.

Determining whether the vehicle is positioned proximate the charge station may comprise: determining whether the vehicle is communicatively coupled to a wireless network associated with the charge station based on communication data received from a communication interface of the vehicle.

The method may further comprise determining whether a charge port cover of the vehicle is open; and inferring that the charge station is coupled to the vehicle may comprise: inferring that the charge station is coupled to the vehicle if the vehicle connection facet is not in the storage configuration, if the vehicle is positioned proximate the charge station, and if the charge port cover of the vehicle is open. Inferring that the charge station is not coupled to the vehicle may comprise: inferring that the charge station is not coupled to the vehicle if the vehicle connection facet is in the storage configuration or if the vehicle is not positioned proximate the charge station, and if the charge port cover of the vehicle is not open.

According to another broad aspect, the present disclosure describes a system for inferring whether a charge station is coupled to a vehicle, the system comprising: at least one processor; and at least one non-transitory processor-readable storage medium communicatively coupled to the at least one processor, wherein the at least one non-transitory processor-readable storage medium has instructions stored thereon, which when executed by the at least one processor, cause the system to: determine, by the at least one processor, whether a vehicle connection facet of the charge station is in a storage configuration; determine, by the at least one processor, whether the vehicle is positioned proximate the charge station; infer, by the at least one processor, that the charge station is coupled to the vehicle if the vehicle connection facet is not in the storage configuration and if the vehicle is positioned proximate the charge station; and infer, by the at least one processor, that the charge station is not coupled to the vehicle if the vehicle connection facet is in the storage configuration or if the vehicle is not positioned proximate the charge station.

The instructions which cause the at least one processor to determine whether the vehicle is positioned proximate the charge station may cause the at least one processor to: determine whether the vehicle is within a threshold distance of the charge station based on positional data from a position sensor of the vehicle.

The instructions which cause the at least one processor to determine whether the vehicle is positioned proximate the charge station may cause the at least one processor to: determine whether the vehicle is communicatively coupled to a wireless network associated with the charge station based on communication data from a communication interface of the vehicle.

The instructions may further cause the at least one processor to determine whether a charge port cover of the vehicle is open; and the instructions which cause the at least one processor to infer that the charge station is coupled to the vehicle may cause the at least one processor to: infer that the charge station is coupled to the vehicle if the vehicle connection facet is not in the storage configuration, if the vehicle is positioned proximate the charge station, and if the charge port cover of the vehicle is open. The instructions which cause the at least one processor to infer that the charge station is not coupled to the vehicle may cause the at least one processor to: infer that the charge station is not coupled to the vehicle if the vehicle connection facet is in the storage configuration or if the vehicle is not positioned proximate the charge station, and if the charge port cover of the vehicle is not open.

The at least one processor and the at least one non-transitory processor-readable storage medium may be carried by the vehicle. The at least one processor and the at least one non-transitory processor-readable storage medium may be remote from the vehicle.

According to another broad aspect, the present disclosure describes a method of inferring whether a charge station is coupled to a vehicle, the method comprising: determining, by at least one processor, whether a vehicle connection facet of the charge station is in a storage configuration and a time period since the vehicle connection facet of the charge station has changed between not being in the storage configuration and being in the storage configuration; determining, by the at least one processor, whether the charge station has provided power to the vehicle during the time period; inferring that the charge station is coupled to the vehicle if the vehicle connection facet is not in the storage configuration and if the charge station has provided power to the vehicle during the time period; and inferring that the charge station is not coupled to the vehicle if the vehicle connection facet is in the storage configuration or if the charge station has not provided power to the vehicle during the time period.

The method may further comprise determining whether a charge port cover of the vehicle is open; and inferring that the charge station is coupled to the vehicle may comprise: inferring that the charge station is coupled to the vehicle if the vehicle connection facet is not in the storage configuration, if the charge station has provided power to the vehicle during the time period, and if the charge port cover of the vehicle is open. Inferring that the charge station is not coupled to the vehicle may comprise: inferring that the charge station is not coupled to the vehicle if the vehicle connection facet is in the storage configuration or if the charge station has not provided power to the vehicle during the time period, and if the charge port cover of the vehicle is not open.

According to another broad aspect, the present disclosure describes a system for inferring whether a charge station is coupled to a vehicle, the system comprising: at least one processor; and at least one non-transitory processor-readable storage medium communicatively coupled to the at least one processor, wherein the at least one non-transitory processor-readable storage medium has instructions stored thereon, which when executed by the at least one processor, cause the system to: determine, by the at least one processor, whether a vehicle connection facet of the charge station is in a storage configuration and a time period since the vehicle connection facet of the charge station has changed between not being in the storage configuration and being in the storage configuration; determine, by the at least one processor, whether the charge station has provided power to the vehicle during the time period; infer that the vehicle is coupled to the charge station if the vehicle connection facet is not in the storage configuration and if the charge station has provided power to the vehicle during the time period; and infer that the vehicle is not coupled to the charge station if the vehicle connection facet is in the storage configuration or if the charge station has not provided power to the vehicle during the time period.

The instructions which cause the at least one processor to determine whether the charge station has provided power to the vehicle during the time period may cause the at least one processor to: determine whether the vehicle has received power from the charge station during the time period based on charging data from a charge sensor of the vehicle.

The instructions which cause the at least one processor to determine whether the charge station has provided power to the vehicle during the time period may cause the at least one processor to: determine whether the charge station has provided power to the vehicle during the time period based on charging data from a power output sensor of the charge station.

The instructions may further cause the at least one processor to determine whether a charge port cover of the vehicle is open; and the instructions which cause the at least one processor to infer that the charge station is coupled to the vehicle may cause the at least one processor to: infer that the charge station is coupled to the vehicle if the vehicle connection facet is not in the storage configuration, if the charge station has provided power to the vehicle during the time period, and if the charge port cover of the vehicle is open. The instructions which cause the at least one processor to infer that the charge station is not coupled to the vehicle may cause the at least one processor to: infer that the charge station is not coupled to the vehicle if the vehicle connection facet is in the storage configuration or if the charge station has not provided power to the vehicle during the time period, and if the charge port cover of the vehicle is not open.

According to another broad aspect, the present disclosure describes a method of inferring whether a charge station is coupled to a vehicle, the method comprising: determining, by at least one processor, whether a vehicle connection facet of the charge station is in a storage configuration and a time period since the vehicle connection facet of the charge station has changed between not being in the storage configuration and being in the storage configuration; determining, by the at least one processor, whether the vehicle has moved during the time period based on movement data from the vehicle; inferring, by the at least one processor, that the charge station is coupled to the vehicle if the vehicle connection facet is not in the storage configuration and if the vehicle has not moved during the time period; and inferring, by the at least one processor, that the charge station is not coupled to the vehicle if the vehicle connection facet is in the storage configuration or if the vehicle has moved during the time period.

The movement data may comprise data selected from a group consisting of: positional data indicating position of the vehicle over time; velocity data indicating movement speed of the vehicle; and inertial data indicating acceleration of the vehicle.

The method may further comprise determining whether a charge port cover of the vehicle is open; and inferring that the charge station is coupled to the vehicle may comprise: inferring that the charge station is coupled to the vehicle if the vehicle connection facet is not in the storage configuration, if the vehicle has not moved during the time period, and if the charge port cover of the vehicle is open. Inferring that the charge station is not coupled to the vehicle may comprise: inferring that the charge station is not coupled to the vehicle if the vehicle connection facet is in the storage configuration or if the vehicle has moved during the time period, and if the charge port cover of the vehicle is not open.

According to another broad aspect, the present disclosure describes a system for inferring whether a charge station is coupled to a vehicle, the system comprising: at least one processor; and at least one non-transitory processor-readable storage medium communicatively coupled to the at least one processor, wherein the at least one non-transitory processor-readable storage medium has instructions stored thereon, which when executed by the at least one processor, cause the system to: determine, by the at least one processor, whether a vehicle connection facet of the charge station is in a storage configuration and a time period since the vehicle connection facet of the charge station has changed between not being in the storage configuration and being in the storage configuration; determine, by the at least one processor, whether the vehicle has moved during the time period based on movement data from the vehicle; infer, by the at least one processor, that the charge station is coupled to the vehicle if the vehicle connection facet is not in the storage configuration and if the vehicle has not moved during the time period; and infer, by the at least one processor, that the vehicle is not coupled to the charge station if the vehicle connection facet is in the storage configuration or if the vehicle has moved during the time period.

The movement data may comprise data selected from a group consisting of: positional data indicating position of the vehicle over time; velocity data indicating movement speed of the vehicle; and inertial data indicating acceleration of the vehicle.

The instructions may further cause the at least one processor to determine whether a charge port cover of the vehicle is open; and the instructions which cause the at least one processor to infer that the charge station is coupled to the vehicle may cause the at least one processor to: infer that the charge station is coupled to the vehicle if the vehicle connection facet is not in the storage configuration, if the vehicle has not moved during the time period, and if the charge port cover of the vehicle is open. The instructions which cause the at least one processor to infer that the charge station is not coupled to the vehicle may cause the at least one processor to: infer that the charge station is not coupled to the vehicle if the vehicle connection facet is in the storage configuration or if the vehicle has moved during the time period, and if the charge port cover of the vehicle is not open.

BRIEF DESCRIPTION OF THE DRAWINGS

Exemplary non-limiting embodiments are described with reference to the accompanying drawings in which.

DETAILED DESCRIPTION

The present disclosure details systems, methods, and devices for controlling or influencing charging patterns for vehicle batteries.

Figure 1:
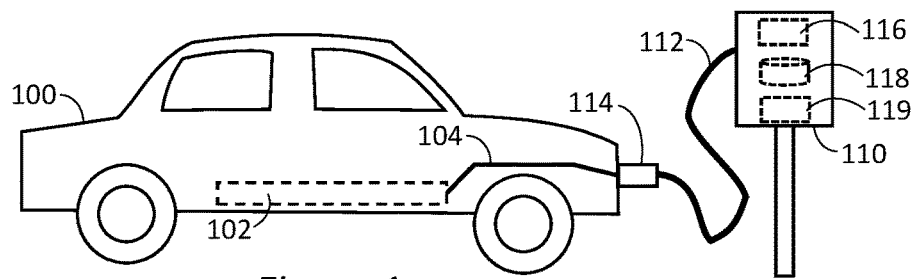
FIGS. 1, 2, 3, and 4 are schematic diagrams of exemplary setups where a vehicle battery is connected to a charge station to charge.

FIG. 1 is a schematic diagram of an exemplary charging system. FIG. 1 illustrates a vehicle 100, having a battery 102, which can receive electrical energy (power) from an external power source by electrical pathway 104. "Electrical pathway" (sometimes shortened to "pathway") as used throughout this disclosure refers to at least one electrically conductive component which provides electrical coupling, such as wires, conductive traces, contacts, or any other appropriate electrically conductive component. An electrical pathway can be a single electrically conductive component (e.g. a single wire), but this is not necessarily the case. For example, an electrical pathway could include a plurality of wires, conductive traces, or contacts. Battery 102 stores received energy.

In the example of FIG. 1, the external power source is charge station 110. Charge station 110 provides power to the vehicle 100 in a format which can be received by vehicle 100 to charge battery 102. In the illustrated example, charge station 110 outputs power by electrical pathway 112 (illustrated as at least one wire) to an electrical couple 114. Electrical couple 114 couples to vehicle 100 (e.g. by a coupling interface such as a plug), to provide a pathway for energy to flow from charge station 110 to battery 102. Charge station 110 receives energy for example from a power grid, solar panels, or any other appropriate source of energy, and converts this energy to a format (e.g. voltage and amperage) acceptable to vehicle 100. Charge station 110 could for example be installed at the vehicle owner's residence. As other examples, charge station 110 could be installed in a public location such as a workplace, parking lot, shopping center, rest stop, or any other appropriate location. Additionally, electrical pathway 112 is not limited to being used to provide power to the vehicle. Electrical pathway 112 could also be used for communication of signals between vehicle 100 and charge station 110. To this end, electrical pathway 112 can include a plurality of pathways, such as at least one pathway for provision of power to battery 102, and at least one other pathway for transmission of communication signals between vehicle 100 and charge station 110.

FIG. 1 also illustrates charge station 110 as including at least one processor 116, at least one non-transitory processor-readable storage medium 118, and at least one sensor 119. Charge station 110 in FIG. 1 is a "smart charge station", in that charge station 110 can do more than just provide energy to vehicle 100. For example, the at least one processor 116 can monitor energy provided by charge station 110, monitor and/or analyze a state of connection of charge station 110 to vehicle 100, and/or collect or prepare charge data. The at least one processor 116 can prepare charge data including any of energy flow rate (power), amperage, voltage, time or duration of energy transfer, waveforms representing a combination of attributes, or any other appropriate data. The at least one processor 116 can construct, format, process, or compress the data as needed, or the at least one processor 116 can prepare raw data. Collection of raw data can be performed using any appropriate hardware, such as the at least one sensor 119. The at least one sensor 119 could include, as non-limiting examples, voltage or current detection circuits, or any other appropriate hardware that can sense electrical attributes. The at least one sensor 119 could also include any appropriate sensor for collecting data regarding a state of electrical couple 114 (couple data). For example, the at least one sensor 119 could include a proximity sensor which detects whether the electrical couple 114 is properly stowed away, which is indicative of the electrical couple not being connected to vehicle 100 (e.g., sensor 119 could include a depression switch or contact circuit which is triggered by the electrical couple being stowed away). As another example, the at least one sensor 119 could include a proximity sensor which detects whether the electrical couple 114 is connected to vehicle 100 (e.g. a depression switch or electrical contact circuit which is triggered by the electrical couple being connected to vehicle 100).

Collected data can be stored in the at least one non-transitory processor-readable storage medium 118. Further, the at least one non-transitory processor-readable storage medium 118 can store instructions which, when executed by the at least one processor 116, cause the at least one processor 116 to prepare data (such as charge data or sensor data).

In some implementations, charge station 110 can include at least one communication interface (such as wireless communication hardware, or wired communication hardware). For example, charge station 110 could couple to a vehicle owner's wireless (or wired) network. Charge station 110 can communicate data, such as charge data or couple data, over the network. Such an implementation is discussed in more detail later with reference to FIG. 3.

Figure 2:
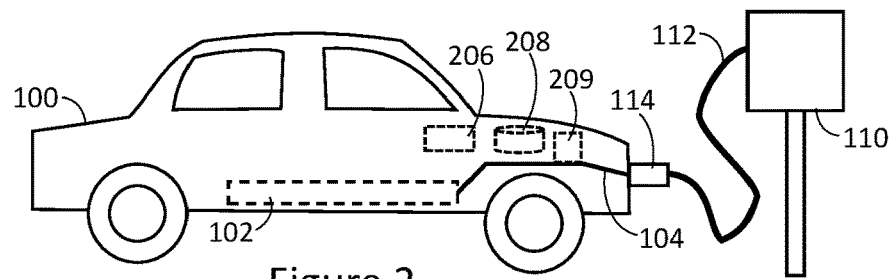

FIG. 2 is a schematic view of an exemplary charging system similar to that illustrated in FIG. 1. Description of elements in FIG. 1 applies to similarly numbered elements in FIG. 2. FIG. 2 includes a vehicle 100 and charge station 110 similar to as described in FIG. 1. One difference between FIG. 2 and FIG. 1 is that in FIG. 2, vehicle 100 is shown as including at least one processor 206, at least one non-transitory processor-readable storage medium 208, and at least one sensor 209. The at least one processor 206 is similar to the at least one processor 116, in that the at least one processor 206 can similarly monitor energy provided by charge station 110, monitor and/or analyze a state of connection of charge station 110 to vehicle 100, and/or collect or prepare charge data. The at least one non-transitory processor-readable storage medium 208 is similar to the at least one non-transitory processor-readable storage medium 118, in that the at least one non-transitory processor readable storage medium 208 can similarly store instructions or data (such as charge data or couple data). The at least one sensor 209 is similar to the at least one sensor 119, in that the at least one sensor 209 can similarly monitor charging and collect charge data, and/or can collect couple data regarding the state of electrical couple 114. FIG. 2 highlights that collection and/or analysis of charge data and/or couple data can occur in vehicle 100 (as opposed to in charge station 110 as in FIG. 1). However, this does not preclude charge station 110 in FIG. 2 from being a "smart charge station" similar to as in FIG. 1, as appropriate for a given application. For example, analysis of charge data or couple data could be performed by the at least one processor 206, and transmitted to charge station 110 for review by a vehicle owner (or for further transmission, such as to a remote server). Such a transmission could occur over electrical pathway 112, or could occur via another pathway (such as wireless communication hardware in vehicle 100). As another example, data collection could occur in vehicle 100 by the at least one sensor 209, with raw data being transmitted to the at least one processor 116 for preparation or analysis. Vehicle 100 in FIG. 1 could also include at least one processor 206 and at least one non-transitory processor-readable storage medium 208, as appropriate for a given application.

Figure 3:
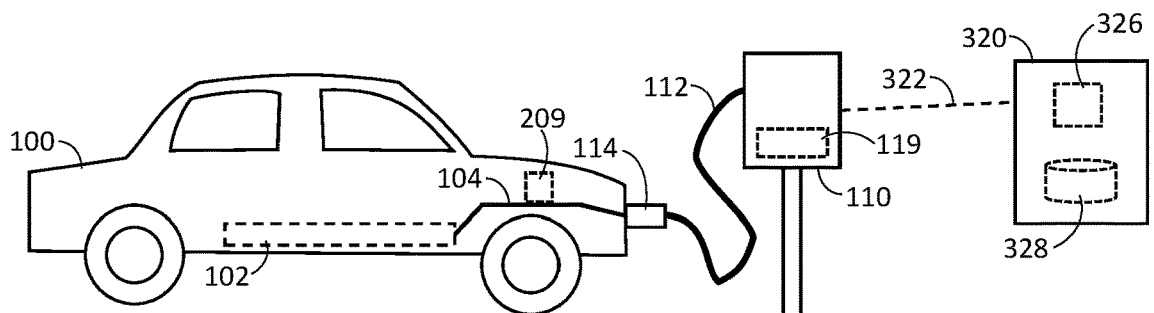

FIG. 3 is a schematic view of an exemplary charging system similar to that illustrated in FIGS. 1 and 2. Description of elements in FIGS. 1 and 2 applies to similarly numbered elements in FIG. 3. FIG. 3 includes a vehicle 100 and charge station 110 similar to as described in FIGS. 1 and 2. One difference between FIG. 3 and FIGS. 1 and 2 is that in FIG. 3, a remote device 320 is illustrated (such as a remote server). Remote device 320 includes at least one processor 326 similar to the at least one processor 116 and the at least one processor 206, in that the at least one processor 326 can similarly analyze/process data such as charge data and/or couple data. Remote device 320 includes at least one non-transitory processor-readable storage medium 328 which is similar to the at least one non-transitory processor-readable storage medium 118 and the at least one non-transitory processor-readable storage medium 208, in that the at least one non-transitory processor readable storage medium 328 can similarly store instructions or data (such as charge data or couple data). FIG. 3 illustrates the at least one sensor 119 and the at least one sensor 209, which can monitor charging and/or collect data (such as charge data or couple data) similar to as discussed above with reference to FIGS. 1 and 2. In some implementations, collected data can be transmitted from charge station 110 to remote device 320 by communication interface 322. Communication interface 322 can for example be a wired connection between charge station 110 and remote device 320. As another example, communication interface 322 can be a wireless connection between charge station 110 and remote device 320. Further, communication interface 322 can be direct as illustrated, or indirect. For example, charge station 110 can connect to a wireless network of a vehicle owner's home (such as to a network router or hub), which in turn is connected to the internet. Remote device 320 can communicate with the home wireless network by the internet.

Although not explicitly illustrated, communication interface 322 can also be between vehicle 100 and remote device 320. For example, vehicle 100 could communicate over a wireless or wired network at the home of the vehicle owner, such that data does not need to be communicated through charge station 110.

Exemplary remote devices 320 could include a vehicle owner's personal computer, smartphone, or other device, or independently managed devices such as a data server of the vehicle manufacturer.

FIG. 3 highlights that analysis of data (such as couple data or charge data) can occur remotely from vehicle 100 and charge station 110. However, this does not preclude charge station 110 in FIG. 3 from having at least one processor 116 and at least one non-transitory processor-readable storage medium 118 as in FIG. 1, nor does it preclude vehicle 100 from having at least one processor 206 and at least one non-transitory processor-readable storage medium 208 as in FIG. 2, as appropriate for a given application. For example, preparation of data could be performed by the at least one processor 116 in FIG. 1 or the at least one processor 206 in FIG. 2, said data subsequently being transmitted to remote device 320. Analysis of said data can then be performed by the at least one processor 326 of remote device 320.

Figure 4:
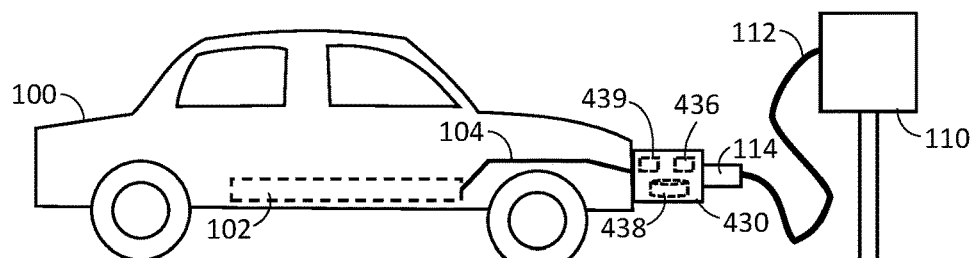

FIG. 4 is a schematic view of an exemplary charging system similar to that illustrated in FIGS. 1, 2, and 3. Description of elements in FIGS. 1, 2, and 3 applies to similarly numbered elements in FIG. 4. FIG. 4 includes a vehicle 100 and charge station 110 similar to as described in FIGS. 1, 2, and 3. One difference between FIG. 4 and FIGS. 1, 2, and 3 is that in FIG. 4, an intermediate device 430 is illustrated. Intermediate device 430 includes at least one processor 436 similar to the at least one processor 116, the at least one processor 206, and the at least one processor 326, in that the at least one processor 436 can similarly monitor energy provided by charge station 110, monitor and/or analyze a state of connection of charge station 110 to vehicle 100, and/or collect or prepare charge data. Intermediate device 430 includes at least one non-transitory processor-readable storage medium 438 which is similar to the at least one non-transitory processor-readable storage medium 118, the at least one non-transitory processor-readable storage medium 208, and the at least one non-transitory processor-readable storage medium 328, in that the at least one non-transitory processor readable storage medium 438 can similarly store instructions or data (such as charge data or couple data). Intermediate device 430 includes at least one sensor 439 which is similar to the at least one sensor 119 and the at least one sensor 209, in that the at least one sensor 439 can similarly monitor charging and collect charge data, and/or can collect couple data regarding the state of electrical couple 114.

Intermediate device 430 is positioned intermediate to vehicle 100 and charge station 110 (illustrated as being coupled between electrical couple 114 and vehicle 100), such that energy provided by charge station 110 to vehicle 100 passes through intermediate device 430. In this way, the at least one sensor 439 can monitor energy provided to vehicle 100, and collect charge data. The at least one sensor 439 can include any appropriate sensors or hardware to enable this, such as voltage or current sensing circuits. This charge data can be analyzed by the at least one processor 436, or the at least one sensor 439 can provide the charge data to another device for analysis (in some implementations after some preparation by the at least one processor 436, such as compression for formatting). For example, intermediate device 430 could also include a communication interface, through which charge data is transmitted (e.g. to remote device 320 for analysis of vehicle battery health as discussed in detail with reference to FIG. 5). Such a communication interface could be wireless, or could be wired (e.g. through electrical pathway 112).

The at least one sensor 439 could include a proximity sensor which detects whether the electrical couple 114 is connected to vehicle 100. For example, the at least one sensor 439 could include a depression switch which is pressed in when the electrical couple is connected to vehicle 100. As another example, the at least one sensor 439 could include an electrical contact circuit which is closed when the electrical couple is connected to vehicle 100. Any other appropriate proximity or connection sensor could be included, which is indicative of the electrical couple 114 being connected to vehicle 100.

The inclusion of intermediate device 430 does not preclude charge station 110 from including at least one processor 116 or at least one non-transitory processor-readable storage medium 118 as in FIG. 1, nor does it preclude vehicle 100 from including at least one processor 206 or at least one non-transitory processor-readable storage medium 208 as in FIG. 2. However, intermediate device 430 provides a means for collecting, preparing, analyzing, and/or transmitting data (such as charge data or couple data), and is particularly useful when other elements of the system lack such functionality. For example, intermediate device 430 is particularly useful for retrofitting systems which lack the ability to collect, prepare, analyze, and/or transmit charge or couple data.

The concept of "energy capacity of a battery" (also called "battery energy capacity" or sometimes "battery capacity") is discussed throughout this application. Such battery energy capacity can refer to the maximum possible amount of energy a battery can store ("total energy capacity"). However, some batteries degrade faster when they are charged to the total energy capacity, and thus some batteries (or battery charging systems) may be setup to only charge to a limited amount of stored energy less than the total energy capacity (e.g. they may only charge to 80% of the total energy capacity). Similarly, some batteries degrade faster when charge thereof is depleted below a minimum charge degradation threshold (e.g. 10% of the total energy capacity), and thus some batteries may be setup to only be usable when charge thereof is above the minimum charge degradation threshold (e.g. they may only be usable above 10% of total energy capacity). In such cases where energy storage ranges for a battery are limited to prevent premature battery degradation, "energy capacity" of a battery may refer to "usable energy capacity" of the battery (the capacity within which the battery can be charge and discharged), instead of the total energy capacity of the battery. In the example where a battery or charging system is setup to only charge to 80% of the total energy capacity, "energy capacity" of the battery may refer to the "usable energy capacity" of the battery (i.e. up to 80% of the total energy capacity of the battery). In the example where a battery or charging system is setup to only be usable to 10% of the total energy capacity of the battery, "energy capacity" of the battery may also refer to the "usable energy capacity" of the battery (i.e. 10% of the total energy capacity of the battery and above). In an example where a battery or charging system is setup to only charge to 80% of the total energy capacity of the battery, and to only be usable to 10% of the total energy capacity of the battery, "energy capacity" of the battery may refer to "usable energy capacity" of the battery (i.e. 10% of the total energy capacity of the battery up to 80% of the total energy capacity of the battery). One skilled in the art will appreciate that the examples of 10% and 80% mentioned above are merely exemplary, and the exact usable limits of energy capacity for a given battery can be determined and set as appropriate for a given application. One skilled in the art will also appreciate that, unless context dictates otherwise, uses of the terms "energy capacity of a battery", "battery energy capacity", "battery capacity", or similar can be applicable to total energy capacity or usable energy capacity.

Throughout this disclosure, reference is made to providing power (or energy) to a battery of a vehicle (or batteries of vehicles), to charge said battery (or batteries). Reference to charging a "vehicle" encompasses the same concept, such that charging a vehicle means charging a battery of the vehicle.

Figure 5:
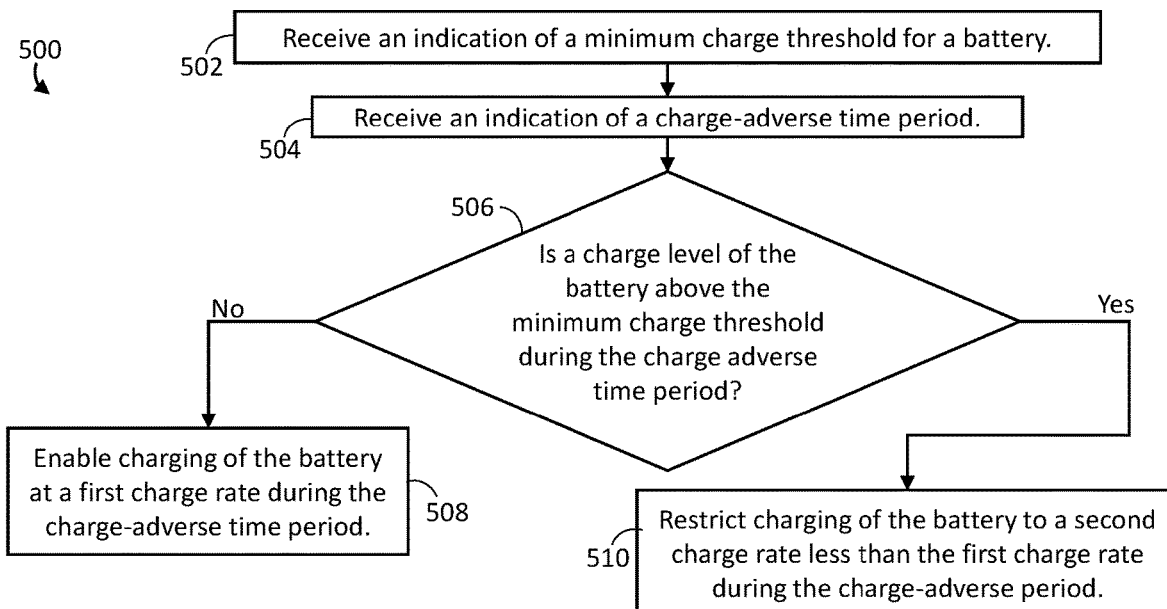
FIGS. 5, 6, and 7 are flowchart diagrams which illustrate methods of controlling charging of a vehicle.

FIG. 5 is a flowchart diagram which illustrates an exemplary method 500 of controlling or influencing charging of any of the batteries described herein. Method 500 as illustrated includes acts 502, 504, 506, 508, and 510. One skilled in the art will appreciate that additional acts could be added, acts could be removed, or acts could be reordered as appropriate for a given application. The discussion of FIG. 5 is applicable to any of vehicle 100, charge station 110, remote device 320, or intermediate device 430 as discussed with reference to any of FIGS. 1, 2, 3, and 4. The description is also applicable to any appropriate battery charging setup or system. Any such vehicles, charge stations, devices, setups, or systems could include a control unit operable to perform the acts of method 500. With reference to the examples illustrated in FIGS. 1, 2, 3, and 4, any of the at least one processor 116, 206, 326, or 436 could be such a control unit. Further, said control unit can be operated in accordance with instructions on at least one non-transitory processor-readable storage medium to perform the acts of method 500. With reference to the examples illustrated in FIGS. 1, 2, 3, and 4, any of the at least one non-transitory processor-readable storage medium 118, 208, 328, or 438 could have instructions stored thereon, which when executed by a respective at least one processor cause the respective vehicle, charge station, device, setup, or system to perform the method 500.

In act 502, an indication of a minimum charge threshold $Min_T$ for a battery is received. In some cases, this minimum charge threshold could be a minimum charge degradation threshold $Min_D$ as discussed above. In some cases, the minimum charge threshold can be decided and input by a vehicle user (or owner). For example, a vehicle user may wish to, whenever possible, have a certain minimum amount of charge in the battery to enable a certain distance of travel. As one example, a vehicle user may set the minimum charge threshold at 50% of the battery capacity.

An indication of a minimum charge threshold $Min_T$ can be received by any appropriate means, such as those discussed later with reference to FIGS. 14 and 15. In some implementations, a user can manually input at least one indication of a minimum charge threshold $Min_T$, by an appropriate input device. For example, any of vehicle 100, charge station 110, remote device 320, or intermediate device 430 could have a user interface device (such as controls buttons, dials, a touchscreen interface, or any other appropriate user input device), which a vehicle user can use to input an indication of minimum charge threshold $Min_T$. In other implementations, a minimum charge threshold $Min_T$ could be received from a manufacturer of a vehicle or vehicle battery (e.g. in the case where minimum charge threshold $Min_T$ is set as the minimum charge degradation threshold $Min_D$). For example, a vehicle manufacturer could pre-load a minimum charge threshold $Min_T$ on a non-transitory processor-readable storage medium of vehicle 100 (or a charge station 110, remote device 320, or intermediate device 430 intended to be used with vehicle 100). As another example, a provider of charge station 110, remote device 320, or intermediate device 430 could come pre-loaded with a default minimum charge threshold $Min_T$.

In act 504, an indication of a charge-adverse time period is received. Throughout this disclosure, the term "charge-adverse time period" refers to a period of time during which charging is less desirable than other times.

For example, in some locations monetary costs for electricity (power) are higher during certain time periods. In the City of Toronto for example, three pricing periods exist for certain customers: Off-Peak (7 PM to 7 AM Monday to Friday, and All-day Saturday and Sunday), Mid-Peak (7 AM to 11 AM and 5 PM to 7 PM Monday to Friday), and On-Peak (11 AM to 5 PM Monday to Friday). Electricity provided during On-Peak periods is more expensive than electricity provided during Mid-Peak periods, and electricity provided during Mid-Peak periods is more expensive than electricity provided during Off-Peak periods. In this sense, On-Peak periods are "charge-adverse time periods" compared to Mid-Peak and Off-Peak periods. Further, Mid-Peak periods are "charge-adverse time periods" compared to Off-Peak periods. One skilled in the art will appreciate that the described charge-adverse time periods are merely exemplary, and can differ for different regions and different electricity providers. To save money, a vehicle user may wish to delay charging of their vehicle until a non-charge-adverse time period.

As another example, available energy for charging may differ depending on time of day. A vehicle user may charge their vehicle battery at a location with solar panels (e.g. their residence may be equipped with solar panels). Such solar panels only collect energy during daytime. As such, charging a vehicle overnight may risk depleting energy stored in a battery for the solar panel system. On the other hand, the solar panel system may collect more energy during daytime than can be stored in the battery for the solar system. In this example, nighttime can be a "charge-adverse time period".

An indication of a charge-adverse time period can be received by any appropriate means, such as those discussed later with reference to FIGS. 14 and 15. In some implementations, a user can manually input at least one indication of at least one charge-adverse time period, by an appropriate input device. For example, any of vehicle 100, charge station 110, remote device 320, or intermediate device 430 could have a user interface device (such as controls buttons, dials, a touchscreen interface, or any other appropriate user input device), which a vehicle user can use to input an indication of a charge-adverse time period. As another example, any of vehicle 100, charge station 110, remote device 320, or intermediate device 430 could communicate with a peripheral device (such as a smartphone, PDA, or other device), which a vehicle user can use to input an indication of a charge-adverse time period.

In other implementations, at least one indication of at least one charge-adverse time period can be received from a source other than the vehicle user. For example, an electricity provider may provide a schedule of charge-adverse time periods, which can be accessed by at least one processor of any of vehicle 100, charge station 110, remote device 320, or intermediate device 430 to automatically receive at least one indication of at least one charge-adverse time period. As another example, a schedule of charge-adverse time-periods (e.g. delineated by region) can be made available by a manufacturer or provider of any of vehicle 100, charge station 110, remote device 320, or intermediate device 430, to be accessed by the same. As yet another example, a provider of charge-management software for any of vehicle 100, charge station 110, remote device 320, or intermediate device 430 could provide such a schedule of charge-adverse time periods. In such examples, said schedule or schedules could be available via the internet or other network, for download by any of vehicle 100, charge station 110, remote device 320, or intermediate device 430 (via intermediate servers, as appropriate). In some implementations, any of vehicle 100, charge station 110, remote device 320, or intermediate device 430 could come pre-loaded with at least one indication of at least one charge-adverse time period (e.g. a schedule of charge-adverse time periods can be stored on a non-transitory processor-readable storage medium of any of vehicle 100, charge station 110, remote device 320, or intermediate device 430).

In act 502 and act 504, "receiving an indication of a minimum charge threshold for a battery" and "receiving an indication of a charge-adverse time period" do not necessarily require the respective indication to come directly from a vehicle user or from an external source immediately prior to act 506 (discussed below). For example, at least one respective indication can be stored in a non-transitory processor-readable storage medium of vehicle 100, charge station 110, remote device 320, or intermediate device 430 in advance (e.g. at least one respective indication can be input or downloaded during system setup, or at regular update intervals). When it comes time to make decisions as in act 506 discussed below, the at least one respective indication can be retrieved from said non-transitory processor-readable storage medium.

Any of vehicle 100, charge station 110, remote device 320, or intermediate device 430 can include a communication interface, by which the indication of a minimum charge threshold for a battery or the indication of a charge-adverse time period can be received. For example, any of vehicle 100, charge station 110, remote device 320, or intermediate device 430 could include communication hardware (e.g. wireless transmitters, wireless receivers, wireless transceivers, wired input and output port or lines) to communicate with a device which stores the indication of a minimum charge threshold for a battery or the indication of a charge-adverse time period. Such a device could be accessed for example over the internet, a local network, or by direct communication. As another example, vehicle 100 can include a communication interface to communicate with charge station 110, remote device 320, or intermediate device 430, which in turn communicates with a device which stores the indication of a minimum charge threshold for a battery or the indication of a charge-adverse time period (that is, communication can be indirect). Similarly, charge station 110 can include a communication interface to communicate with vehicle 100, remote device 320, or intermediate device 430 which in turn communicates with a device which stores the indication of a minimum charge threshold for a battery or the indication of a charge-adverse time period. Similarly, intermediate device 430 can include a communication interface to communicate with vehicle 100, charge station 110, or remote device 320, which in turn communicates with a device which stores the indication of a minimum charge threshold for a battery or the indication of a charge-adverse time period.

In act 506, a determination is made as to whether a charge level of the vehicle battery is above the minimum charge threshold $Min_T$ during the charge-adverse period. If the charge level of the vehicle battery is NOT above the minimum charge threshold $Min_T$ during the charge-adverse period, method 500 proceeds to act 508. If the charge level of the vehicle battery IS above the minimum charge threshold $Min_T$ during the charge-adverse period, method 500 proceeds to act 510. In some implementations, act 506 can be performed before the charge-adverse time period, to determine whether the charge level of the battery will be above the minimum charge level threshold during the charge adverse time period.

In act 508, charging of the battery is enabled at a first charge rate during the charge-adverse time period. The first charge rate could be, for example, an unrestricted charge rate (e.g. the maximum rate at which the vehicle battery can be charged without damage to the battery, or a maximum rate at which power can be provided by a charge station which provides power to the battery).

In act 510, charging of the battery is restricted to a second charge rate less than the first charge rate during the charge-adverse time period. The second charge rate could be zero, for example (i.e., charging is disabled), as discussed later with reference to FIGS. 8, 9, 10, and 12. The second charge rate could alternatively be greater than zero, but less than the first charge rate, as discussed later with reference to FIG. 13.

Acts 508 and 510 can be performed by different hardware depending on the nature of the system in which method 500 is implemented. With reference to the system of FIG. 1, the at least one processor 116 in charge station 110 can act as a control unit, which enables charging (as in act 508) or restricts charging (as in act 510), by controlling quantity of power provided by charge station 110 to vehicle 100. With reference to the system of FIG. 2, the at least one processor 206 in vehicle 100 can act as a control unit, which enables charging (as in act 508) or restricts charging (as in act 510), by controlling quantity of power which vehicles accepts from charge station 110. With reference to the system of FIG. 3, the at least one processor 326 in remote device 320 can act as a control unit, which enables charging (as in act 508) or restricts charging (as in act 510), by instructing the at least one processor 116 in charge station 110 to enable charging or restrict charging by controlling provision of power from charge station 110, or by instructing the at least one processor 206 in vehicle 100 to enable charging or restrict charging by controlling power accepted from charge station 110. With reference to the system of FIG. 4, the at least one processor 436 in intermediate device 430 can act as a control unit, which enables charging (as in act 508) or restricts charging (as in act 510), by controlling quantity of power which flows through intermediate device 430 from charge station 110 to vehicle 100. Regardless of the hardware, restricting charging as in act 510 can including disabling charging by controlling flow of power such that no power is transferred to the vehicle, or can include restricting charging by controlling flow of power such that less power is transferred to the vehicle than the first charge rate.

Method 500 prevents or restricts charging of the vehicle battery during a charge-adverse time period. This can save money (e.g. for time-specific electricity costs), or can prevent excessive depletion of power stored externally to the vehicle (e.g. for solar power provision systems).

Figure 6:
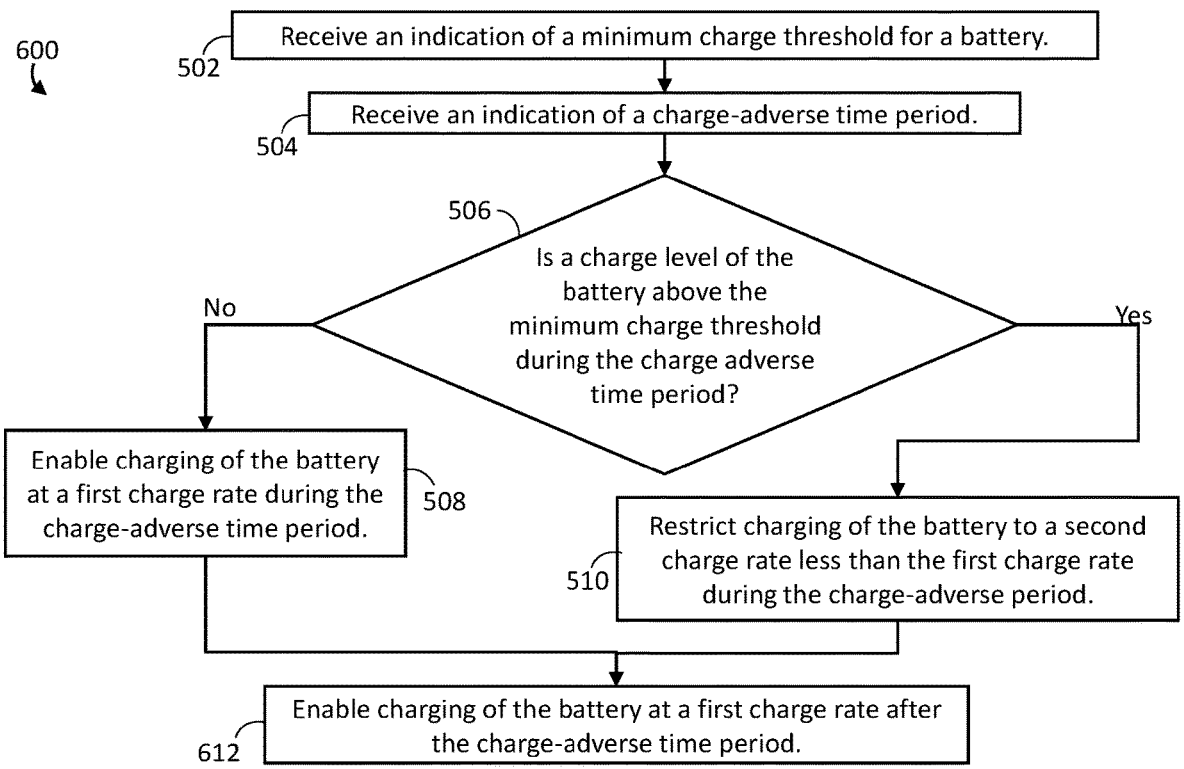

FIG. 6 is a flowchart diagram which illustrates an exemplary method 600 of controlling or influencing charging of any of the batteries described herein. Method 600 as illustrated includes acts 502, 504, 506, 508, and 510 similarly to method 500, and method 600 also includes act 612. One skilled in the art will appreciate that additional acts could be added, acts could be removed, or acts could be reordered as appropriate for a given application. Similar to FIG. 5, the discussion of FIG. 6 is applicable to any of vehicle 100, charge station 110, remote device 320, or intermediate device 430 as discussed with reference to any of FIGS. 1, 2, 3, and 4. The description is also applicable to any appropriate battery charging setup or system. Any such vehicles, charge stations, devices, setups, or systems could include at least one processor and at least one non-transitory processor-readable storage medium, the at least one non-transitory processor-readable storage medium having instructions stored thereon, wherein the instructions when executed by the at least one processor cause the vehicle, charge station, device, setup, or system to perform the method 600.

Method 600 in FIG. 6 is similar to method 500 in FIG. 5, and discussion of method 500 is applicable to method 600 unless context dictates otherwise. One difference between method 600 in FIG. 6 and method 500 in FIG. 5 is that method 600 includes an additional act 612.

In act 612, charging of the battery is enabled at the first charge rate after the charge-adverse time period, regardless of whether charging of the battery was enabled (as in act 508) or restricted (as in act 510) during the charge-adverse time period. This allows the battery to charge outside of the charge-adverse time period without restriction. For example, if charging of the battery is restricted to the second charge rate during the charge-adverse time period as in act 510, then charging is enabled at the first charge rate as in act 612, this results in charging of the battery being at least partially delayed until after the charge-adverse time period. Consequently, timing of battery charging can be selectively controlled to occur at optimal times (times outside of charge-adverse time periods).

On the other hand, if charging of the battery is enabled at the first charge rate during the charge-adverse time period as in act 508, then charging is enabled at the first charge rate as in act 612, the battery can be charged during the charge-adverse time period to strive to maintain a minimum charge level of the battery, and charging of the battery can be completed (if needed) after the charge-adverse time period ends.

Generally, during any of the methods discussed herein, the control unit can be operable to monitor charge level of a battery continuously, periodically, or at regular intervals. In methods 500 and 600, act 506 can be performed continuously, or at regular intervals (e.g. once per minute, five minutes, ten minutes, or any other appropriate interval) during a charge-adverse time period. If the determination of act 506 changes during a charge-adverse time period, this can change whether act 508 or act 510 is performed. For example, charging of a battery can be restricted starting at some point during a charge-adverse time period other than the beginning of the charge-adverse time period if the minimum charge threshold $Min_T$ is met part-way through the charge-adverse time period. This is discussed in detail with reference to FIG. 9.

Figure 7:
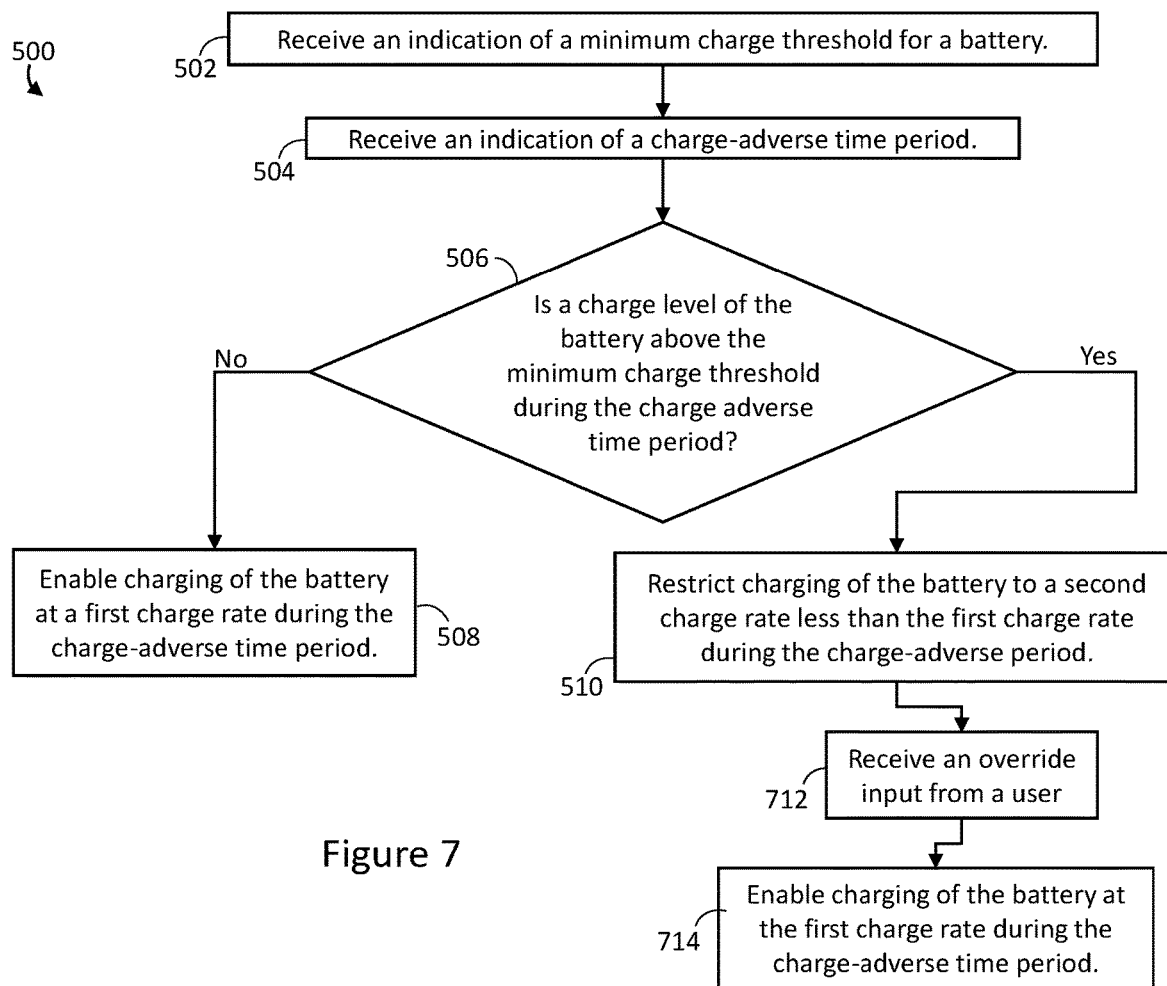

FIG. 7 is a flowchart diagram which illustrates an exemplary method 700 of controlling or influencing charging of any of the batteries described herein. Method 700 as illustrated includes acts 502, 504, 506, 508, and 510 similarly to method 500, and method 700 also includes acts 712 and 714. One skilled in the art will appreciate that additional acts could be added, acts could be removed, or acts could be reordered as appropriate for a given application. Similar to FIG. 5, the discussion of FIG. 7 is applicable to any of vehicle 100, charge station 110, remote device 320, or intermediate device 430 as discussed with reference to any of FIGS. 1, 2, 3, and 4. The description is also applicable to any appropriate battery charging setup or system. Any such vehicles, charge stations, devices, setups, or systems could include at least one processor and at least one non-transitory processor-readable storage medium, the at least one non-transitory processor-readable storage medium having instructions stored thereon, wherein the instructions when executed by the at least one processor cause the vehicle, charge station, device, setup, or system to perform the method 700.

Method 700 in FIG. 7 is similar to method 500 in FIG. 5, and discussion of method 500 is applicable to method 700 unless context dictates otherwise. Further, method 700 could also be combined with method 600 as appropriate for a given application. One difference between method 700 in FIG. 7 and method 500 in FIG. 5 is that method 700 includes additional acts 712 and 714.

In act 712, an override input is received from a user. In response to the override input, in act 714, charging of the battery is enabled at the first charge rate during the charge-adverse time period, even though in act 506 the charge level of the battery was determined to be above the minimum charge threshold $Min_T$. Acts 712 and 714 enable a user to force charging of the vehicle battery even if charging conditions are adverse. For example, a user may have a road-trip planned, for which they need a full battery charge. They may provide an override input in order to force charging of the vehicle battery during a charge-adverse time period to ensure that the vehicle battery has sufficient charge prior to the road trip. This concept is discussed in more detail later with reference to FIGS. 10 and 11. Such an override input could be provided by a user via an interface of a vehicle 100, charging station 110, remote device 320, or intermediate device 430.

FIGS. 8, 9, 10, 11, 12, and 13 are charge plots which illustrate several exemplary charging scenarios for a vehicle battery, with reference to a charge-adverse time period. As discussed later, FIGS. 8, 9, 10, 11, 12, and 13 are also applicable to charge-restriction events. Though only a single charge-adverse time period (or charge-restriction event) is illustrated, the concepts discussed regarding FIGS. 8, 9, 10, 11, 12, and 13 are applicable to any number of charge-adverse time periods (or charge-restriction events). Each of FIGS. 8, 9, 10, 11, 12, and 13 show a charge level of a vehicle battery over time (as a black line tracing through each plot). Each of FIGS. 8, 9, 10, 11, 12, and 13 include the following labels, which refer to concepts discussed above:

$Min_T$ represents a minimum charge threshold of the battery.

$Min_D$ represents a minimum charge degradation threshold of the battery.

$Max_A$ represents an absolute maximum energy storage capacity (total energy capacity) of a battery.

$Max_D$ represents a usable maximum energy capacity of the battery set to prevent premature degradation as discussed above.

In the context of charge-adverse time periods, $T_S$ represents a start of a charge-adverse time period, and $T_E$ represents an end of the charge-adverse time period. In the context of charge-restriction events as discussed later, $T_S$ represents a start of a charge-restriction event, and $T_E$ represents an end of the charge-restriction event.

In some implementations, $Min_T$ equals $Min_D$; that is, the minimum charge threshold can be set as the minimum charge degradation threshold. In other implementations, a minimum charge degradation threshold $Min_D$ may not be set. In some implementations, $Max_D$ may not be set, such that the battery will charge all the way to $Max_A$.

Figure 8:
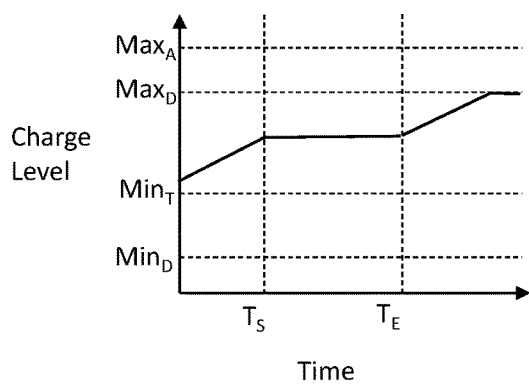
FIGS. 8, 9, 10, 11, 12, and 13 are charge plots which illustrate exemplary charging scenarios for a vehicle battery, with reference to a charge-adverse time period or a charge-restriction event.

FIG. 8 illustrates an example where a vehicle battery is connected to a power source (e.g. charge station) prior to $T_S$. Prior to $T_S$, charging of the vehicle battery is enabled at a first rate (e.g. an unrestricted rate, such that the battery can charge as fast as possible without damaging the vehicle, the battery, or the charge station), as indicated by the sloped solid line increasing prior to $T_S$. At $T_S$, the charge level of the battery is determined to be above the minimum charge threshold $Min_T$ in accordance with act 506 in method 500, 600, or 700 (or act 1706 discussed later with reference to FIGS. 17, 18, and 19). Consequently, charging of the battery is restricted to a second charge rate less than the first charge rate in accordance with act 510 in methods 500, 600, and 700 (or act 1710 discussed later with reference to FIGS. 17, 18, and 19). In the example of FIG. 8, the second charge rate is zero, i.e. charging is disabled. The charge level of the battery stays above the minimum charge threshold $Min_T$ until $T_E$ (i.e. for the duration of the charge-adverse time period or charge-restriction event). At $T_E$, charging of the battery is enabled at the first charge rate (in accordance with act 612 in method 600, or act 1712 discussed later with reference to FIG. 17), as shown in FIG. 8 by the sloped line indicating increasing charge of the battery after $T_E$. Once the charge level of the battery reaches the maximum threshold to prevent premature degradation $Max_D$, charging of the battery stops. In case where $Max_D$ is not set, charging can continue to $Max_A$.

In the example of FIG. 8, unnecessary charging of the battery under adverse charging conditions or during a charge-restriction event is avoided.

Figure 9:
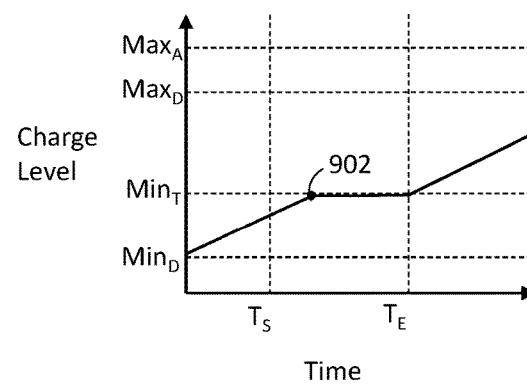

FIG. 9 illustrates an example where a vehicle battery is connected to a power source (e.g. charge station) prior to $T_S$. Prior to the start of the charge-adverse time period $T_S$, charging of the vehicle battery is enabled at a first rate (e.g. an unrestricted rate, such that the battery can charge as fast as possible without damaging the vehicle, the battery, or the charge station), as indicated by the sloped solid line increasing prior to $T_S$. At $T_S$, the charge level of the battery is determined to be below the minimum charge threshold $Min_T$ in accordance with act 506 in method 500, 600, or 700 (or act 1706 discussed later with reference to FIGS. 17, 18, and 19). Consequently, charging of the battery is enabled at the first charge rate during the charge-adverse time period (or charge-restriction event), as indicated by the sloped solid line increasing after $T_S$, in accordance with act 508 in methods 500, 600, and 700 (or act 1708 discussed later with reference to FIGS. 17, 18, and 19).

Act 506 (or act 1706 discussed later with reference to FIGS. 17, 18, 19) is performed continuously or at regular intervals during the charge-adverse time period (or charge-restriction event), such that once the charge level of the battery reaches the minimum charge threshold $Min_T$ (highlighted by point 902), charging of the battery is restricted to a second charge rate less than the first charge rate in accordance with act 510 in methods 500, 600, and 700 (or act 1710 discussed later with reference to FIGS. 17, 18, and 19). In the example of FIG. 9, the second charge rate is zero, i.e. charging is disabled, as shown by the flat sold line during the charge-adverse time period. The charge level of the battery stays at or above the minimum charge threshold $Min_T$ until $T_E$ (i.e. for the duration of the charge-adverse time period or the charge-restriction event). At $T_E$, charging of the battery is enabled at the first charge rate (in accordance with act 612 in method 600 or act 1714 as discussed later with reference to FIG. 17), as shown in FIG. 9 by the sloped solid line indicating increasing charge of the battery after $T_E$. Once the charge level of the battery reaches the maximum threshold to prevent premature degradation $Max_D$, charging of the battery stops. In cases where $Max_D$ is not set, charging can continue to $Max_A$.

In the example of FIG. 9, a minimum charge in the vehicle battery can be reached to enable a certain degree of vehicle usability. Subsequent unnecessary charging of the battery under adverse charging conditions or during a charge-restriction event is prevented.

Figure 10:
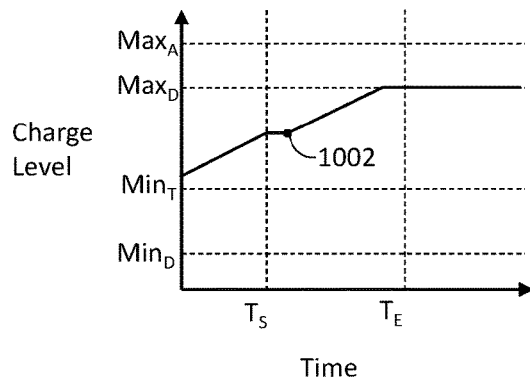

FIG. 10 illustrates an example where a vehicle battery is connected to a power source (e.g. charge station) prior to $T_S$. Prior to $T_S$, charging of the vehicle battery is enabled at a first rate (e.g. an unrestricted rate, such that the battery can charge as fast as possible without damaging the vehicle, the battery, or the charge station), as indicated by the sloped solid line increasing prior to $T_S$. At $T_S$, the charge level of the battery is determined to be above the minimum charge threshold $Min_T$ in accordance with act 506 in method 500, 600, or 700 (or act 1706 discussed later with reference to FIGS. 17, 18, and 19). Consequently, charging of the battery is restricted to a second charge rate less than the first charge rate in accordance with act 510 in methods 500, 600, and 700 (or act 1710 discussed later with reference to FIGS. 17, 18, and 19). In the example of FIG. 10, the second charge rate is zero, i.e. charging is disabled.

At point 1002, an override input is received from a user as in act 712 of method 700 (or act 1814 discussed later with reference to FIG. 18). In response to the override input, charging is enabled at the first rate during the charge-adverse time period in accordance with act 714 of method 700 (or during the charge-restriction event in accordance with act 1816 discussed later with reference to FIG. 18), as shown in FIG. 10 by the sloped solid line indicating increasing charge of the battery after $T_S$ and before $T_E$. Once the charge level of the battery reaches the maximum threshold to prevent premature degradation $Max_D$, charging of the battery stops. In cases where $Max_D$ is not set, charging can continue to $Max_A$.

In the example of FIG. 10, a user can override charging controls, to charge the vehicle battery during a charge-adverse time period or charge-restriction event, for situations where it is desirable to promptly charge the vehicle above the minimum charge threshold $Min_T$.

Figure 11:
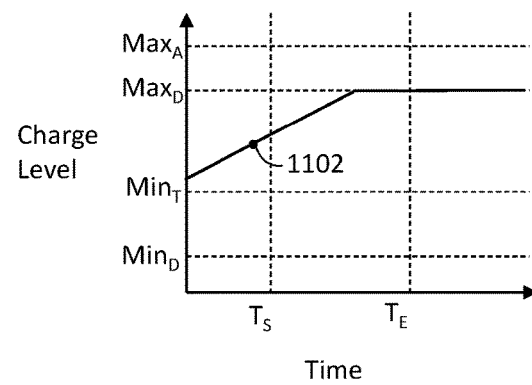

FIG. 11 illustrates a plot which is similar to the plot illustrated in FIG. 10. Unless context dictates otherwise, the description of FIG. 10 is applicable to FIG. 11. One difference between FIG. 11 and FIG. 10 is that in FIG. 11, the override input is received at point 1102 before $T_S$ (instead of after as in FIG. 10). As a result, charging of the vehicle battery is not restricted to the second rate in the example of FIG. 11. That is, the user pre-empts the charging controls which would have restricted charging of the battery, prior to such restriction taking place. Such an implementation provides a user with greater flexibility and control over charging (e.g., they can provide the override input at a time convenient to them, without having to wait for the charge-adverse time period or charge-restriction event to start).

Figure 12:
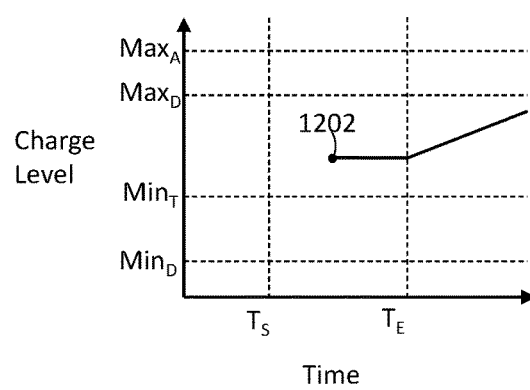

FIG. 12 illustrates an example where a vehicle battery is connected to a power source (e.g. charge station) after $T_S$ (shown as point 1202). At point 1202, the charge level of the battery is determined to be above the minimum charge threshold $Min_T$ in accordance with act 506 in method 500, 600, or 700 (or act 1706 as discussed later with reference to FIGS. 17, 18, and 19). Consequently, charging of the battery is restricted to a second charge rate less than the first charge rate in accordance with act 510 in methods 500, 600, and 700 (or act 1710 as discussed later with reference to FIGS. 17, 18, and 19). In the example of FIG. 12, the second charge rate is zero, i.e. charging is disabled. The charge level of the battery stays above the minimum charge threshold $Min_T$ until $T_E$ (i.e. for the duration of the charge-adverse time period or the charge-restriction event). At $T_E$, charging of the battery is enabled at the first charge rate (in accordance with act 612 in method 600 or act 1714 discussed later with reference to FIG. 17), as shown in FIG. 12 by the sloped line indicating increasing charge of the battery after $T_E$. Once the charge level of the battery reaches the maximum threshold to prevent premature degradation $Max_D$, charging of the battery stops. In case where $Max_D$ is not set, charging can continue to $Max_A$.

FIG. 12 illustrates that charging does not need to occur at the first charge rate in order to be restricted to the second charge rate. Rather, charging can be restricted to the second charge rate upon connecting the vehicle battery to a power source.

Figure 13:
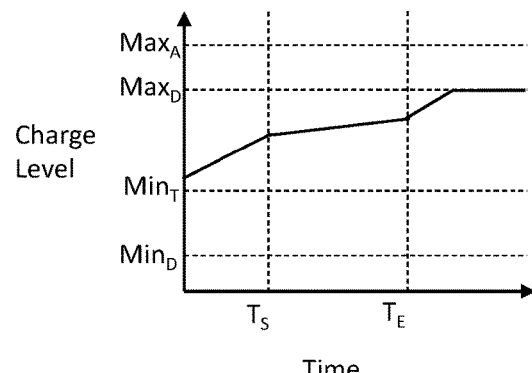

FIG. 13 illustrates a plot which is similar to the plot illustrated in FIG. 8. Unless context dictates otherwise, the description of FIG. 8 is applicable to FIG. 13. One difference between FIG. 13 and FIG. 8 is that in FIG. 13, the second charge rate is non-zero. That is, in FIG. 13, the vehicle battery is still charged during the charge-adverse time period (or charge-restriction event), but at a slower rate such that less energy is consumed. In any of the implementations discussed herein, the second charge rate can be non-zero.

Figure 14:
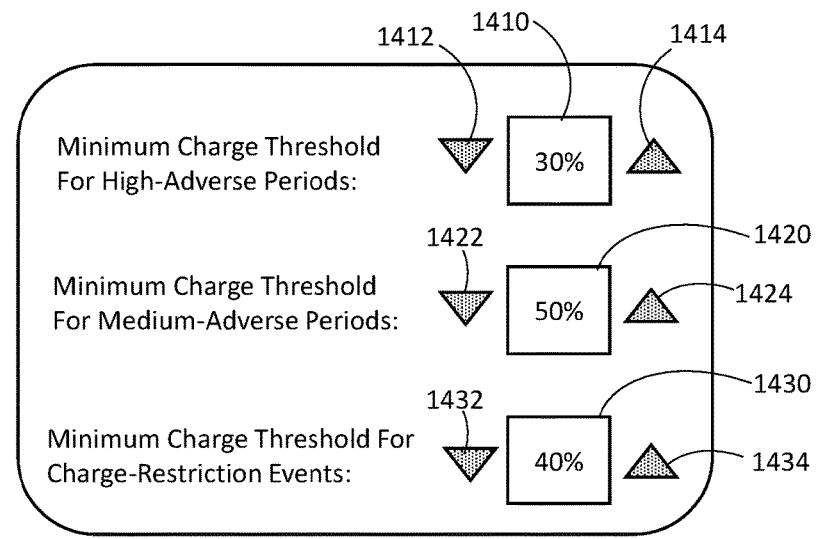
FIGS. 14 and 15 are user interface diagrams for providing indications of minimum charge-thresholds for restricting charging and for providing indications of charge-adverse time periods.
Figures 15, 16:
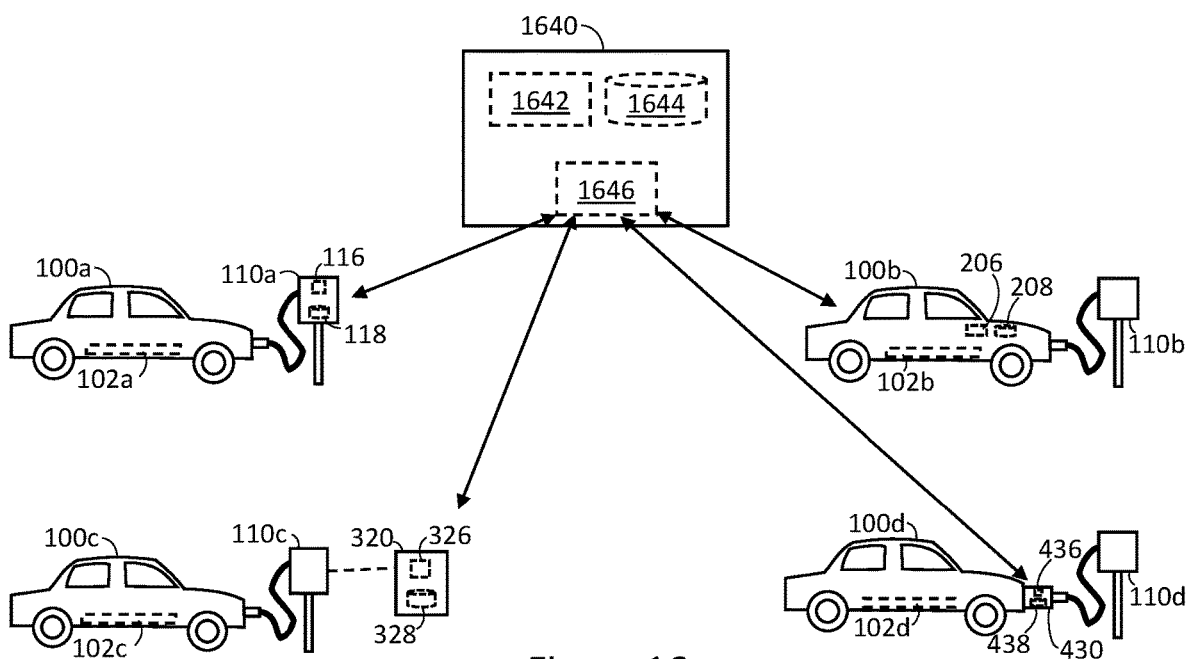
FIG. 16 is a schematic view of a system for controlling power distribution to a plurality of vehicles.

FIGS. 14 and 15 illustrate exemplary user interfaces by which a user can input an indication of at least one minimum charge threshold $Min_T$ and/or an indication of at least one charge-adverse time period. The interfaces of FIGS. 14 and 15 could be presented via any appropriate device, including vehicle 100, charge station 110, remote device 320, or intermediate device 430. For example, the user interfaces could be presented by screens built into said devices, with corresponding means for receiving user input (e.g. touchscreens, display screens and button interfaces, etc.).

The user interface illustrated in FIG. 14 shows a current setting for minimum charge threshold for "High-Adverse Periods" 1410, which can be adjusted by the user using the up input 1414 or the down input 1412. The user interface illustrated in FIG. 14 also shows a current setting for minimum charge threshold for "Medium-Adverse Periods" 1420, which can be adjusted by the user using the up input 1424 or the down input 1422. The user interface illustrated in FIG. 14 also shows a current setting for minimum charge threshold for Charge-Restriction Events 1430, which can be adjusted by the user using the up input 1434 or the down input 1432. "High-Adverse Periods" and "Medium-Adverse Periods" are discussed below, and "Charge-Restriction Events" are discussed later with reference to FIGS. 17, 18, 19, 20, 21, 22, 23, and 24. Although the user controls are illustrated as up and down buttons, any appropriate controls could be used, such as dials, sliders, typing a desired value, etc. Further, limits may be imposed on what extent to which a user can set minimum charge thresholds. This can prevent user error in setting minimum charge thresholds. As one example, minimum charge thresholds may be constrained to being set within 20% and 70% of the energy capacity of a battery. If a minimum charge threshold were set by a user to be too high (e.g. 90%) this would eliminate most of the benefits of controlled charging, and is indicative of likely input error. Similarly, if minimum charge threshold were to be set below a minimum charge degradation threshold for a battery, this could be harmful for the battery and/or prevent operation of the vehicle until the battery can charge after a charge-adverse period (e.g. this could be equivalent to setting the battery to not charge ever during charge-adverse events), which is also indicative of input error because the intended advantages of setting a minimum charge threshold are not being utilized.

Charging patterns for different adversity levels to charging (how adverse a particular period is to charging) can optionally be controlled independently to improve flexibility for users. The example of FIG. 14 illustrates setting separate minimum charge thresholds for "High-Adverse Periods" and "Medium-Adverse Periods". Although not illustrated, a "Non-Adverse Period" or similar could also be included, for which a minimum charge threshold may not need be set, or could be set as the maximum usable energy storage capacity of the battery (e.g. there is no need to restrict charging during the Non-Adverse Period). In the above example for Toronto, "On-Peak" has the highest cost of energy, and thus could be classified as a "High Adverse Period". "Off-Peak" has a cost of energy which is the lowest possible, and thus could be classified as a "Non-Adverse Period". "Mid-Peak" has a cost of energy which is between On-Peak and Off-Peak, and thus could be classified as a "Medium-Adverse Period".

In the example of FIG. 14, minimum charge threshold for High-Adverse Periods is set at 30%. This will provide a vehicle battery with enough energy for short trips (e.g. for emergency or basic convenience), but will prevent charging the vehicle battery unnecessarily during a period which is highly adverse to charging. Also in the example, minimum charge threshold for Medium-Adverse Periods is set at 50%. This will provide a vehicle battery with a balanced amount of energy, while avoiding some extra expense for charging during periods which are non-ideal for charging. Setting minimum charge threshold for Charge-Restriction Events is discussed later with reference to FIG. 22.

FIG. 15 illustrates an exemplary user interface by which a user can provide an indication of charge-adverse time periods, and optionally provide an indication of minimum charge thresholds. Each row in the interface of FIG. 15 represents a specified time period or schedule of time periods. Each column in the interface of FIG. 15 represents a specific aspect of time periods. In the example, column 1501 represents labels or names of time periods. As examples, these labels or names can be manually input by a user, selected by a user from a list, pre-defined, or any other appropriate format. In the example, column 1502 represents a day or days in which a given time period occurs. As examples, this day or these days could be days of the week, specific dates, holidays or non-holidays, or any other appropriate way of delineating days. In the example, column 1503 illustrates a time of day in which a given time period occurs. As examples, times of day could be manually input by a user, selected from a list of options, or any other appropriate means. In the example, column 1504 illustrates an adversity classification of a given time period. As examples, these classifications could be manually defined by the user, selected from a list, or any other appropriate means of generating classifications. In the example, column 1505 represents a minimum charge threshold set for the time period. As an example, minimum charge thresholds could be set by a user similarly to as described with reference to FIG. 14. Columns 1504 and 1505 are optional alternatives that could be used together, but may be implemented separately (i.e. a given implementation may have only one of column 1504 or column 1505).

The example illustrated in FIG. 15 corresponds to the time-of-use energy pricing example in Toronto as discussed above. The user can input as many rows represented schedules of time periods as needed.

In row 1511, a time period labelled "On-Peak" is input, which occurs on weekdays (Monday to Friday; may or may not include holidays as appropriate for a given situation) from 11 AM to 5 PM. As discussed in the above example of Toronto, during this time period energy is at its most expensive, and so charge adversity is set to High. The minimum charge threshold could be set as discussed with reference to FIG. 14, and subsequently the minimum charge threshold for the time period specified by row 1511 could be retrieved as needed based on the minimum charge threshold set for time periods of the "High" charge-adversity classification. Alternatively, a minimum charge threshold for the schedule of time periods specified by row 1511 can be specified directly in column 1505, in this case 25%.

In row 1512, a time period labelled "Mid-Peak" is input, which occurs on weekdays (Monday to Friday; may or may not include holidays as appropriate for a given situation) from 7 AM to 11 AM and 5 PM to 7 PM. In the illustrated example, row 1512 includes two schedule time ranges in column 1503 (7 AM to 11 AM, and 5 PM to 7 PM); in alternative implementations, two separate rows can be input, with each row specifying one time range. As discussed in the above example of Toronto, during these time periods energy is more expensive than off-peak times, but less expensive that on-peak times, and so charge adversity is set to Medium. The minimum charge threshold could be set as discussed with reference to FIG. 14, and subsequently the minimum charge threshold for the time periods specified by row 1512 could be retrieved as needed based on the minimum charge threshold set for time periods of the "Medium" charge-adversity classification. Alternatively, a minimum charge threshold for the schedule of time periods specified by row 1512 can be specified directly in column 1505, in this case 40%.

In rows 1513 and 1514, time periods labelled "Off-Peak" are input, which occur on weekdays (Monday to Friday; may or may not include holidays as appropriate for a given situation) from 7 PM to 7 AM, and all day on weekends. In the illustrated example, rows 1513 and 1514 each include one scheduled time range; in alternative implementations, two separate time ranges could be input in a single row, as in the example of row 1512. As discussed in the above example of Toronto, during these time periods energy is at its lowest cost, and so charge adversity is set to None (or Low). The minimum charge threshold could be set and subsequently the minimum charge threshold for the time periods specified by rows 1513 and 1514 could be retrieved as needed based on the minimum charge threshold set for time periods of the "None" charge-adversity classification. As an alternative, as discussed with reference to FIG. 14 above, no minimum charge threshold could be set, or no minimum charge threshold could be needed/used for time periods of the "None" charge-adversity classification; in such time periods, the vehicle battery is charged to its maximum usable energy capacity since there is no or little adversity to charging (relative to other time periods). As another alternative, a minimum charge threshold for the schedule of time periods specified by rows 1513 and 1514 can be specified directly in column 1505, in this case 100%.

In optional row 1515, no time period is shown as being input. Instead, an "Add New" control for adding a new time period is illustrated in column 1501, which a user can use to input time periods, if desired. One example form of control for adding new time periods is illustrated (an "Add New" button), but in practice any appropriate form of control for adding time periods (positioned in any appropriate manner) could be used. In the illustrated example, each of the time periods in rows 1511, 1512, 1513, and 1514 could have been adding by clicking the "Add New" control, and filling in the details in columns 1501, 1502, 1503, 1504, and 1505 for the respective row.

In view of setting different minimum charge thresholds for different levels of charge-adversity as in FIGS. 14 and 15, act 506 in methods 500, 600, and 700 can involve determining if the charge level of the battery is above a minimum charge threshold as set for an adversity level for a charge-adverse time period.

FIG. 16 is a schematic view of a system for controlling power distribution to a plurality of vehicles. FIG. 16 shows a distribution control device 1640, which includes at least one processor 1642, at least one non-transitory processor-readable storage medium 1644, and a communication interface 1646. Although illustrated as one device, distribution control device 1640 can include a plurality of devices, a plurality of processors 1642, a plurality of non-transitory processor-readable storage mediums 1644, and/or a plurality of communication interfaces 1646. Further, such a plurality of distribution control devices can be in close proximity (e.g. in a central server location), or can be distributed across different locations (e.g. as remote devices). Communication interface 1646 can be a wired or wireless interface, through which distribution control device 1640 communicates with a plurality of control units which control charging for respective vehicles. In the illustrated example, distribution control device 1640 communicates with a control unit in a charge station 110*a* coupled to a vehicle 100*a*, a control unit in a vehicle 100*b*, a control unit in a remote device 320 coupled to a charge station 110*c* or vehicle 100*c*, and a control unit in an intermediate device 430 coupled to a vehicle 100*d* and a charge station 110*d*. However, distribution control device 1640 could communicate with any appropriate number of control units, such as one control unit, dozens of control units, hundreds of control units, thousands of control units, or even more control units. The illustrated example shows a case of distribution control device 1640 in communication with each of the charging systems illustrated in FIGS. 1, 2, 3, and 4, but in practice distribution control device 1640 can communicate with any appropriate charging system.

In the example illustrated in FIG. 16, vehicle 100*a* corresponds to vehicle 100 as discussed with reference to FIG. 1, and discussion of components in FIG. 1 is applicable to similarly named components in FIG. 16. Vehicle 100*a* includes a battery 102*a*, which receives power from a charge station 110*a*. Charge station 110*a* includes the "control unit" for this example charging system, in that charge station 110*a* includes at least one processor 116 and at least one non-transitory processor readable storage medium 118, which control provision of power from charge station 110*a* to battery 102*a* of vehicle 100*a*. Though not illustrated to avoid clutter, charge station 110*a* also includes a communication interface (such as a wireless transmitter, wireless receiver, wireless transceiver, or wired input and output ports or lines) by which charge station 110*a* communicates with distribution control device 1640.

In the example illustrated in FIG. 16, vehicle 100*b* corresponds to vehicle 100 as discussed with reference to FIG. 2, and discussion of components in FIG. 2 is applicable to similarly named components in FIG. 16. Vehicle 100*b* includes a battery 102*b*, which receives power from a charge station 110*b*. Vehicle 100*b* includes the "control unit" for this example charging system, in that vehicle 100*b* includes at least one processor 206 and at least one non-transitory processor readable storage medium 208, which control acquisition of power from charge station 110*b* to battery 102*b* of vehicle 100*b*. Though not illustrated to avoid clutter, vehicle 100*b* or charge station 110*b* also include a communication interface (such as a wireless transmitter, wireless receiver, wireless transceiver, or wired input and output ports or lines) by which vehicle 100*b* communicates with distribution control device 1640 (directly from vehicle 100*b* or indirectly via charge station 110*b*).

In the example illustrated in FIG. 16, vehicle 100c corresponds to vehicle 100 as discussed with reference to FIG. 3, and discussion of components in FIG. 3 is applicable to similarly named components in FIG. 16. Vehicle 100c includes a battery 102c, which receives power from a charge station 110c. Remote device 320 includes the "control unit" for this example charging system, in that remote device 320 includes at least one processor 326 and at least one non-transitory processor readable storage medium 328, which control provision of power from charge station 110c to battery 102c of vehicle 100c (e.g. by providing control instructions to charge station 110c or vehicle 100c). Though not illustrated to avoid clutter, remote device 320 includes a communication interface (such as a wireless transmitter, wireless receiver, wireless transceiver, or wired input and output ports or lines) by which remote device 320 communicates with distribution control device 1640. In the context of FIG. 16, remote device 320 is called "remote" in that it is remote from vehicle 100c and charge station 110c, as in FIG. 3.

In the example illustrated in FIG. 16, vehicle 100d corresponds to vehicle 100 as discussed with reference to FIG. 4, and discussion of components in FIG. 4 is applicable to similarly named components in FIG. 16. Vehicle 100d includes a battery 102d, which receives power from a charge station 110d. Intermediate device 430 includes the "control unit" for this example charging system, in that intermediate device 430 includes at least one processor 436 and at least one non-transitory processor readable storage medium 438, which control flow of power from charge station 110d to battery 102d of vehicle 100d (e.g. by controlling power which is provided by charge station 110d). Though not illustrated to avoid clutter, intermediate device 430 includes a communication interface (such as a wireless transmitter, wireless receiver, wireless transceiver, or wired input and output ports or lines) by which intermediate device 430 communicates with distribution control device 1640. In the context of FIG. 16, intermediate device 430 is called "intermediate" in that it is intermediate to vehicle 100d and charge station 110d, as in FIG. 4.

Each of the control units discussed with reference to FIG. 16 are shown as communicating directly with distribution control device 1640, but this is not necessarily the case. For example, each of the control units can communicate with distribution control device 1640 indirectly through the internet or other network, where communication signals pass through one or more intermediary servers or connection devices.

Unless context requires otherwise, generally acts of information processing which are performed by distribution control device 1640 can be performed by the at least one processor 1642.

At least FIGS. 17, 18, 19, 20, 21, 22, 23, and 24 discuss acts and methods which can be performed by the components illustrated in FIG. 16, to control distribution of power.

Figure 17:
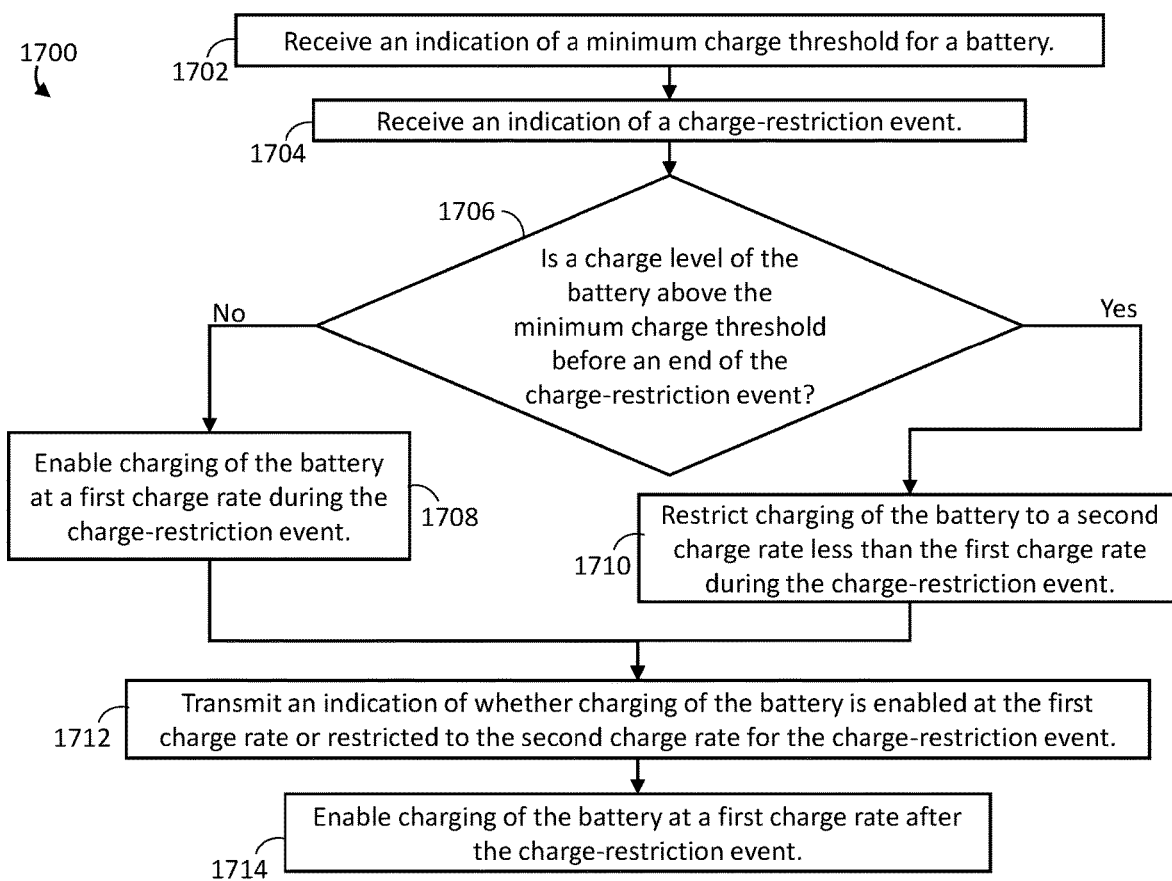
FIGS. 17, 18, 19, 20, and 21 are flowchart diagrams which illustrate methods of influencing or controlling charging of vehicles in the context of charge-restriction events.

FIG. 17 is a flowchart diagram which illustrates an exemplary method 1700 performed by a control unit corresponding to a vehicle. Method 1700 as illustrated includes acts 1702, 1704, 1706, 1708, 1710, 1712, and 1714. One skilled in the art will appreciate that additional acts could be added, acts could be removed, or acts could be reordered as appropriate for a given application. With reference to the example illustrated in FIG. 16, any of the at least one non-transitory processor-readable storage mediums 118, 208, 328, or 438 could have instructions stored thereon, which when executed by a respective at least one processor cause the respective vehicle, charge station, device, setup, or system to perform the method 1700.

In act 1702, an indication of a minimum charge threshold $Min_T$ for a battery is received. In some cases, this minimum charge threshold could be a minimum charge degradation threshold $Min_D$ as discussed above. An indication of a minimum charge threshold $Min_T$ for a battery can be received similarly to as discussed above with reference to act 502 in method 500 illustrated in FIG. 5. The above discussion of act 502 in FIG. 5 also applies to act 1702 in FIG. 17.

In act 1704, an indication of a charge-restriction event is received. Throughout this disclosure, the term "charge-restriction event" refers to an event (period of time) where a supplier of power (e.g. utility company or government entity) can solicit or control restrictions on charging of vehicle batteries to limit power usage during the charge-restriction event. This alleviates strain or burden on power distribution networks and infrastructure. A charge-restriction event can alternatively be called a "demand-response event" (DRE). Charge-restriction events can be scheduled, based on expected periods of high power usage, or can be initiated as needed (such as an emergency event where power usage needs to be promptly decreased).

An indication of a charge-restriction event can be received by any appropriate means. For example, an electricity provider may provide a schedule of charge-restriction events, or a notification service which indicates upcoming charge-restriction events, which can be accessed by at least one processor of any of vehicle 100b, charge station 110a, remote device 320, or intermediate device 430 to automatically receive an indication of a charge-restriction event. As yet another example, a provider of charge-management software or hardware for any of vehicle 100b, charge station 110a, remote device 320, or intermediate device 430 could provide such a schedule or notifications of charge-restriction events (e.g. an electricity provider could notify the provider of charge-management software or hardware of upcoming charge-restriction events, and the provider of charge-management software or hardware can provide an indication (or indications) of a charge-restriction event (or charge-restriction events). Said schedule or notifications of charge-restriction events could be available via the internet or other network, for download by any of vehicle 100b, charge station 110a, remote device 320, or intermediate device 430 (via intermediate servers, as appropriate). Said schedule or notifications of charge-restriction events can also be sent directly to any of vehicle 100b, charge station 110a, remote device 320, or intermediate device 430 (e.g. like push notifications). An indication of a charge restriction event can be distributed (e.g. sent to control units corresponding to vehicles; made accessible to control units, etc.) by distribution control device 1640.

In acts 1702 and act 1704, "receiving an indication of a minimum charge threshold for a battery" and "receiving an indication of a charge-restriction event" do not necessarily require the respective indication to come directly from a vehicle user or from an external source immediately prior to act 1706 (discussed below). For example, at least one respective indication can be stored in a non-transitory processor-readable storage medium of vehicle 100b, charge station 110a, remote device 320, or intermediate device 430 in advance (e.g. an indication of minimum charge threshold can be input or downloaded during system setup, or indications can be downloaded and stored at regular update intervals). When it comes time to make decisions as in act 1706 discussed below, the at least one respective indication can be retrieved from said non-transitory processor-readable storage medium.

As mentioned above, vehicle 100b, charge station 110a, remote device 320, or intermediate device 430 can include a respective communication interface, by which the indication of a charge-restriction event can be received. For example, any of vehicle 100b, charge station 110a, remote device 320, or intermediate device 430 could include communication hardware to communicate with the distribution control device 1640, to receive an indication of a charge-restriction event. Such communication can occur example over the internet, a local network, or by direct communication.

In act 1706, a determination is made as to whether a charge level of the vehicle battery is above the minimum charge threshold $Min_T$ before an end of the charge-restriction event. In some implementations, this can include determining whether a charge level of the vehicle battery is above the minimum charge threshold $Min_T$ before a beginning of the charge-restriction event, as discussed in detail with reference to FIG. 19 below. In other implementations, this can include determining whether a charge level of the vehicle battery is above the minimum charge threshold $Min_T$ during the charge-restriction event, as discussed in detail with reference to FIG. 19 below. If the charge level of the vehicle battery is NOT above the minimum charge threshold $Min_T$ before an end of the charge-restriction event, method 1700 proceeds to act 1708. If the charge level of the vehicle battery IS above the minimum charge threshold $Min_T$ before an end of the charge-restriction event, method 1700 proceeds to act 1710.

In act 1708, charging of the battery is enabled at a first charge rate during the charge-restriction event. The first charge rate could be, for example, an unrestricted charge rate (e.g. the maximum rate at which the vehicle battery can be charged without damage to the battery, or a maximum rate at which power can be provided by a charge station which provides power to the battery).

In act 1710, charging of the battery is restricted to a second charge rate less than the first charge rate during the charge-restriction event. The second charge rate could be zero, for example (i.e., charging is disabled), as discussed with reference to FIGS. 8, 9, 10 and 12. The second charge rate could alternatively be greater than zero, but less than the first charge rate, as discussed with reference to FIG. 13.

Acts 1708 and 1710 can be performed by different hardware depending on the nature of the system in which method 1700 is implemented. With reference to the charging system of vehicle 100a in FIG. 16, the at least one processor 116 in charge station 110a can act as a control unit, which enables charging (as in act 1708) or restricts charging (as in act 1710), by controlling quantity of power provided by charge station 110a to vehicle 100a. With reference to the charging system of vehicle 100b in FIG. 16, the at least one processor 206 in vehicle 100b can act as a control unit, which enables charging (as in act 1708) or restricts charging (as in act 1710), by controlling quantity of power which vehicle 100b accepts from charge station 110a. With reference to the charging system of vehicle 100c in FIG. 16, the at least one processor 326 in remote device 320 can act as a control unit, which enables charging (as in act 1708) or restricts charging (as in act 1710), by instructing the at least one processor 116 in charge station 110c to enable charging or restrict charging by controlling provision of power from charge station 110c, or by instructing the at least one processor 206 in vehicle 100c to enable charging or restrict charging by controlling power accepted from charge station 110c. With reference to the charging system of vehicle 100d in FIG. 16, the at least one processor 436 in intermediate device 430 can act as a control unit, which enables charging (as in act 1708) or restricts charging (as in act 1710), by controlling quantity of power which flows through intermediate device 430 from charge station 110d to vehicle 100d.

In act 1712, an indication of whether charging of the battery is enabled at the first charge rate or restricted to the second charge rate for the charge-restriction event is transmitted, for example by a communication interface of any of vehicles 100a, 100b, 100c, or 100d; charge stations 110a, 110b, 110c, or 110d; remote device 320; or intermediate device 430. The indication of whether charging of the battery is enabled at the first charge rate or restricted to the second charge rate is transmitted to distribution control device 1640 (directly or indirectly), for allocation of rewards as discussed in detail with reference to FIGS. 20 and 21 below. Further, the indication of whether charging of the battery is enabled at the first charge rate or restricted to the second charge rate can be transmitted at any appropriate time, including prior to a beginning of the charge-restriction event, during the charge-restriction event, or after an end of the charge-restriction event. Allocation of rewards can be performed after the charge-restriction event, so the indication of whether charging of the battery is enabled at the first charge rate or restricted to the second charge rate does not need to be transmitted in real time.

In act 1714, charging of the battery is enabled at the first charge rate after the charge-restriction event. That is, outside of the charge-restriction event, charge rate of the vehicle battery is not restricted.

Method 1700 provides a means for determining and communication whether a vehicle participates in a charge-restriction event, which can be used to inform or audit allocation of rewards based on participation in charge-restriction events. FIGS. 8, 9, 10, 11, 12, and 13 discussed above show exemplary charging scenarios which can play out in the context of method 1700.

Figure 18:
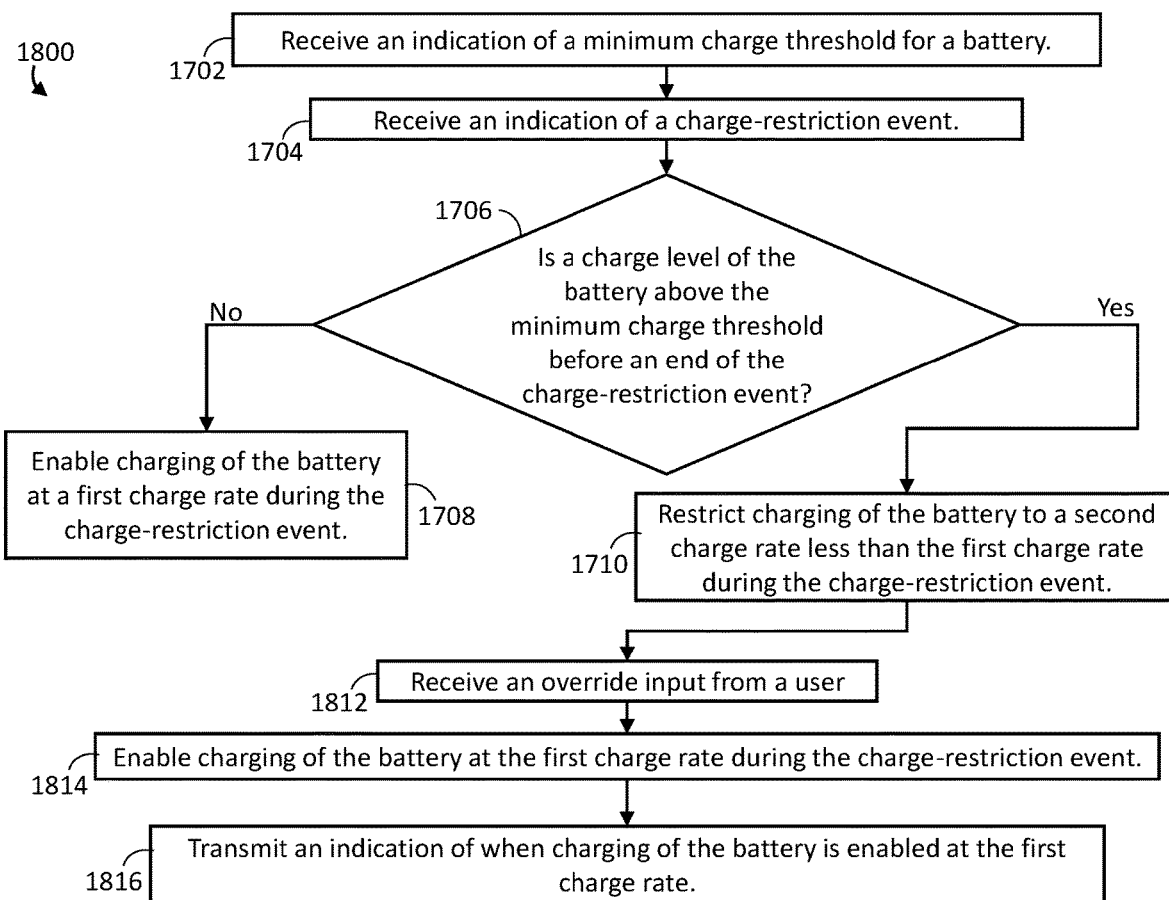

FIG. 18 is a flowchart diagram which illustrates an exemplary method 1800 performed by a control unit corresponding to a vehicle. Method 1800 as illustrated includes acts 1702, 1704, 1706, 1708, and 1710 similarly to method 1700, and method 1800 also includes acts 1812, 1814, and 1816. One skilled in the art will appreciate that additional acts could be added, acts could be removed, or acts could be reordered as appropriate for a given application. With reference to the example illustrated in FIG. 16, any of the at least one non-transitory processor-readable storage mediums 118, 208, 328, or 438 could have instructions stored thereon, which when executed by a respective at least one processor cause the respective vehicle, charge station, device, setup, or system to perform the method 1800.

Acts 1702, 1704, 1706, 1708, and 1710 in method 1800 are similar to as in method 1700; description of these acts with reference to FIG. 17 is also applicable to method 1800 in FIG. 18.

In act 1812, an override input is received from a user (e.g. via a user interface or peripheral device). In response to the override input, in act 1814, charging of the battery is enabled at the first charge rate during the charge-restriction event, even though in act 1706 the charge level of the battery was determined to be above the minimum charge threshold $Min_T$. Acts 1812 and 1814 enable a user to force charging of the vehicle battery even during a charge-restriction event. For example, a user may have a road-trip planned, for which they need a full battery charge. They may provide an override input in order to force charging of the vehicle battery during a charge-restriction event to ensure that the vehicle battery has sufficient charge prior to the road trip. This concept is discussed in more detail with reference to FIGS. 10 and 11.

In act 1816, an indication of when charging of the battery is enabled at the first charge rate is transmitted by the communication interface. This indication of when charging of the battery is enabled at the first charge rate is received by the distribution control device 1640, for determination, adjustment, or proration of rewards allocated to a user or owner of the vehicle. In some implementations, if charging at the first rate was enabled partway through the charge-restriction event, rewards may be prorated to be allocated only for the portion of the charge-restriction event for which charging was restricted to the second rate (i.e., a proportional reward is allocated based on a proportion of the event for which charging is restricted). In other implementations, if charging was enabled at the first charge rate for any portion of the charge-restriction event, rewards may not be allocated to the user for the charge-restriction event (i.e., rewards may only be allocated in cases where charge rate is restricted for the entirety of the charge-restriction event). In some implementations, a proportional reward is allocated based on a quantity of energy which is saved during the charge-restriction event by restricting charging of the battery to the second charge rate instead of enabling charging of the battery at the first charge rate. The quantity of energy can be approximated based on a proportion of time of the charge-restriction event for which charging is restricted to the second charge rate, or a difference in energy (or power) used during the charge-restriction event by restricting charging to the second charge rate instead of enabling charge rate at the first charge rate can be calculated. Determination and allocation of rewards is described in greater detail with reference to FIGS. 20 and 21 below.

FIGS. 10 and 11 discussed above show exemplary charging scenarios which can play out in the context of method 1800.

Figure 19:
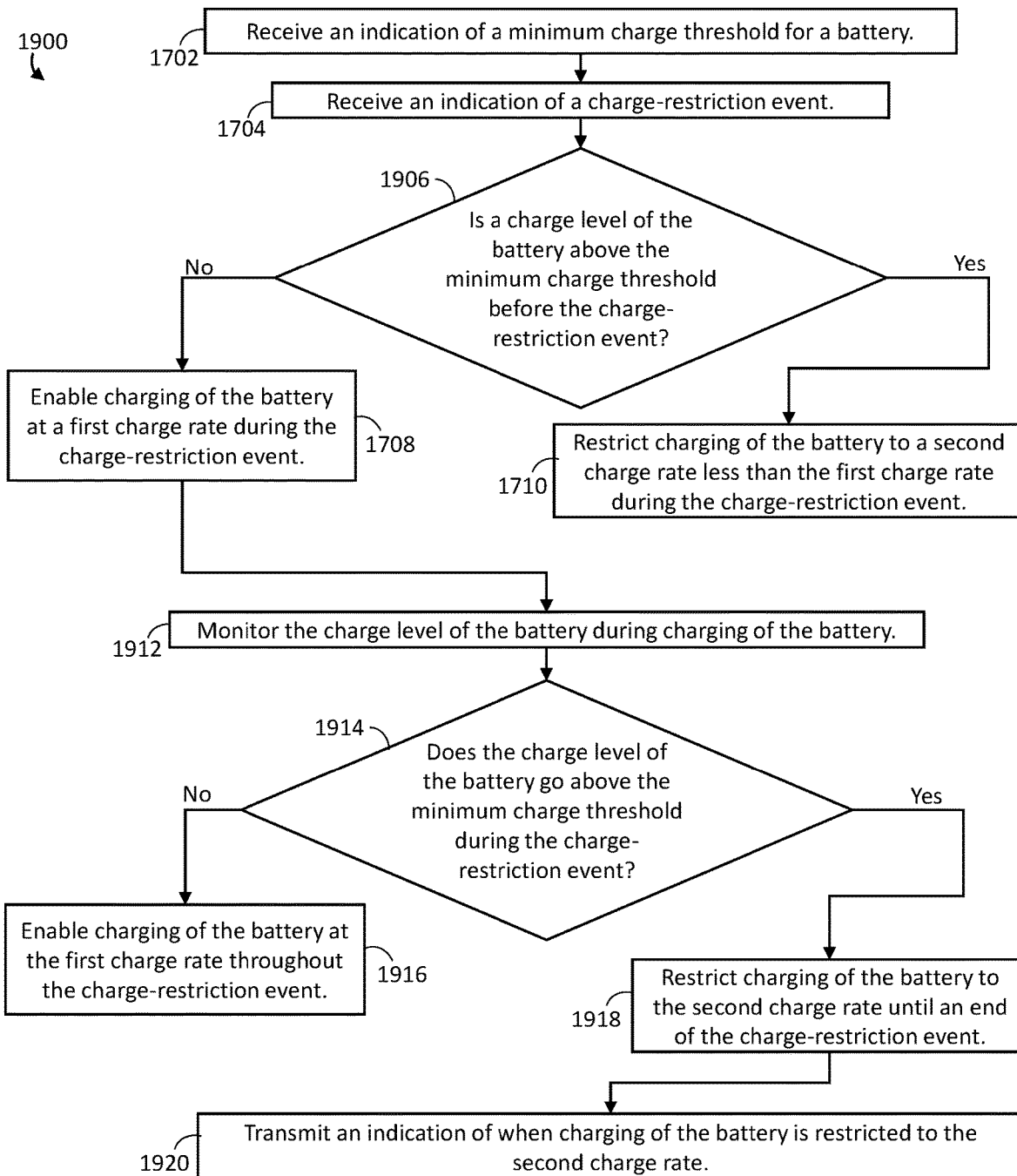

FIG. 19 is a flowchart diagram which illustrates an exemplary method 1900 performed by a control unit corresponding to a vehicle. Method 1900 as illustrated includes acts 1702, 1704, 1708, and 1710 similarly to method 1700, and method 1900 also includes acts 1906, 1912, 1914, 1916, 1918, and 1920. One skilled in the art will appreciate that additional acts could be added, acts could be removed, or acts could be reordered as appropriate for a given application. With reference to the example illustrated in FIG. 16, any of the at least one non-transitory processor-readable storage mediums 118, 208, 328, or 438 could have instructions stored thereon, which when executed by a respective at least one processor cause the respective vehicle, charge station, device, setup, or system to perform the method 1900.

Acts 1702, 1704, 1708, and 1710 in method 1900 are similar to as in method 1700; description of these acts with reference to FIG. 17 are also applicable to method 1900 in FIG. 19.

Act 1906 in method 1900 is similar to act 1706 in method 1700, and description of act 1706 is applicable to act 1906 unless context dictates otherwise. One difference between act 1906 and act 1706 is that in act 1906 a charge level of the battery above the minimum charge threshold is determined before a beginning of the charge-restriction event (instead of before an end of the charge-restriction event). This is because method 1900 includes act 1914 which pertains to making a determination of whether the charge level is above the minimum charge threshold during the charge-restriction event as discussed in detailed below.

In act 1912, charge level of the battery is monitored during charging of the battery by a control unit corresponding to the battery. In act 1914, a determination is made as to whether the charge level of the battery goes above the minimum charge threshold during the charge-restriction event. If the charge level of the battery does not go above the minimum charge threshold during the charge-restriction event, method 1900 proceeds to act 1916, where charging of the battery is enabled at the first charge rate throughout the charge-restriction event. If the charge level of the battery goes above the minimum charge threshold during the charge-restriction event, method 1900 proceeds to act 1918, where charging of the battery is restricted to the second charge rate until an end of the charge-restriction event. That is, partway through the charge-restriction event, charging of the battery can be restricted to the second charge rate once the minimum charge threshold is met. Acts 1912 and 1914 can be performed continuously, repeatedly, or periodically (e.g. a regular intervals) during the charge-restriction event, so that charge rate can be restricted to the second charge rate shortly after the minimum charge threshold is met.

In act 1920, an indication of when charging of the battery is restricted to the second charge rate is transmitted by the communication interface. This indication of when charging of the battery is restricted to the second charge rate is received by the distribution control device 1640, for determination or adjustment of rewards allocated to the user. In some implementations, if charging was restricted to the second charge rate partway through the charge-restriction event, rewards may be prorated to be allocated only for the portion of the charge-restriction event for which charging was restricted to the second rate (i.e., a proportional reward is allocated based on a proportion of the event for which charging is restricted). In other implementations, if charging was enabled at the first rate for any portion of the charge-restriction event, rewards may not be allocated to the user for the charge-restriction event (i.e., rewards may only be allocated in cases where charge rate is restricted for the entirety of the charge-restriction event). However, in such an implementation where prorated rewards are not allocated, a control unit may be programmed to only determine whether a charge level of the battery is above the minimum charge threshold before the beginning of the charge-restriction event, so that the vehicle may be charged at the first charge rate throughout the charge-restriction event (even if the charge level goes above the minimum charge threshold), since no rewards will be issued for partial participation in the charge-restriction event. In some implementations, a proportional reward is allocated based on a quantity of energy which is saved during the charge-restriction event by restricting charging of the battery to the second charge rate instead of enabling charging of the battery at the first charge rate. The quantity of energy can be approximated based on a proportion of time of the charge-restriction event for which charging is restricted to the second charge rate, or a difference in energy (or power) used during the charge-restriction event by restricting charging to the second charge rate instead of enabling charge rate at the first charge rate can be calculated. Determination and allocation of rewards is described in greater detail with reference to FIGS. 20 and 21 below.

FIG. 9 discussed above shows an exemplary charging scenario which can play out in the context of method 1900.

In some implementations, restricting charging to the second charge rate, as in acts 1710 and 1918 discussed with reference to FIGS. 17, 18, and 19 above, entails restricting charging to a charge rate of zero (i.e. disabling charging) as shown in the examples of FIGS. 8, 9, 10, and 12 discussed above. In other implementations, restricting charging to the second charge rate, as in acts 1710 and 1918 discussed with reference to FIGS. 17, 18, and 19 above, entails restricting charging to a charge rate greater than zero but less than the first charge rate, as shown in the examples of FIG. 13 discussed above.

Figure 20:
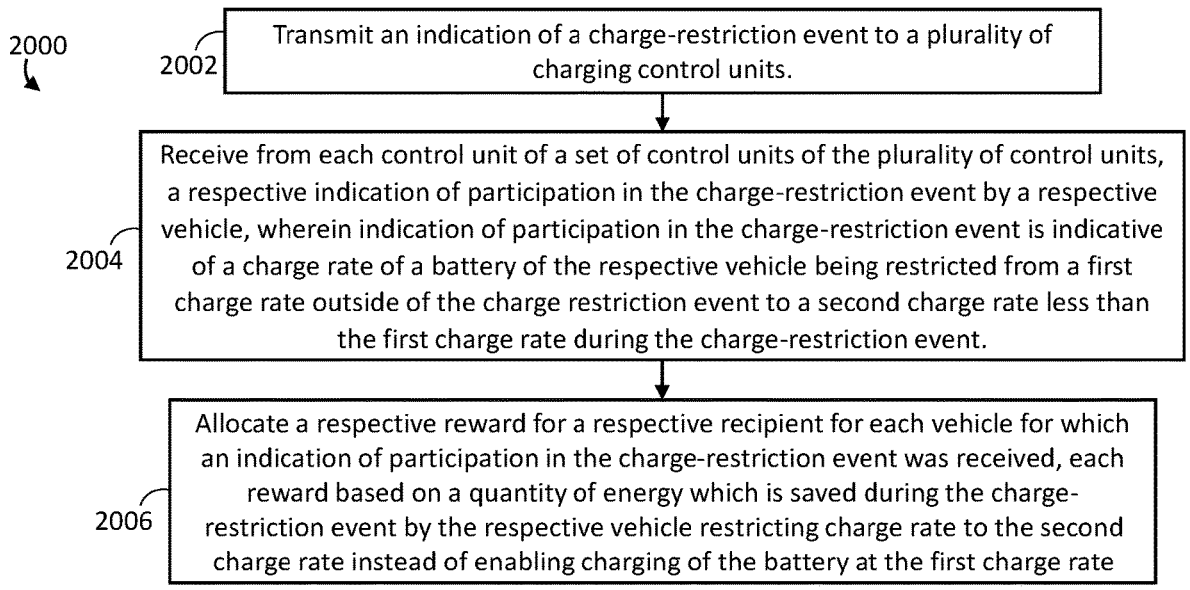

FIG. 20 is a flowchart diagram which illustrates an exemplary method 2000 performed by distribution control device 1640. Method 2000 as illustrated includes acts 2002, 2004, and 2006. One skilled in the art will appreciate that additional acts could be added, acts could be removed, or acts could be reordered as appropriate for a given application. With reference to the example illustrated in FIG. 16, the at least one non-transitory processor-readable storage medium 1644 could have instructions stored thereon, which when executed by the at least one processor 1642 cause the distribution control device 1640 to perform the method 2000.

In act 2002, an indication of a charge-restriction event is transmitted to a plurality of control units which control charging of batteries of respective vehicle (in the example of FIG. 16, charge station 110a, vehicle 100b, remote device 320, and intermediate device 430 comprise such control units). As mentioned above, the term "charge-restriction event" refers to an event (period of time) where a supplier of power (e.g. utility company or government entity) can solicit or control restrictions on charging of vehicle batteries to limit power usage during the charge-restriction event. This alleviates strain or burden on power distribution networks and infrastructure. A charge-restriction event can alternatively be called a "demand-response event" (DRE). Charge-restriction events can be scheduled, based on expected periods of high power usage, or can be initiated as needed (such as an emergency event where power usage needs to be promptly decreased).

An indication of a charge-restriction event can be transmitted by any appropriate means. For example, as described above, an electricity provider may provide a schedule of charge-restriction events, or a notification service which indicates upcoming charge-restriction events, which can be accessed by at least one processor of any of vehicle 100b, charge station 110a, remote device 320, or intermediate device 430. As yet another example, a provider of charge-management software or hardware for any of vehicle 100b, charge station 110a, remote device 320, or intermediate device 430 could provide (transmit) such a schedule or notifications of charge-restriction events (e.g. an electricity provider could notify the provider of charge-management software or hardware of upcoming charge-restriction events, and the provider of charge-management software or hardware can provide an indication (or indications) of a charge-restriction event (or charge restriction events)). Said schedule or notifications of charge-restriction events can also be transmitted directly to any of vehicle 100b, charge station 110a, remote device 320, or intermediate device 430 (e.g. like push notifications). An indication of a charge restriction event can be distributed (e.g. sent to control units corresponding to vehicles; made accessible to control units, etc.) by distribution control device 1640.

In act 2004, the distribution control device 1640 receives, from each control unit of a set of control units of the plurality of control units, a respective indication of participation in the charge-restriction event by a respective vehicle, wherein indication of participation in the charge-restriction event is indicative of a charge rate of a battery of the respective vehicle being restricted from a first charge rate outside of the charge restriction event to a second charge rate less than the first charge rate during the charge-restriction event. Such an indication can be transmitted from a control unit as in act 1714 in method 1700 as discussed with reference to FIG. 17 above. That is, in accordance with method 1700 in FIG. 17, a control unit of a vehicle can determine whether a vehicle participates in a charge-restriction event based on a minimum charge threshold for a battery of the vehicle, and transmit an indication of participation to distribution control device 1640. Receiving an indication from each control unit of a set of control units of the plurality of control units refers to receiving respective indications from vehicles which participated in the charge-restriction event (the set of vehicles, which is not required to be the entire plurality of vehicles), but does not require that other vehicles provide an indication of non-participation in the event (although such indications of non-participation could be received in an optional implementation).

In act 2006, the distribution control device 1640 allocates a respective reward for a respective recipient for each vehicle (e.g. a respective owner for each vehicle) for which an indication of participation in the charge-restriction event was received, each reward based on a quantity of energy which is saved during the charge-restriction event by the respective vehicle restricting charge rate to the second charge rate instead of enabling charging of the battery at the first charge rate. Allocating a reward provides incentive for recipients (e.g. vehicle owners) to participate in charge-restriction events, thereby reducing power usage during charge-restriction events and saving the power distribution entity power capacity at crucial times. "Allocating a reward" can include, as non-limiting examples, providing any appropriate incentive or bonus to a recipient, such as: providing monetary funds (money), providing credit (reduction on a future bill), providing coupons, providing discounts, or providing extra services to a recipient associated with the vehicle which participated in the charge-restriction event.

Figure 21:
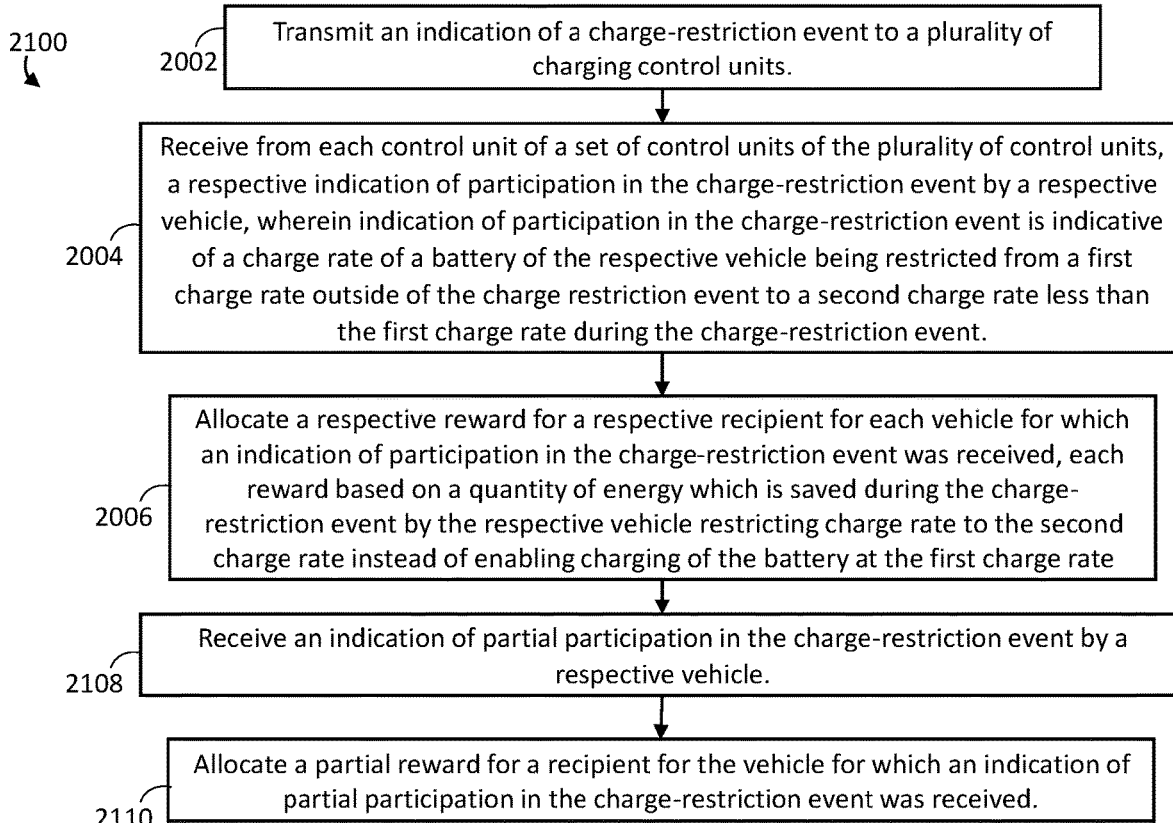

FIG. 21 is a flowchart diagram which illustrates an exemplary method 2100 performed by distribution control device 1640. Method 2100 as illustrated includes acts 2002, 2004, and 2006, similarly to method 2000, and method 2100 also includes acts 2108 and 2110. One skilled in the art will appreciate that additional acts could be added, acts could be removed, or acts could be reordered as appropriate for a given application. With reference to the example illustrated in FIG. 16, the at least one non-transitory processor-readable storage medium 1644 could have instructions stored thereon, which when executed by the at least one processor 1642 cause the distribution control device 1640 to perform the method 2100.

Acts 2002, 2004, and 2006 in method 2100 are similar to as in method 2000; description of these acts with reference to FIG. 20 is also applicable to method 2100 in FIG. 21.

In act 2108, distribution control device 1640 receives an indication of partial participation in the charge-restriction event by a respective vehicle. Partial participation refers to when charge rate of a battery of the respective vehicle is restricted to the second charge rate for only a portion of the charge-restriction event. As one example, method 1800 in FIG. 18 discussed above describes an example where a user can override restriction of charging to the second charge rate, such that the battery is charged at the first charge rate thereafter. In this example, the vehicle can be considered as having participated in the charge-restriction event until the charge rate was enabled at the first charge rate during the charge-restriction event. As another example, method 1900 in FIG. 19 discussed above describes an example where charging of the battery is restricted to the second charge rate partway through the charge-restriction event, in response to the charge level of the battery going above the minimum charge threshold. In both examples, charging of the vehicle battery was not restricted to the second charge rate for the entire charge-restriction event, and hence the vehicle has "partially" participated in the charge-restriction event.

The amount of rewards allocated to a recipient can be determined in any appropriate way. In some implementations, energy savings by the vehicle being restricted to the second charge rate for the charge-restriction event (compared to the vehicle charging at the first charge rate) can be calculated. For example, if the first charge rate is 7 kilowatts (kW), and the second charge rate is 0 kW, and the charge-restriction event is one hour long, than a vehicle (Vehicle A) which fully participates in the charge-restriction event will save 7 kWh (kilowatt-hours) of energy. In this example, if a vehicle (Vehicle B) participates in only 30 minutes (0.5 hours) of the charge-restriction event, only 3.5 kWh of energy will be saved, and thus an allocated reward may be a prorated reward (e.g. half the reward allocated to Vehicle A), a lesser reward, or no reward at all compared to Vehicle A which fully participates in the charge event. In other implementations, calculations can be simplified by allocating reward based on proportion of time a vehicle participates in a charge event. In the above example, the distribution control device 1640 can determine that Vehicle A participated fully in the charge-restriction event and is entitled to full rewards, whereas Vehicle B participated in only half of the charge-restriction event, and is thus only entitled to half the rewards compared to Vehicle A. In yet other implementations, rewards can be allocated based on saved capacity for a given time. In the above example, Vehicle A saves 7 kW of capacity for the entire event, whereas Vehicle B saves 7 kW of capacity for 30 minutes of the event. This can result in partial rewards not being exactly equivalent to partial rewards calculated based on total energy saved over the course of the event. For example, different time segments of the charge-restriction event may have different "reward values"; that is, power capacity saved during one portion of the event may receive higher rewards than power capacity saved during another time portion of the event. Rewards could be higher during a "peak" portion of the event where power capacity savings are most valuable.

In some implementations, allocation of rewards may be based on actual energy saved. For example, a vehicle may be fully charged prior to a charge-restriction event, such that restricting charging of the vehicle to the second charge rate does not save any actual energy (since the vehicle would not charge at the first charge rate anyway). As such, the distribution control device 1640 may not receive an indication of actual restriction of charge rate to the second charge rate (since charge rate was effectively zero anyway), and thus no rewards may be allocated for participation in the charge-restriction event. This model saves a rewards provider or power distributor expense for cases where no actual energy is saved. However, such an arrangement may frustrate reward recipients (e.g. vehicle owners/users) who's charging schedules don't necessarily align with common charge-restriction events, as they will receive less rewards. This may prevent potential recipients from signing up or staying signed up with a rewards program.

In other implementations, allocation of rewards may be based on a calculated "possible" energy saved, regardless of whether actual energy saved actually equals the calculated possible energy saved. For example, a vehicle may be fully charged prior to a charge-restriction event, such that restricting charging of the vehicle to the second charge rate does not save any actual energy (since the vehicle would not charge at the first charge rate anyway). Nonetheless, "possible" energy saved can be calculated by determining how much energy the vehicle would use if it charged at the first charge rate for the duration of the charge-restriction event, and subtracting an amount of energy the vehicle would use if it charged at the second charge rate for the duration of the charge-restriction event. By rewarding recipients (e.g. vehicle owners/users) based on possible energy saved, more recipients are incentivized to enter into rewards programs (even if their usual charging schedules don't necessarily align with common charge-restriction events). However, expense on the reward program or power distribution company are higher because rewards are being allocated even when power isn't actually being saved.

Whether allocation of rewards is based on actual energy saved or possible energy saved should be chosen as appropriate for a given application or scenario.

In addition to the acts in methods 2000 and 2100 discussed with reference to FIGS. 20 and 21, the distribution control device 1640 can also transmit (distribute) helpful information to recipients (e.g. vehicle owners/users). For example, distribution control device 1640 can transmit or make available a schedule of upcoming charge-restriction events to be presented to recipients. As another example, distribution control device 1640 can transmit or make available, to a control unit associated with a given vehicle, an indication of the given vehicle's participation in past charge-restriction events.

Figure 22:
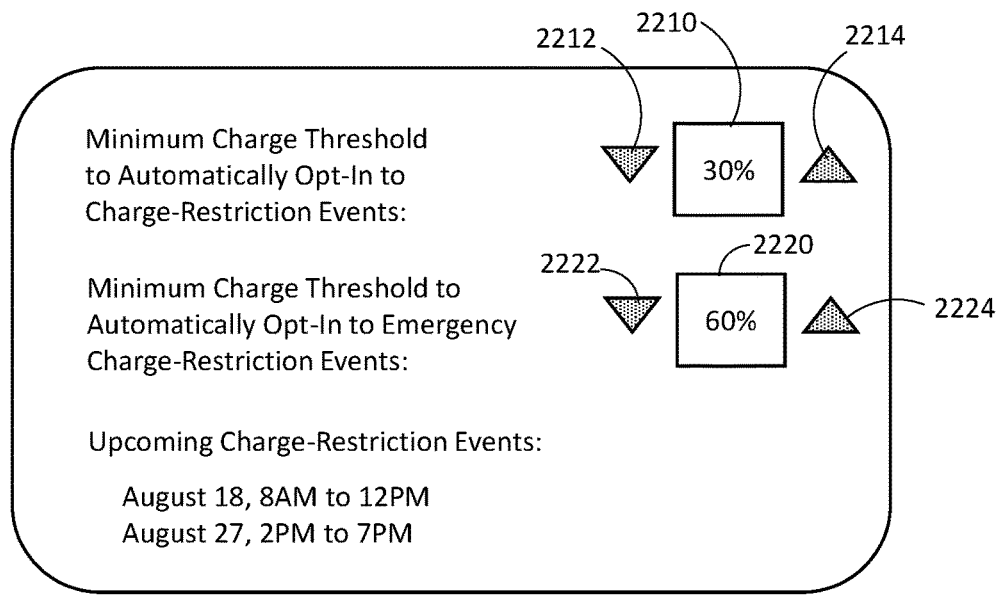
FIG. 22 illustrates an exemplary user interface for setting minimum charge thresholds for participation in charge-restriction events.

FIG. 22 illustrates an exemplary user interface by which a user can input an indication of at least one minimum charge threshold $Min_T$. The interface of FIG. 22 could be presented via any appropriate device, including any of vehicles 100a, 100b, 100c, or 100d; any of charge stations 110a, 110b, 110c, or 110d; remote device 320, intermediate device 430, or any peripheral device, as discussed for example with reference to FIG. 16. For example, the user interface could be presented by screens built into said devices, with corresponding means for receiving user input (e.g. touchscreens, display screens and button interfaces, etc.), or the user interfaces could be presented by a peripheral device such as a smartphone or tablet in communication with said devices.

The user interface illustrated in FIG. 22 shows a current setting for minimum charge threshold for automatically opting into charge-restriction events 2210, which can be adjusted by the user using the up input 2214 or the down input 2212. The user interface illustrated in FIG. 22 also shows a current setting for minimum charge threshold for automatically opting into emergency charge-restriction events 2220, which can be adjusted by the user using the up input 2224 or the down input 2222. The difference between a charge-restriction event and an emergency charge-restriction event can be an amount of advance notice prior to the event. For example, a charge-restriction event can be planned in advance based on expected peaks in power usage, such that recipients (e.g. vehicle owners/users) have plenty of time to plan around the charge-restriction event (e.g. by charging their vehicle battery in advance, or not planning to drive immediately after the event). An emergency charge-restriction event can be initiated with little to no advance warning, such as when a power supplier faces an unexpected surge in power usage. Such emergency events leave little time for recipients to plan around the event, and as such minimum charge threshold for such emergency events can be set higher, to reduce the risk that recipients are caught off guard by unexpected lack of charge in their vehicle. Alternatively, such emergency charge-restriction events can be limited to require manual indication of participation by a recipient; that is, the user may need to explicitly indicate that they agree to participate in an emergency charge-restriction event, instead of the control unit associated with their vehicle automatically participating based on a minimum charge-threshold.

The user interface in FIG. 22 also shows upcoming charge restriction events, so that the recipient may plan around such events. Further, although the interface in FIG. 22 shows up and down controls for inputting minimum charge thresholds, any appropriate form of input could be used, such as sliders, dials, typing in a desired value, etcetera.

Figure 23:
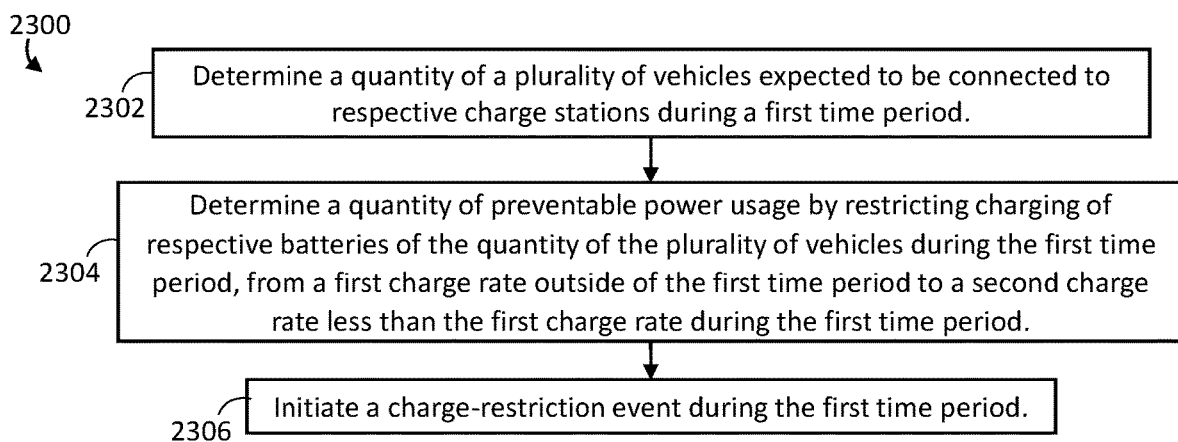
FIG. 23 is a flowchart diagram which illustrates a method of evaluating and initiating a charge-restriction event.

FIG. 23 is a flowchart diagram which illustrates an exemplary method 2300 performed by distribution control device 1640. Method 2300 as illustrated includes acts 2302, 2304, and 2306. One skilled in the art will appreciate that additional acts could be added, acts could be removed, or acts could be reordered as appropriate for a given application. With reference to the example illustrated in FIG. 16, the at least one non-transitory processor-readable storage medium 1644 could have instructions stored thereon, which when executed by the at least one processor 1642 cause the distribution control device 1640 to perform the method 2300.

In act 2302, a quantity of a plurality of vehicles expected to be connected to respective charge stations during a first time period is determined (e.g. by the at least one processor 1642). That is, there is a plurality of vehicles, and of this plurality of vehicles, a quantity of vehicles expected to be connected to respective charge stations during a first time period is determined. The plurality of vehicles could include a number of vehicles such as any of vehicles 100a, 100b, 100c, 100d, or any other appropriate number or type of vehicles. The plurality of vehicles could for example be vehicles which normally connect to charge stations serviced by particular power distribution systems. As an example, the plurality of vehicles could be vehicles typically connected to charge stations within a neighborhood serviced by a common power transformer. As another example, the plurality of vehicles could be vehicles typically connected to charge stations within a region where power is supplied by a common power facility (i.e., a common source of power). It is desirable to determine a quantity of vehicles of the plurality of vehicles expected to be connected to respective charge stations (e.g. how much load is expected on the power supply system), to inform decision-making regarding implementation of charge-restriction events as discussed later.

Act 2302 can include determining a quantity of a plurality of vehicles which are presently connected to respective charge stations based on connection data indicative of connection between each vehicle of the plurality of vehicles and a respective charge station. In the example of FIG. 16, connection data for each of vehicles 100a, 100b, 100c, and 100d can be sent to distribution control device 1640. Such connection data can be sent by the respective vehicles themselves, by charge stations (e.g. charge station 110a), by remote devices (e.g. remote device 320), or by intermediate devices (e.g. intermediate device 430). In some implementations, connection data includes an explicit indication of whether a given vehicle is connected to a respective charge station (e.g., any of processor 116, 206, 326, or 436 can processor sensor data, charge data, or similar data to determine whether a vehicle is connected to a respective charge station, and a result of the processing is sent to distribution control device 1640). In other implementations, connection data includes context data of a given vehicle, from which an inference can be made as to whether the given vehicle is connected to a respective charge station. Detailed implementations for determining whether a given vehicle is connected to a respective charge station are discussed later with reference to FIGS. 25, 26, 27, 28, 29, 30, 31, 32, 33, and 34, and are fully applicable in the context of method 2300 illustrated in FIG. 23. Determining whether a given vehicle is connected to a respective charge station as discussed with reference to FIGS. 25, 26, 27, 28, 29, 30, 31, 32, 33, and 34 can be performed by the at least one processor 1642.

In some implementations, act 2302 can comprise the at least one processor 1642 determining whether each vehicle in the plurality of vehicles is presently connected to a respective charging station. In some examples, connection data may only be sent to distribution control device 1640 for vehicles which are connected to a respective charging station. In such examples, the distribution control device 1640 can infer that vehicles for which connection data is not received are not presently connected to respective charging stations. In this example, "quantity of the plurality of vehicles expected to be connected to respective charge stations" refers to the expectation that vehicles which are presently connected to respective charge stations will stay connected until the first time period, and that additional vehicles will not connect to respective charge stations by the first time period. This expectation can be reasonably accurate, particularly when the first time period is soon, but can be improved upon for greater accuracy.

In other implementations, act 2302 can comprise estimating the quantity of the plurality of vehicles which are expected to be connected based on historical connection data indicative of connection between each vehicle of the plurality of vehicles and a respective charge station. For example, each vehicle of the plurality of vehicles can be associated with a respective schedule indicative of when the vehicle is typically connected to a respective charge station. Such a schedule can be learned and refined by a machine learning algorithm over time. In this example, "quantity of the plurality of vehicles expected to be connected to respective charge stations" refers to a quantity of the plurality of vehicles which are likely to be connected to respective charging stations based on respective schedules for the vehicles.

Advantageously, real-time connection data for each vehicle is not needed when act 2302 is performed based on historical data or schedules. Instead, connection data for each vehicle could be received by distribution control device 1640 when available or at regular intervals, to inform or refine a schedule for the respective vehicle.

In act 2304, a quantity of preventable power usage is determined (e.g. by the at least one processor 1642), where the preventable power usage refers to power that can be saved (or at least usage of power can be deferred to a later time) by restricting charging of respective batteries of the quantity of the plurality of vehicles during the first time period, from a first charge rate outside of the first time period to a second charge rate less than the first charge rate during the first time period. This preventable power usage could be determined by summing a difference between power usage for each vehicle at the first charge rate and power usage for each vehicle at the second rate. Preventable power usage can also be used to determine preventable energy usage, by tabulating preventable power usage over the first time period.

Additionally, predicted preventable power usage can be determined accounting for vehicles which are connected to a respective charge station, but for which a charge-restriction event will not be effective at preventing power consumption. For example, some vehicle owners/users may choose not to participate in a charge-restriction event, such that charging of their vehicles is not restricted. As another example, some vehicles may already be fully charged by the beginning of the charge-restriction event, such that charge rate of such vehicles is already zero or near-zero during the charge-restriction event. Such examples can be accounted for in a number of ways. In one case, predicted preventable power usage can be reduced by a factor derived from historical data on charge-restriction effectiveness. In another case, charge level data for the plurality of vehicles could be communicated to distribution control device 1640, such that vehicles with fully charged batteries will be excluded from predicted preventable power usage calculations. In yet another example, historical data of participation in charge-restrictions events (on an individual level or on an aggregate level) can be used to identify a likelihood of certain vehicles participating in charge-restriction events, so that vehicles which are unlikely to participate can be removed from predicted preventable power usage calculations.

In act 2306, a charge-restriction event is initiated during the first time period. Initiation of the charge-restriction event can be in response to an operator (user) input to initiate the charge-restriction event as discussed later with reference to FIG. 24. Alternatively, initiation of the charge-restriction event can be automatic. For example, the at least one processor 1642 could determine that power usage for a particular service area (e.g. a transformer or power supply facility) is expected to exceed (or is already in excess of) a power output capacity for said service area. In response, the at least one processor 1642 can initiate a charge-restriction event to curb power usage to prevent power outages or damage. In this example, the actual power output capacity for the service area is used as a power distribution threshold for determining whether to initiate a charge-restriction event. In other examples, instead of using the actual power output capacity for a service area as a power distribution threshold, a power distribution threshold which is lower than the actual power output capacity for the service area can be implemented, where a charge-restriction event will be initiated if the expected (or actual) power usage is above the power distribution threshold, even if power usage is not expected to exceed (or is not already in excess of) the actual power output capacity for the service area. This provides extra flexibility in the event power usage increase further.

In some implementations, charge-restriction events can be mandatory. For example, with reference to FIG. 16, an instruction can be sent to any of vehicles 100a, 100b, 100c, 100d, charge station 110a, remote device 320, or intermediate device 430 to restrict charging of a battery of the vehicle to the second charge rate. This achieves close compliance with predicted power usage savings.

In other implementations, charge-restriction events can be optional. For example, with reference to FIG. 16, an indication of a charge-restriction event can be sent to any of vehicles 100a, 100b, 100c, 100d, charge station 110a, remote device 320, or intermediate device 430 to offer an option to restrict charging of a battery of the respective vehicle to the second charge rate. This provides vehicles owners/users with greater flexibility to opt in (e.g. in exchange for allocation of rewards) or opt out of a charge-restriction event. Such opting in can be performed automatically, as discussed above with reference to FIGS. 17-22. Allocation of rewards is also described above with reference to FIGS. 17-22.

Figure 24:
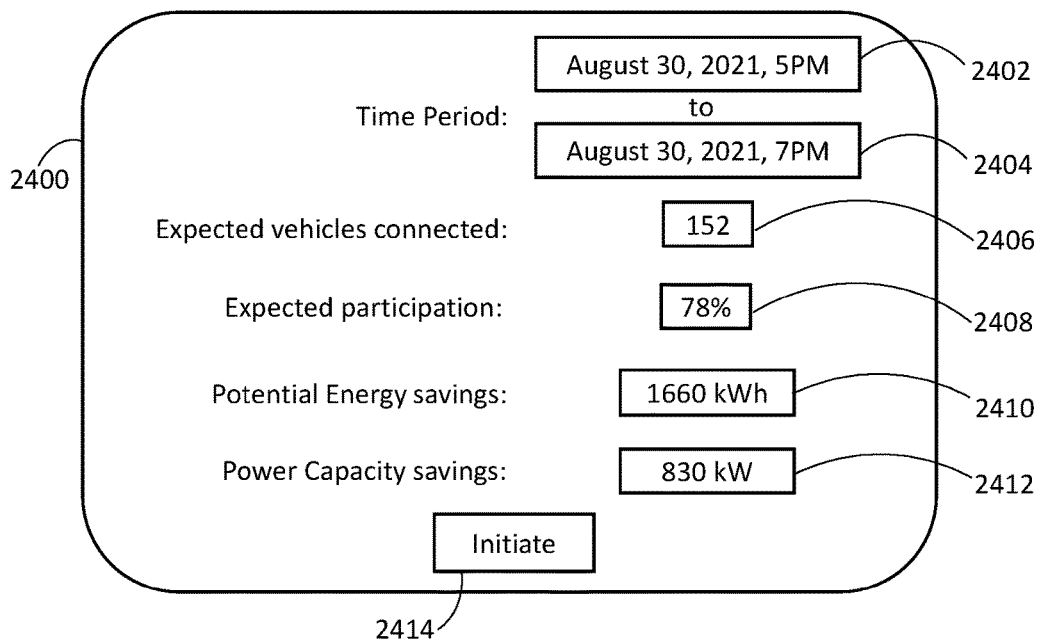
FIG. 24 illustrates an operator interface for evaluating and initiating a charge-restriction event.

FIG. 24 illustrates an exemplary operator (user) interface 2400 for controlling and initiating charge-restriction events, as could be used with method 2300 in FIG. 23. One skilled in the art will appreciate that while interface 2400 is shown as including certain interface elements, other interface elements could be added, or some interface elements could be removed, as appropriate for a given application. Interface 2400 can be run, for example, on distribution control device 1600 in FIG. 16, or a terminal included therein. For example, distribution control device 1600 could comprise a plurality of operator (user) terminals, such that a plurality of operators can control and initiate charge-restriction events. Such terminals could comprise respective processors for controlling and initiating charge-restriction events, or could rely on at least one centralized processor of the distribution control device 1640. Both examples (respective processors in terminals, or centralized processors utilized by terminals) are encompassed in the terminology "at least one processor 1642".

Interface 2400 is shown as including time period interface elements 2402 and 2404. In some implementations, interface elements 2402 and 2404 can be used by a user to input the first time period in method 2300 discussed above with reference to FIG. 23, by inputting a beginning and an end of the first time period, respectively. In some implementations, the first time period shown by interface elements 2402 and 2404 can be initialized automatically. For example, the at least one processor 1642 can determine a peak time period where the quantity of the plurality of vehicles expected to be connected to respective charge stations is greater than other periods. Such a scenario is useful for a charge-restriction event because it is likely that greater reduction in power usage can be achieved than at other times. As another example, the at least one processor 1642 can determine a time period where power usage for a service area is expected to exceed a power distribution threshold (as discussed above). Determinations of the first time period by the at least one processor 1642 can be based on historical data, such as schedules when vehicles are connected to respective charging stations, or historical power usage data. In some implementations, the first time period in interface elements 2402 and 2404 can be initialized automatically as above, and adjusted manually by an operator. In other implementations, the first time period in interface elements 2402 and 2404 can be set automatically as above, and may not be manually adjustable by an operator.

Interface elements 2402 and 2404 are illustrated as being time and date fields, but any other appropriate format of interface could be used, such as sliding time bars, calendar listings, etcetera.

Interface element 2406 is a counter which shows a quantity of vehicles expected to be connected to respective charge stations during the first time period (as discussed in detail above with reference to FIG. 23).

Interface element 2408 shows an expected participation rate for a charge-restriction event during the first time period. Interface element 2408 can be omitted in implementations where participation in charge-restriction events is mandatory. In some implementations, expected participation rate can be determined for example by the at least one processor 1642 determining the likelihood of each vehicle which is expected to be connected to a respective charging station during the first time period restricting charging from the first charge rate to the second charge rate (as discussed above with reference to FIGS. 17, 18, 19, 20, and 21). This determination can be based on historical data, such as how often a vehicle participates in charge-restriction events, what times and dates a vehicle typically participates in charge-restriction events, a charge-level of the vehicle battery and for what charge level of the battery the vehicle typically participates in charge-restriction events, or any other appropriate information. In other implementations, expected participation rate can be determined based on historical participation rates for the service area of interest (as opposed to a per-vehicle determination).

Interface element 2410 illustrates potential energy savings for a charge-restriction event initiated for the first time period. The potential energy savings can be a function of a quantity of vehicles expected to participate in the event, the first and second charge rates for said vehicles, and the duration of the charge-restriction event. In some implementations, the number of vehicles expected to participate in the event can be based on the participation rate (as shown in interface element 2408) and the quantity of vehicles expected to be connected to respective charge stations (as shown in interface element 2406). In other implementations, the number of vehicles expected to participate in the event can be determined based on historical participation numbers for the service area of interest (interface elements 2406 and 2408 can be omitted, with the number of vehicles expected to participate in the event being determined directly). In some implementations, the first charge rate for said vehicles can be identified on a per-vehicle basis, such that actual charging capabilities of each vehicle/charge station can be tabulated to provide an accurate estimation of potential energy savings. In other implementations, the first charge rate for said vehicles can be identified broadly, such as an average charge rate (which may or may not be an average based on vehicles in the service area of interest). The second charge rate can be set by an operator via interface 2400 (specific element not illustrated), or can be set by the at least one processor 1642.

Interface element 2412 illustrates potential power capacity savings for a charge-restriction event initiated for the first time period. The potential energy savings can be a function of a quantity of vehicles expected to participate in the event and the first and second charge rates for said vehicles. Potential energy savings can be determined similarly to potential energy savings discussed above with reference to interface element 2410. However, potential power capacity savings refers to power output capacity of a power distribution system which is released (i.e., not burdened) during the first time period. That is, potential power capacity savings refers not to total energy saved over the course of the charge-restriction event, but rather refers to power capacity available in a given moment, which is saved by the charge-restriction event.

Interface element 2414 is a control which an operator uses to initiate a charge-restriction event. If the operator is satisfied with the savings the charge-restriction event during the first time period can achieve, the operator can interact with interface element 2414, thereby providing an instruction to proceed with the charge-restriction event. Interface element 2414 is an optional element, which can be eliminated in implementations where initiation of charge-restriction events is automatic (i.e. does not require manual approval).

As discussed above with reference to FIGS. 23 and 24, it is desirable to be able to determine whether a given vehicle is coupled to a respective charge station. In some cases, this can be determined based on charge data for the vehicle which is indicative of the vehicle being charged, and thereby indicative of the vehicle being connected to a respective charge station. However, it is desirable to determine whether a vehicle is connected to a respective charge station, even if the vehicle is not presently charging. This can be inferred by at least one processor (e.g. any of processors 116, 206, 326, 436, or 1642 discussed above with reference to FIGS. 1, 2, 3, 4, and 16) based on "connection data", which broadly refers to data which is indicative of a vehicle being connected to a respective charge station, or provides context information which can be used to infer whether the vehicle is connected to a respective charge station.

Figure 25A:
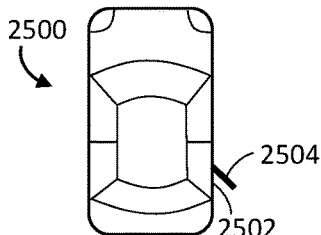
FIG. 25A is a top view of a vehicle having an open charge port cover.

FIG. 25A is a top view of a vehicle 2500, having a charge port 2502. Charge port 2502 is connectable to a charge station (e.g. by a power cord), to receive power from the charge station and provide the received power to a battery of the vehicle (not shown to avoid clutter). Charge port 2502 is covered by a charge port cover 2504 (shown as a hinge door, but any appropriate cover construction, such as a sliding construction, could be used). A state of charge port cover 2504 can be indicated by a sensor associated with cover 2504. As one example, a depression switch could be included at or adjacent the charge port 2502, or on cover 2504. As another example, an electrical contact circuit could be included at or adjacent the charge port 2502, or on cover 2504. Whether cover 2504 is open or closed can be indicated by the state of the sensor (depression switch or electrical contact circuit in the examples). For example, closing cover 2504 could depress the switch, or complete the electrical contact circuit, providing a signal that the cover 2504 is closed. By inference, if the cover is not closed, it can be considered to be open. In another example, opening cover 2504 could depress the switch, or complete the electrical contact circuit (e.g. if the switch or electrical contacts are provided on the hinge of cover 2504, or are activated by sliding cover 2504 to the open position. In this example, a signal is provided that the cover 2504 is open, and by inference, if the cover is not open, it can be considered to be closed. Data from any sensors associated with charge port 2502 and cover 2504 can be used as "connection data" mentioned above to infer whether the vehicle is connected to a respective charge station.

Inferring whether a vehicle is connected to a respective charge station can be performed based on connection data indicating the state of cover 2504. However, there are cases where such inferences will not be correct. For example, a user could forget to close cover 2504 before driving. As another example, vehicle 2500 could be connect to a charge station, which is not considered as a "respective" or "corresponding" charge station for the vehicle 2500, for the purposes of assessing charge-restriction events. In an example scenario, a "respective" charge station for vehicle 2500 could be considered as a charge station located at a residence of the owner of vehicle 2500. Vehicle 2500 could be connected to a public charge station remote from a residence of the owner of vehicle 2500, but this may not qualify as a "respective" charge station for the vehicle 2500. In particular, for a power distribution entity wishing to restrict charging in a given service area including the vehicle owner's residence, restricting charging at the public charge station may not achieve the goal of reducing power consumption in the service area of interest.

Figure 25B:
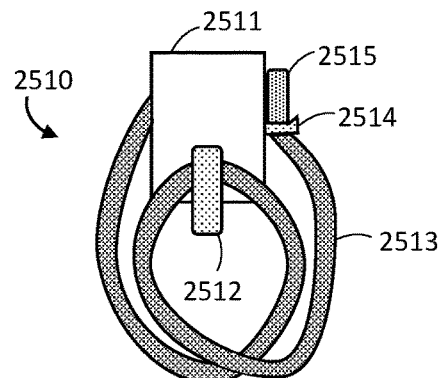
FIG. 25B is a front view of a charge station.

FIG. 25B is a front view of a charge station 2510, having a body 2511, power cord 2513, cord holder 2512, power couple 2515, and couple holder 2514. Body 2511 contains electrical hardware or circuitry to receive power (e.g. from a breaker panel of a building or other power distribution system), and convert the received power to a format (e.g. amperage and voltage) acceptable to a vehicle. A first end of power cord 2513 is coupled to body 2511, and a second end of power cord 2513 is coupled to power couple 2515. Power couple 2515 is operable to connect to a charge port of a vehicle (e.g. charge port 2502 in FIG. 25A). Body 2511 is operable to output power to a vehicle via power cord 2513 and power couple 2515. Cord holder 2512 is operable to hold power cord 2513 for storage, and couple holder 2514 is operable to hold power couple 2515 for storage. Cord holder 2512 and couple holder 2514 are shown as hooks, but any appropriate storage mechanism can be used, such as reels, clips, magnetic couples, etcetera. A storage state of power cord 2513 and/or power couple 2515 can be indicated by at least one sensor associated with charge station 2510. As one example, a depression switch could be included on or proximate couple holder 2514, where the state of the depression switch indicates whether power couple 2515 is stored or not. A similar depression switch could be included on or proximate cord holder 2512, where the state of the depression switch indicates whether power cord 2513 is stored or not. Instead of depression switches, any appropriate detection mechanism (sensor) could be implemented, such as an electrical contact circuit. Further, detection mechanisms (sensors) do not necessarily have to directly contact the power cord 2513 or the power couple 2515. As an example, cord holder 2512 could move in response to weight of power cord 2513 when stored, or couple holder 2514 could move in response to weight of power couple 2515 when stored. The movement of cord holder 2512 or couple holder 2514 can activate a respective detection mechanism (sensor), which is indicative the power cord 2513 or the power couple 2515 being stored.

Data from any detection mechanisms (sensors) associated with storage of power cord 2513 or power couple 2515 can be used as "connection data" mentioned above to infer whether the vehicle is connected to a respective charge station. In particular, if power couple 2515 is stored, an inference can be made that the vehicle is not coupled to charge station 2510. Similarly, if power cord 2513 is stored, an inference can be made that the vehicle is not coupled to charge station 2510 (however, this inference may have less weight than a determination of the power couple 2515 being stored, because it is possible that a vehicle is close enough to charge station 2510 that the vehicle can be connected to charge station 2510 without removing power cord 2513 entirely from cord holder 2512). If it is determined that power couple 2515 or power cord 2513 are not stored, an inference can be made that a vehicle is coupled to charge station 2510. This inference may not be entirely accurate however, as it is possible to unplug a vehicle from charge station 2510, without properly storing power cord 2513 or power couple 2515. As such, it may be desirable to increase accuracy of an inference of a vehicle being connected to charge station 2510 with additional connection data as discussed below.

In some implementations, power couple 2515 in FIG. 25b could have a detection mechanism (sensor) which detects when power couple 2515 is connected to a vehicle. For example, power couple 2515 can have a depression switch, electrical contact circuit, or any other appropriate detection mechanism to detect when power couple 2515 is coupled to a vehicle. Similarly, in implementations where an intermediate device 430 (as described above with reference to FIG. 4) couples between power couple 2515 and a vehicle, intermediate device 430 can have a detection mechanism (sensor) which detects when intermediate device 430 is connected to a vehicle. Such a detection mechanism can include a depression switch, electrical contact circuit, or any other appropriate detection mechanism to detect when intermediate device 430 is coupled to a vehicle.

Additional information can be used or included in the connection data to increase accuracy of inferences, as discussed in several examples with reference to FIGS. 26, 27, 28, 29, 30, 31, 32, 33, and 34 below.

Figure 26:
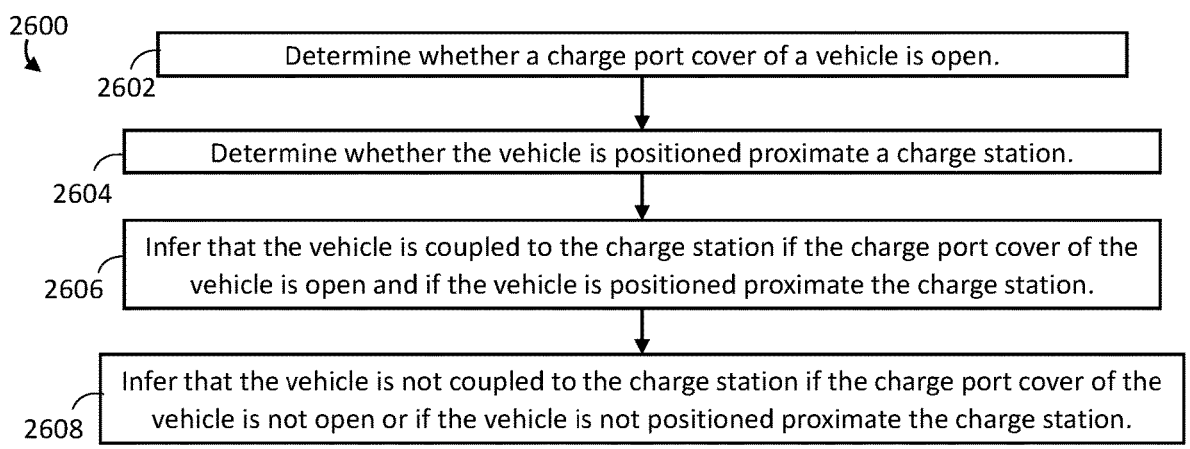
FIG. 26 is a flowchart diagram which illustrates a method of inferring whether a vehicle is connect to a charge station.

FIG. 26 is a flowchart diagram which illustrates an exemplary method 2600 for inferring whether a vehicle is connected to a respective charge station. Method 2600 as illustrated includes acts 2602, 2604, 2606, and 2608. One skilled in the art will appreciate that additional acts could be added, acts could be removed, or acts could be reordered as appropriate for a given application. The acts of method 2600 can be performed by any of processors 116, 206, 326, 436, or 1642 as discussed above with reference to FIGS. 1, 2, 3, 4, and 16. Any of at least one non-transitory processor-readable storage mediums 118, 208, 328, 438, or 1644 could have instructions stored thereon, which when executed by a respective at least one processor cause the respective at least one processor to perform the method 2600.

In act 2602, a determination is made as to whether a charge port cover of a vehicle is open, as discussed above with reference to FIG. 25A.

In act 2604, a determination is made as to whether the vehicle is positioned proximate a charge station. Examples of this are discussed below with reference to FIGS. 27 and 28.

In act 2606, an inference is made that the vehicle is coupled to the charge station if the charge port cover of the vehicle is open and if the vehicle is positioned proximate the charge station.

In act 2608, an inference is made that the vehicle is not coupled to the charge station if the charge port cover of the vehicle is not open or if the vehicle is not positioned proximate the charge station.

Figure 27:
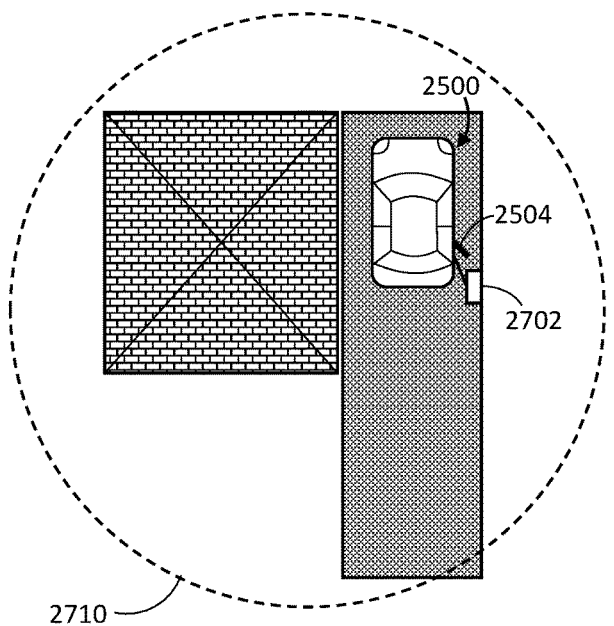
FIGS. 27 and 28 are top views of exemplary scenarios for determining whether a vehicle is proximate a charge station.

FIG. 27 is a top view of an exemplary scenario where a vehicle 2500 is within a threshold distance 2710 of the residence of an owner of the vehicle (or in some implementations, within a threshold distance of a charge station 2702 associated with the residence). In this scenario, act 2604 comprises determining whether the position of vehicle 2500 is within a distance threshold of the residence (or within a distance threshold of the charge station 2702). While the exemplary scenario relates to a residence of a vehicle owner, the distance threshold can be set at any appropriate location, such as a workplace or vehicle storage location.

Figure 28:
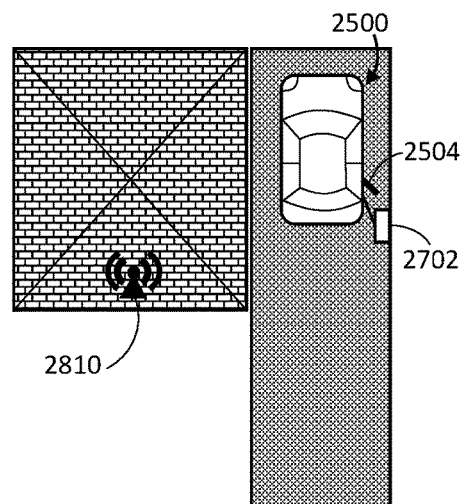

FIG. 28 is a top view of an exemplary scenario where a vehicle 2500 connects with a wireless network 2810 associated with the residence of an owner of the vehicle (or in some implementations, associated with a charge station 2702 associated with the residence). In this scenario, act 2604 comprises determining whether the vehicle 2500 is communicatively coupled to a wireless network 2810 associated with the residence (or the charge station 2702) based on communication data at a communication interface of the vehicle 2500. In the example, the residence can have a short-range wireless network 2810, which vehicle 2500 automatically connects to when vehicle 2500 is within range of the wireless network 2810. Consequently, if vehicle 2500 is able to connect to wireless network 2810, then vehicle 2500 is proximate to the charge station 2702. While the exemplary scenario relates to a residence of a vehicle owner, the distance threshold can be set at any appropriate location, such as a workplace or vehicle storage location.

Figure 29:
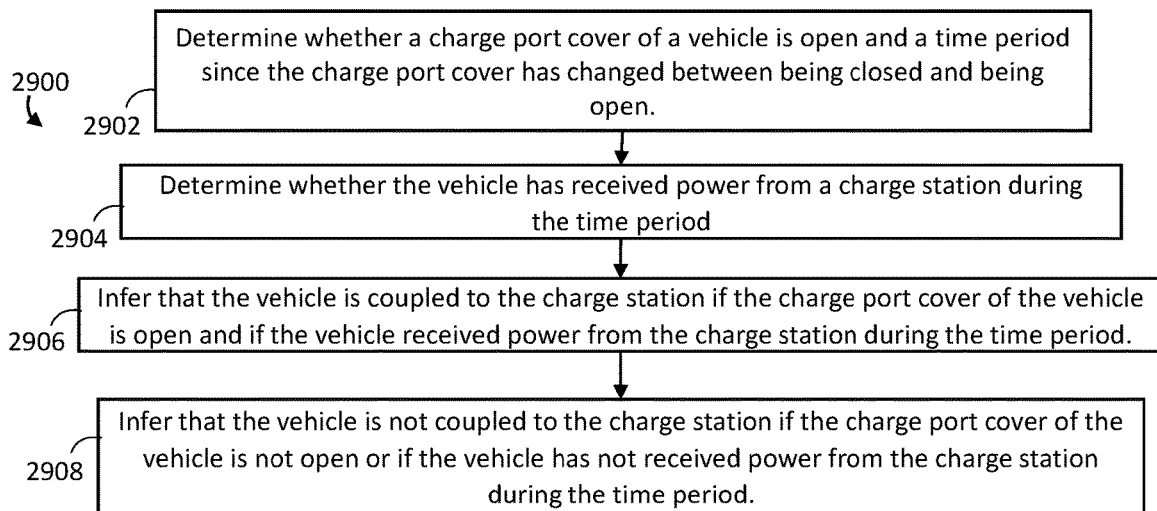
FIGS. 29, 30, 31, 32, 33, and 34 are flowchart diagrams which illustrate exemplary methods of inferring whether a vehicle is connected to a charge station.

FIG. 29 is a flowchart diagram which illustrates an exemplary method 2900 for inferring whether a vehicle is connected to a respective charge station. Method 2900 as illustrated includes acts 2902, 2904, 2906, and 2908. One skilled in the art will appreciate that additional acts could be added, acts could be removed, or acts could be reordered as appropriate for a given application. The acts of method 2900 can be performed by any of processors 116, 206, 326, 436, or 1642 as discussed above with reference to FIGS. 1, 2, 3, 4, and 16. Any of at least one non-transitory processor-readable storage mediums 118, 208, 328, 438, or 1644 could have instructions stored thereon, which when executed by a respective at least one processor cause the respective at least one processor to perform the method 2900.

In act 2902, a determination is made as to whether a charge port cover of a vehicle is open, as discussed above with reference to FIG. 25A. Further, a time period since the charge port cover has changed between being closed and being open is also determined. For example, a non-transitory processor-readable storage medium of the vehicle could store sensor data which indicates open events and/or close events for the charge port cover. In act 2902 a time period since such an event can be determined.

In act 2904, a determination is made as to whether the vehicle has received power from the charge station during the time period determined in act 2902. That is, it is determined whether the vehicle has charged since the charge port cover was opened. This determination can be made based on charge sensor data from the vehicle (i.e. a sensor on the vehicle which monitors incoming power), or from charge sensor data from the charge station (i.e. a sensor on the charge station which monitors output power).

In act 2906, an inference is made that the vehicle is coupled to the charge station if the charge port cover of the vehicle is open and if the vehicle received power from the charge station during the time period determined in act 2902. In an example, this can be indicative that the vehicle is still connected to the charge station even though the vehicle may no longer be charging (e.g. the vehicle battery is now fully charged).

In act 2908, an inference is made that the vehicle is not coupled to the charge station if the charge port cover of the vehicle is not open or if the vehicle has not received power from the charge station during the time period determined in act 2902. In an example, this can be indicative that the vehicle was never connected to the charge station in the time period, since the vehicle was never charged.

Figure 30:
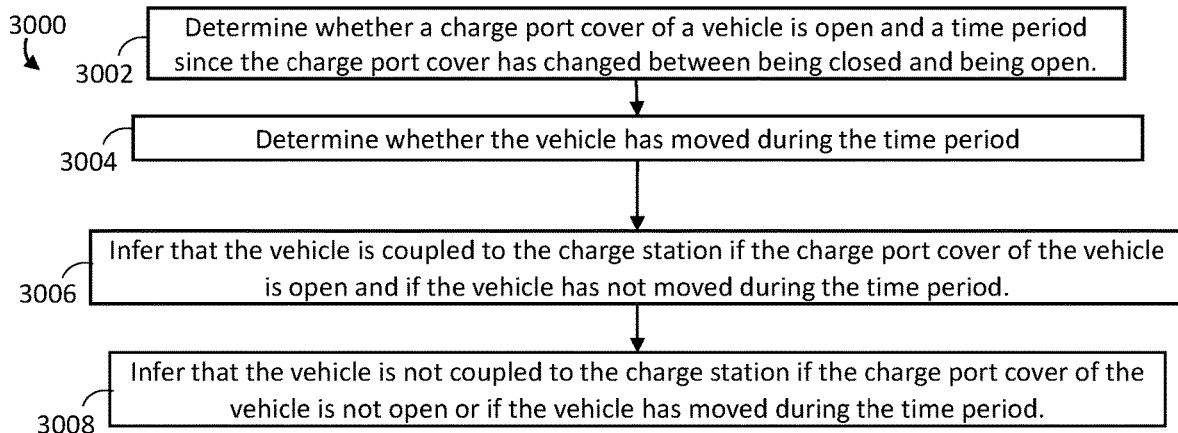

FIG. 30 is a flowchart diagram which illustrates an exemplary method 3000 for inferring whether a vehicle is connected to a respective charge station. Method 3000 as illustrated includes acts 3002, 3004, 3006, and 3008. One skilled in the art will appreciate that additional acts could be added, acts could be removed, or acts could be reordered as appropriate for a given application. The acts of method 3000 can be performed by any of processors 116, 206, 326, 436, or 1642 as discussed above with reference to FIGS. 1, 2, 3, 4, and 16. Any of at least one non-transitory processor-readable storage mediums 118, 208, 328, 438, or 1644 could have instructions stored thereon, which when executed by a respective at least one processor cause the respective at least one processor to perform the method 3000.

In act 3002, a determination is made as to whether a charge port cover of a vehicle is open, as discussed above with reference to FIG. 25A. Further, a time period since the charge port cover has changed between being closed and being open is also determined. For example, a non-transitory processor-readable storage medium of the vehicle could store sensor data which indicates open events and/or close events for the charge port cover. In act 3002 a time period since such an event can be determined.

In act 3004, a determination is made as to whether the vehicle has moved during the time period determined in act 3002. That is, it is determined whether the vehicle has moved since the charge port cover was opened. This determination can be made based on sensor data from the vehicle, such as position data from a position sensor indicating position of the vehicle over time, velocity data from a velocity sensor (e.g. wheel rotation sensor or speedometer) indicating movement speed of the vehicle, interior data from an inertial sensor (e.g. gyroscope, IMU, or accelerometer) indicating acceleration of the vehicle.

In act 3006, an inference is made that the vehicle is coupled to the charge station if the charge port cover of the vehicle is open and if the vehicle has not moved during the time period determined in act 3002. In an example, this can be indicative that the vehicle is connected to the charge station in that the charge port cover was opened, and the vehicle has not moved since.

In act 3008, an inference is made that the vehicle is not coupled to the charge station if the charge port cover of the vehicle is not open or if the vehicle has moved during the time period determined in act 3002. In an example, this can be indicative that the vehicle was never connected to the charge station in the time period, since the vehicle cannot be connected to a charge station while moving.

As discussed above with reference to FIG. 25B, whether a power couple 2515 or power cord 2513 of a charge station is stored can be used as connection data to infer whether a vehicle is connected to a charge station. In the context of methods 2600, 2900, and 3000 discussed with reference to FIGS. 26, 29, and 30, respectively, an act can be added of determining, by at least one processor, whether a power couple or power cord of a charge station is stored. If the power couple of the charge station is stored, an inference can be made that the vehicle is not coupled to the charge station. If the power cord of the charge station is stored, an inference can be made (or an inference can be strengthened) that the vehicle is not coupled to the charge station. If the power cord or power couple of the charge station is not stored, an inference can be made (or an inference can be strengthened) that the vehicle is coupled to the charge station. An a storage state of the power cord 2513 or power couple 2515 can be analyzed in combination with other connection data to determine whether the vehicle is coupled to the charge station.

Figure 31:
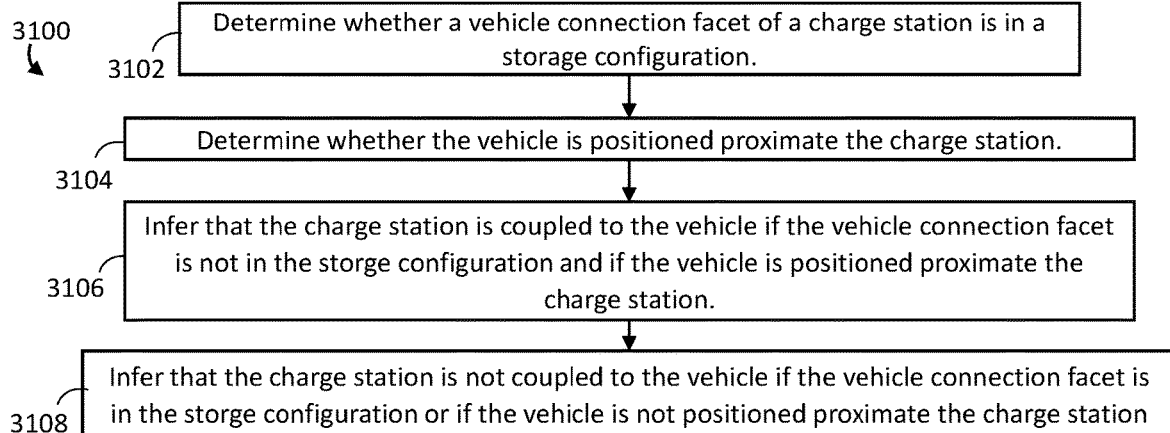
Figure 32:
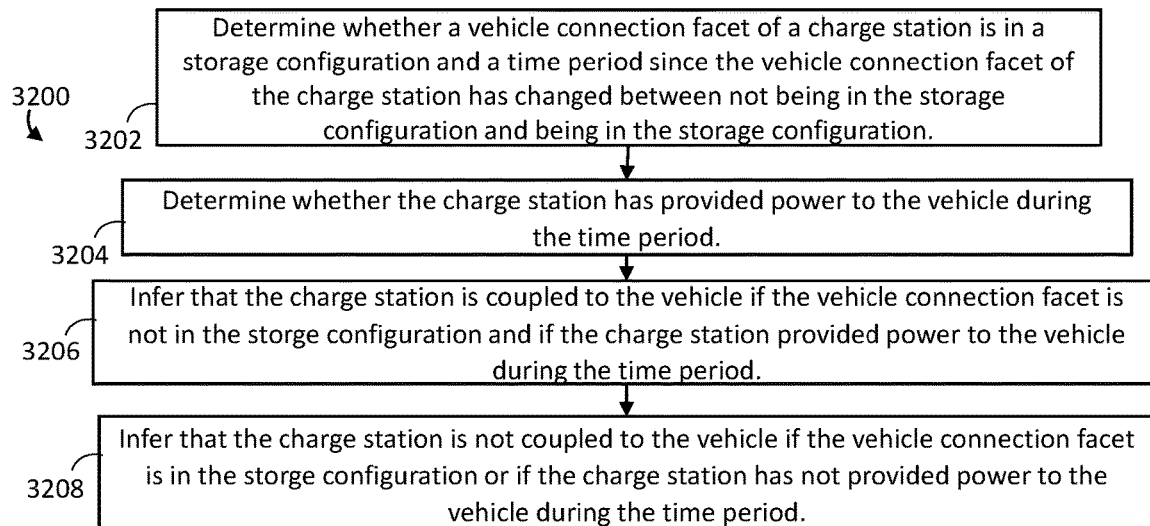
Figure 33:
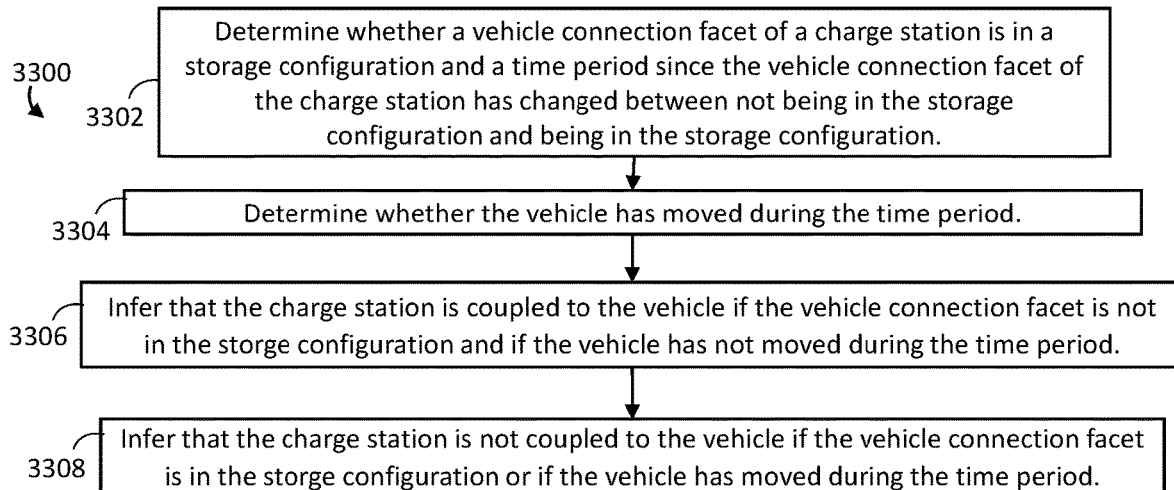

Alternatively, in the context of methods 2600, 2900, and 3000 discussed with reference to FIGS. 26, 29, and 30, respectively, in acts 2602, 2902, and 3002, instead of determining whether a charge port cover of a vehicle is open, a determination can be made as to whether a power couple or power cord of a charge station is stored. Subsequent acts where inferences are made based on whether the charge port cover is open or not can instead be based on whether a power couple or power cord of a charge station is stored. If the power couple of the charge station is stored, an inference can be made that the vehicle is not coupled to the charge station. If the power cord of the charge station is stored, an inference can be made (or an inference can be strengthened) that the vehicle is not coupled to the charge station. If the power cord or power couple of the charge station is not stored, an inference can be made (or an inference can be strengthened) that the vehicle is coupled to the charge station. FIGS. 31, 32, and 33 below discuss exemplary implementations where a determination can be made as to whether a power couple or power cord of a charge station is stored, for inferring whether a charge station is coupled to a vehicle.

FIG. 31 is a flowchart diagram which illustrates an exemplary method 3100 for inferring whether a charge station is connected to a vehicle. Method 3100 as illustrated includes acts 3102, 3104, 3106, and 3108. One skilled in the art will appreciate that additional acts could be added, acts could be removed, or acts could be reordered as appropriate for a given application. The acts of method 3100 can be performed by any of processors 116, 206, 326, 436, or 1642 as discussed above with reference to FIGS. 1, 2, 3, 4, and 16. Any of at least one non-transitory processor-readable storage mediums 118, 208, 328, 438, or 1644 could have instructions stored thereon, which when executed by a respective at least one processor cause the respective at least one processor to perform the method 3100.

In act 3102, a determination is made as to whether a vehicle connection facet of a charge station is in a storage connection. "Vehicle connection facet" generally refers to a component which connects the charge station to a vehicle, and can include power cord 2513 or power couple 2515 in FIG. 25B discussed above. As discussed above with reference to FIG. 25B, a sensor or detection mechanism can be used to collect connection data regarding whether the power cord 2513 or power couple 2515 is in a storage configuration (i.e., stored on the charging station in a position that impedes connection to a vehicle).

In act 3104, a determination is made as to whether the vehicle is positioned proximate a charge station. Examples of this are discussed above with reference to FIGS. 27 and 28, and are fully applicable to method 3100. Determination of the vehicle being positioned proximate the charge station does not necessarily require data from the vehicle. For example, with reference to FIG. 28, data can be received from the wireless network 2810 that the vehicle 2500 is connected to the network.

In act 3106, an inference is made that the charge station is coupled to the vehicle if the vehicle connection facet is not in the storge configuration and if the vehicle is positioned proximate the charge station.

In act 3108, an inference is made that that the charge station is not coupled to the vehicle if the vehicle connection facet is in the storge configuration, or if the vehicle is not positioned proximate the charge station.

FIG. 32 is a flowchart diagram which illustrates an exemplary method 3200 for inferring whether a charge station is connected to a vehicle. Method 3200 as illustrated includes acts 3202, 3204, 3206, and 3208. One skilled in the art will appreciate that additional acts could be added, acts could be removed, or acts could be reordered as appropriate for a given application. The acts of method 3200 can be performed by any of processors 116, 206, 326, 436, or 1642 as discussed above with reference to FIGS. 1, 2, 3, 4, and 16. Any of at least one non-transitory processor-readable storage mediums 118, 208, 328, 438, or 1644 could have instructions stored thereon, which when executed by a respective at least one processor cause the respective at least one processor to perform the method 3200.

In act 3202, a determination is made as to whether a vehicle connection facet of a charge station is in a storage configuration, similarly to as discussed above regarding act 3102 in method 3100. Further, a time period since the vehicle connection facet of the charge station has changed between not being in the storage configuration and being in the storage configuration is also determined. For example, a non-transitory processor-readable storage medium of the charge station could store sensor data which indicates storage events and/or storage retrieval events for the vehicle connection facet (e.g. events where the vehicle connection facet is placed in the storage configuration, or removed from the storage configuration). In act 3202 a time period since such an event can be determined.

In act 3204, a determination is made as to whether the charge station has provided power to the vehicle during the time period determined in act 3202. That is, it is determined whether the vehicle has been charged since the vehicle connection facet was removed from the storage configuration. This determination can be made based on charge sensor data from the vehicle (i.e. a sensor on the vehicle which monitors incoming power), or from charge sensor data from the charge station (i.e. a sensor on the charge station which monitors output power).

In act 3206, an inference is made that the charge station is coupled to the vehicle if the vehicle connection facet is not in the storge configuration and if the charge station provided power to the vehicle during the time period determined in act 3202. In an example, this can be indicative that the vehicle is still connected to the charge station even though the vehicle may no longer be charging (e.g. the vehicle battery is now fully charged).

In act 3208, an inference is made that the charge station is not coupled to the vehicle if the vehicle connection facet is in the storge configuration or if the charge station has not provided power to the vehicle during the time period determined in act 3202. In an example, this can be indicative that the vehicle was never connected to the charge station in the time period, since the vehicle was never charged.

FIG. 33 is a flowchart diagram which illustrates an exemplary method 3300 for inferring whether a charge station is connected to vehicle. Method 3300 as illustrated includes acts 3302, 3304, 3306, and 3308. One skilled in the art will appreciate that additional acts could be added, acts could be removed, or acts could be reordered as appropriate for a given application. The acts of method 3300 can be performed by any of processors 116, 206, 326, 436, or 1642 as discussed above with reference to FIGS. 1, 2, 3, 4, and 16. Any of at least one non-transitory processor-readable storage mediums 118, 208, 328, 438, or 1644 could have instructions stored thereon, which when executed by a respective at least one processor cause the respective at least one processor to perform the method 3300.

In act 3302, a determination is made as to whether a vehicle connection facet of a charge station is in a storage configuration. Further, a time period since the vehicle connection facet of the charge station has changed between not being in the storage configuration and being in the storage configuration is also determined, similarly to as in act 3202 in method 3200 discussed above.

In act 3304, a determination is made as to whether the vehicle has moved during the time period determined in act 3302. That is, it is determined whether the vehicle has moved since the vehicle connection facet was removed from the storage configuration. This determination can be made based on sensor data from the vehicle, such as position data from a position sensor indicating position of the vehicle over time, velocity data from a velocity sensor (e.g. wheel rotation sensor or speedometer) indicating movement speed of the vehicle, interior data from an inertial sensor (e.g. gyroscope, IMU, or accelerometer) indicating acceleration of the vehicle.

In act 3306, an inference is made that the charge station is coupled to the vehicle if the vehicle connection facet is not in the storge configuration and if the vehicle has not moved during the time period determined in act 3302. In an example, this can be indicative that the charge station is connected to the vehicle, in that the vehicle connection facet was removed from the storage configuration, and the vehicle has not moved since.

In act 3308, an inference is made that the charge station is not coupled to the vehicle if the vehicle connection facet is in the storge configuration or if the vehicle has moved during the time period determined in act 3002. In an example, this can be indicative that the charge station was never connected to the vehicle in the time period, since the vehicle cannot be connected to a charge station while moving.

As discussed above with reference to FIG. 25A, whether a charge port cover of a vehicle is open or closed can be used as connection data to infer whether the vehicle is connected to a charge station. In the context of methods 3100, 3200, and 3300 discussed with reference to FIGS. 31, 32, and 33, respectively, an act can be added of determining, by at least one processor, whether a charge port cover of the vehicle is open. If the charge port cover of the vehicle is not open, an inference can be made that the vehicle is not coupled to the charge station. If the charge port cover of the vehicle is open, an inference can be made (or an inference can be strengthened) that the vehicle is coupled to the charge station. An open or closed state of the charge port cover can be analyzed in combination with other connection data to determine whether the vehicle is coupled to the charge station.

Figure 34:
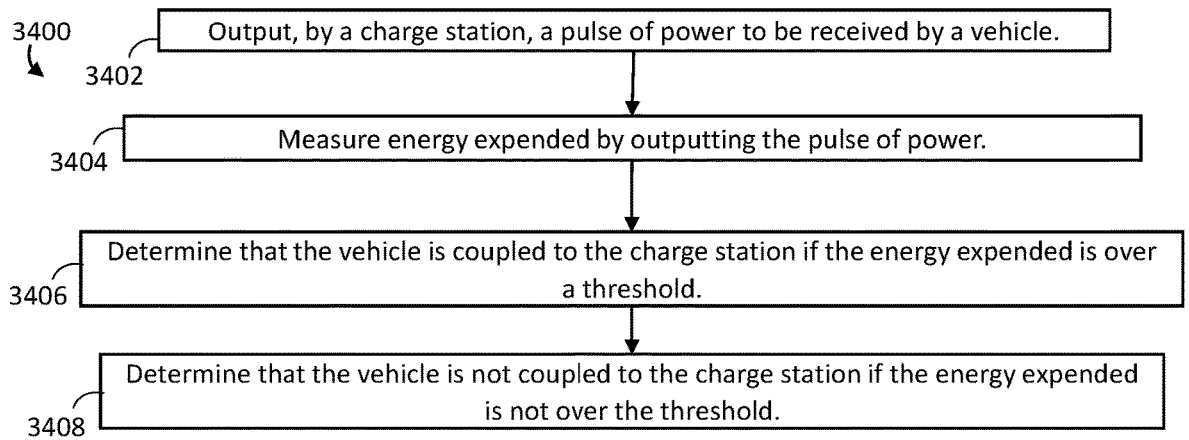

FIG. 34 is a flowchart diagram which illustrates an exemplary method 3400 for determining whether a vehicle is connected to a respective charge station. Method 3400 as illustrated includes acts 3402, 3404, 3406, and 3408. One skilled in the art will appreciate that additional acts could be added, acts could be removed, or acts could be reordered as appropriate for a given application. The acts of method 3400 which are performed by at least one processor can be performed by any of processors 116, 206, 326, 436, or 1642 as discussed above with reference to FIGS. 1, 2, 3, 4, and 16. Any of at least one non-transitory processor-readable storage mediums 118, 208, 328, 438, or 1644 could have instructions stored thereon, which when executed by a respective at least one processor cause a system including the respective at least one processor to perform the method 3400.

In act 3402, a pulse of energy is output by a charge station to be received by a vehicle. The pulse of energy is intended to test whether the vehicle will accept power (i.e., is connected to the charging station).

In act 3404, energy expended by the pulse of power is measured. For example, a power monitoring sensor of the charge station can measure how much energy is output in the pulse of power.

In act 3406, if the energy expended is over an energy threshold, a determination is made that the vehicle is coupled to the charging station.

In act 3408, if the energy expended is not over the energy threshold, a determination is made that the vehicle is not coupled to the charging station.

The amount of power in the pulse of power, and the energy threshold are set such that, when the vehicle is not connected to the charge station (i.e. the vehicle cannot accept power), energy expended by the pulse due to resistance or other causes of power loss will not be over the energy threshold.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware.

What is claimed is:

1. A system for controlling power distribution to a plurality of vehicles, the system comprising:
   a distribution control device comprising:
      at least one processor;
      at least one non-transitory processor-readable storage medium;
      a communication interface communicatively coupled to the at least one processor,
      wherein the at least one non-transitory processor-readable storage medium has instructions stored thereon, which when executed by the at least one processor, cause the distribution control device to:
         transmit, by the communication interface, an indication of a charge-restriction event to be received by a plurality of control units, each control unit of the plurality of control units operable to control charging of a respective battery of a respective vehicle;
         receive, by the communication interface from each control unit of a set of control units of the plurality of control units, at least one indication of participation in the charge-restriction event by a respective vehicle, where indication of participation in the charge-restriction event is indicative of a charge rate of a battery of the respective vehicle being restricted from a first charge rate outside of the charge-restriction event to a second charge rate less than the first charge rate during the charge-restriction event;

determine, by the at least one processor, possible energy savings during the charge-restriction event by each control unit of the set of control units restricting charge rate for the respective vehicle to the second charge rate instead of enabling charging of the battery at the first charge rate; and allocate, by the at least one processor, a respective reward for a respective recipient for each vehicle for which an indication of participation in the charge-restriction event was received, each reward based on the determined possible energy savings for the respective vehicle, even if an actual charge rate for the respective vehicle during the charge-restriction event is less than the second charge rate; and the set of control units of the plurality of control units, each control unit operable to:
receive the indication of the charge-restriction event;
restrict the charge rate of the respective battery of the respective vehicle to the second charge rate for the charge-restriction event; and
transmit an indication of participation, of the at least one indication of participation, in the charge-restriction event by the respective vehicle.

2. The system of claim 1, wherein the instructions which cause the distribution control device to allocate, by the at least one processor, the respective reward for the respective recipient for each vehicle for which an indication of participation in the charge-restriction event was received cause the at least one processor to: allocate funds to be provided to respective recipients for each vehicle for which an indication of participation in the charge-restriction event was received.

3. The system of claim 1, wherein the instructions which cause the distribution control device to allocate, by the at least one processor, the respective reward for the respective recipient for each vehicle for which an indication of participation in the charge-restriction event was received cause the at least one processor to: allocate credit to respective recipients for each vehicle for which an indication of participation in the charge-restriction event was received.

4. The system of claim 1, wherein the instructions further cause the communication interface to transmit, to the plurality of control units, a schedule of upcoming charge-restriction events.

5. The system of claim 1, wherein the instructions further cause the communication interface to transmit, to a control unit of the plurality of control units, an indication of participation in past charge events by a vehicle corresponding to the control unit.

6. The system of claim 1, wherein the instructions further cause the communication interface to receive, from a control unit of the plurality of control units, an indication of partial participation in the charge-restriction event by a respective vehicle.

7. The system of claim 6, wherein indication of partial participation in the charge-restriction event is indicative of a charge rate of a battery of the respective vehicle being restricted from the first charge rate to the second charge rate after a beginning of the charge-restriction event.

8. The system of claim 6, wherein indication of partial participation in the charge-restriction event is indicative of a charge rate of a battery of the respective vehicle being enabled at the first charge rate after a beginning of the charge-restriction event where the charge rate of the battery of the respective vehicle is restricted to second charge rate at the beginning of the charge-restriction event.

9. The system of claim 6, wherein the instructions further cause the at least one processor to allocate a partial reward for a recipient for a vehicle for which an indication of partial participation in the charge-restriction event was received.

10. The system of claim 9, wherein the partial reward is based on a proportion of the charge-restriction event for which the charge rate of the vehicle was restricted to the second charge rate.

11. The system of claim 1, wherein the instructions which cause the system to determine the possible energy savings for the respective vehicle cause the system to:
determine a first energy quantity to charge the respective battery of the respective vehicle at the first rate for the charge-restriction event;
determine a second energy quantity to charge the respective battery of the respective vehicle at the second rate for the charge-restriction event; and
determine the possible energy savings as a difference between the first energy quantity and the second energy quantity.

12. The system of claim 1, further comprising the plurality of control units which includes the set of control units, wherein each control unit of the plurality of control units is operable to:
receive the indication of the charge restriction event;
determine whether a charge level of the respective battery of the respective vehicle for the control unit is above a minimum charge threshold;
if the charge level of the respective battery is above the minimum charge threshold:
restrict the charge rate of the respective battery to the second charge rate for the charge-restriction event; and
transmit an indication of participation, of the at least one indication of participation, in the charge-restriction event by the respective vehicle; and
if the charge level of the battery is not above the minimum charge threshold:
enable charging of the respective battery at the first charge rate during the charge-restriction event.

13. The system of claim 1, wherein each control unit of the set of control units is further operable to:
monitor a charge level of a respective battery of the respective vehicle during the charge-restriction event;
if the charge level of the respective battery is below the minimum charge threshold prior to the charge restriction event and reaches the minimum charge threshold during the charge restriction event:
restrict charging of the respective battery to the second charge rate for a remainder of the charge-restriction event after the charge level reaches the minimum charge threshold; and
transmit an indication of partial participation, of the at least one indication of participation, in the charge restriction event.

14. The system of claim 13, wherein
each indication of partial participation is indicative of a proportion or duration of participation in the charge-restriction event; and
the processor-executable instructions which cause the at least one processor to determine possible energy savings during the charge-restriction event by each control unit of the set of control units cause the at least one processor to, for each control unit for which an indication of partial participation is received:
determine possible energy savings during the charge-restriction event by restricting charge rate for the respective vehicle to the second charge rate instead of enabling charging of the battery at the first charge rate for the proportion or duration of participation in the charge-restriction event.

15. The system of claim 1, wherein each control unit of the set of control units is further operable to:
if an override input is received:
   enable charging of the respective battery at the first charge rate for a remainder of the charge-restriction event after the override input is received; and
   transmit an indication of partial participation, of the at least one indication of participation, in the charge restriction event.

16. The system of claim 15, wherein
each indication of partial participation is indicative of a proportion or duration of participation in the charge-restriction event; and
the processor-executable instructions which cause the at least one processor to determine possible energy savings during the charge-restriction event by each control unit of the set of control units cause the at least one processor to, for each control unit for which an indication of partial participation is received:
   determine possible energy savings during the charge-restriction event by restricting charge rate for the respective vehicle to the second charge rate instead of enabling charging of the battery at the first charge rate for the proportion or duration of participation in the charge-restriction event.

* * * * *